United States Patent
Takahashi et al.

(10) Patent No.: US 10,715,023 B2
(45) Date of Patent: Jul. 14, 2020

(54) VIBRATORY ACTUATOR, WEARABLE TERMINAL, AND INCOMING CALL NOTIFICATION FUNCTION DEVICE

(71) Applicants: Yuki Takahashi, Tokyo (JP); Chikara Sekiguchi, Tokyo (JP); Kazutaka Sakaguchi, Tokyo (JP); Yasutaka Kitamura, Tokyo (JP); Masaharu Kagami, Tokyo (JP); Shigenori Inamoto, Tokyo (JP)

(72) Inventors: Yuki Takahashi, Tokyo (JP); Chikara Sekiguchi, Tokyo (JP); Kazutaka Sakaguchi, Tokyo (JP); Yasutaka Kitamura, Tokyo (JP); Masaharu Kagami, Tokyo (JP); Shigenori Inamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/766,916

(22) PCT Filed: Oct. 9, 2015

(86) PCT No.: PCT/JP2015/005156
§ 371 (c)(1),
(2) Date: Apr. 9, 2018

(87) PCT Pub. No.: WO2017/060940
PCT Pub. Date: Apr. 13, 2017

(65) Prior Publication Data
US 2018/0301969 A1 Oct. 18, 2018

(51) Int. Cl.
*H04M 1/00* (2006.01)
*H02K 33/18* (2006.01)
(Continued)

(52) U.S. Cl.
CPC ............. *H02K 33/18* (2013.01); *H02K 35/00* (2013.01); *H04M 19/04* (2013.01); *H04M 19/047* (2013.01)

(58) Field of Classification Search
CPC ........ H02K 33/18; H02K 35/00; H04M 19/04; H04M 19/047
(Continued)

(56) References Cited

U.S. PATENT DOCUMENTS

| 5,767,787 | A  | * | 6/1998 | Kudoh  | ..................... | G08B 6/00 |
|           |    |   |        |        |                       | 340/7.6   |
| 6,272,359 | B1 | * | 8/2001 | Kivela | ..................... | H04B 1/38 |
|           |    |   |        |        |                       | 455/557   |

(Continued)

FOREIGN PATENT DOCUMENTS

| AU | 2015100710 | A4 |   | 7/2015 |
|----|------------|----|---|--------|
| DE | 102014110476 |  | * | 4/2015 |

(Continued)

OTHER PUBLICATIONS

Anmelger Gleich, Method and system for transmission of tactile instructions to a human body, (PDF file) pp. 1-8 (Year: 2015).*

(Continued)

*Primary Examiner* — Sonny Trinh
(74) *Attorney, Agent, or Firm* — Brundidge & Stanger, P.C.

(57) ABSTRACT

The purpose of the present invention is to provide a vibratory actuator the size of which can be reduced and which effectively produces vibrations felt by a user. The vibratory actuator has: a stationary body which has a curved surface section curved in a concave shape to be placed along the skin; and a movable body which is disposed on the curved surface section so as to be able to move with respect to the stationary body in a reciprocating manner along the curved (Continued)

surface section, thereby imparting a vibratory stimulus caused by the reciprocating motion to mechanoreceptors in the skin tissue via the curved surface section.

6 Claims, 40 Drawing Sheets

(51) Int. Cl.
*H02K 35/00* (2006.01)
*H04M 19/04* (2006.01)

(58) Field of Classification Search
USPC .................................. 455/567, 66.1, 74, 100
See application file for complete search history.

(56) References Cited

U.S. PATENT DOCUMENTS

| | | | | |
|---|---|---|---|---|
| 6,650,231 | B1* | 11/2003 | Byrne | H04M 19/041 340/4.12 |
| 6,882,870 | B2* | 4/2005 | Kivela | H04B 1/38 455/41.2 |
| 7,016,707 | B2* | 3/2006 | Fujisawa | H04M 1/6505 340/573.1 |
| 7,130,664 | B1* | 10/2006 | Williams | H04M 1/7253 455/567 |
| 7,203,524 | B2* | 4/2007 | Tushinsky | G08B 1/08 340/539.13 |
| 8,498,675 | B2* | 7/2013 | Huang | H04M 1/72563 455/567 |
| 8,519,834 | B2* | 8/2013 | Jersa | H04M 19/047 340/4.12 |
| 9,247,525 | B2* | 1/2016 | Jacobs | H04W 68/00 |
| 9,258,688 | B2* | 2/2016 | Hulan | H04W 4/90 |
| D753,625 | S * | 4/2016 | Young | D14/203.5 |
| 9,830,781 | B2* | 11/2017 | Mirov | G08B 25/016 |
| 10,043,354 | B2* | 8/2018 | Mirov | G08B 6/00 |
| 10,295,823 | B2* | 5/2019 | Yu | G08B 6/00 |
| 2011/0101796 | A1 | 5/2011 | Odajima et al. | |
| 2015/0137627 | A1* | 5/2015 | Katada | H02K 33/16 310/25 |
| 2016/0023245 | A1* | 1/2016 | Zadesky | A61B 5/7455 310/334 |
| 2018/0001348 | A1 | 1/2018 | Ishii et al. | |
| 2018/0040258 | A1 | 2/2018 | Kouache | |

FOREIGN PATENT DOCUMENTS

| | | |
|---|---|---|
| DE | 102014110476 A1 | 4/2015 |
| JP | 2002-111822 A | 4/2002 |
| JP | 2007-89344 A | 4/2007 |
| JP | 4875133 B2 | 12/2011 |
| JP | 2015-095943 A | 5/2015 |
| JP | 2015-112013 A | 6/2015 |
| JP | 2016150333 A | 8/2016 |
| WO | 2014/130946 A2 | 8/2014 |
| WO | 2016/114384 A1 | 7/2016 |

OTHER PUBLICATIONS

International Search Report from International Application No. PCT/JP2015/005156 dated Dec. 28, 2015.
Extended European Search Report issued in EP 15905760.3 dated Feb. 12, 2019.

* cited by examiner

VIBRATORY ACTUATOR, WEARABLE TERMINAL, AND INCOMING CALL NOTIFICATION FUNCTION DEVICE

TECHNICAL FIELD

The present invention relates to a vibratory actuator, a wearable terminal, and an incoming call notification function device.

BACKGROUND ART

Conventionally, a vibratory actuator has been known as a vibration generating source for notifying a user of an incoming call and the like on a mobile information terminal, such as a mobile phone, or a vibration generating source that transmits an operational feel of a touch panel and the realistic presence of a game apparatus, such as a controller of a game machine, to fingers, hands, feet, etc. (e.g., see PTL 1).

A vibratory actuator described in PTL 1 is formed in a planar shape to reduce its size. The vibratory actuator in PTL 1 has a planar shape that allows a shaft to support slidably a pivotably supported movable section.

A vibratory actuator described in PTL 2 includes: a stationary body that includes a housing and a coil; and a movable body that includes a magnet 5 and a weight and is disposed in a housing. The coil and the magnet cooperate to linearly vibrate the movable body that is slidable against the shaft, in the vibrating direction with respect to the stationary body. The coil is wound around the outside of the movable section that includes the magnet.

PTL 3 describes an actuator using the principle of a VCM (Voice Coil Motor) that includes a flat coil and a flat magnet disposed above the flat coil, the coil and magnet being disposed opposite to each other.

In any of the vibratory actuators, the movable body is provided slidably against the shaft, and is elastically supported by springs in a manner capable of vibrating in the vibrating direction. In the vibratory actuator adopting a VCM as a driving principle, no magnetic attractive force is applied in normal time because of the magnetic circuit configuration. Accordingly, what elastically supports the movable section is made mainly of metal springs. Each of the vibratory actuators is assumed to be mounted on a ring-shaped input device that has a vibration communication function as shown in PTL 4, for example.

CITATION LIST

Patent Literature

PTL 1
Japanese Patent Application Laid-Open No. 2015-095943
PTL 2
Japanese Patent Application Laid-Open No. 2015-112013
PTL 3
Japanese Patent No. 4875133
PTL 4
WO2014/130946

SUMMARY OF INVENTION

Technical Problem

In a case where the conventional planar-shaped actuator is attached to a device including a ring-shaped housing encircled by a curved surface, a disposition space that is movable and in conformity with the planar shape in a space encircled by the curved surface is required in consideration of the structure. Consequently, there is a problem in that the ring-shaped device itself becomes large to secure the space.

In particular, in a case of a device such as a ring-shaped input device that is worn by a wearer to use, there is a demand for further reduction in size to prevent the wearer from feeling a wearing sense, and a desire to more effectively apply vibrations to the user as the wearer even with the reduced size.

An object of the present invention, which has been made in view of these points, is to provide a vibratory actuator, a wearable terminal and an incoming call notification function device that can facilitate reduction in size and effectively apply vibrations to the user.

Solution to Problem

An aspect of a vibratory actuator of the present invention adopts a configuration, including:
a stationary body that includes a curved surface section curved in a concave manner to be disposed along skin; and
a movable body that is provided on the curved surface section to be reciprocatorily movable along the curved surface section with respect to the stationary body and is to apply a vibratory stimulus caused by a reciprocating movement to mechanoreceptors in skin tissue of the skin via the curved surface section.

A wearable terminal of the present invention adopts a configuration where the vibratory actuator having the configuration described above is implemented. An incoming call notification function device of the present invention adopts a configuration where the vibratory actuator having the configuration described above is implemented.

Advantageous Effects of Invention

The present invention can facilitate reduction in size, and effectively apply vibrations to the user.

DESCRIPTION OF EMBODIMENTS

Embodiments of the present invention will be described in detail with reference to the accompanying drawings.

Embodiment 1

Figure 1:
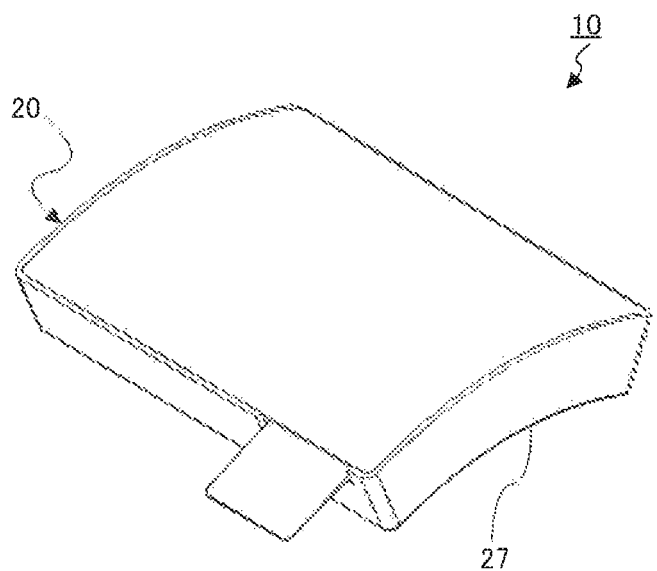
FIG. 1 illustrates an external view showing a configuration of a vibratory actuator of Embodiment 1 according to the present invention.
Figure 2:
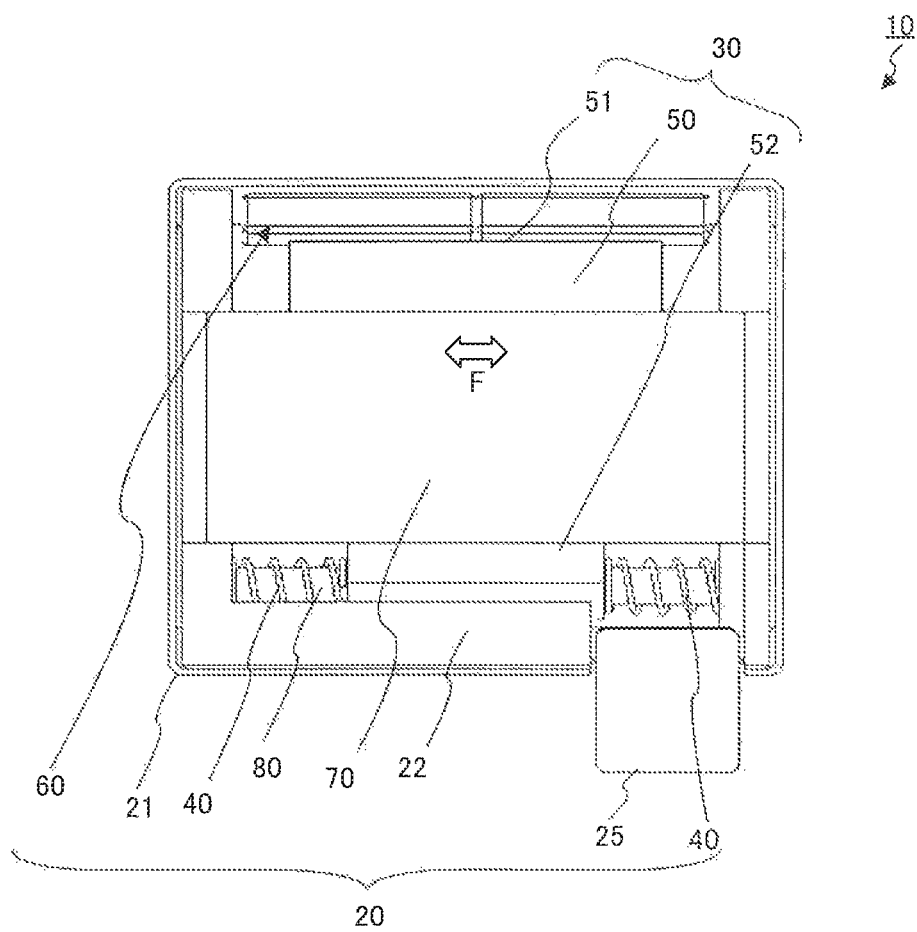
FIG. 2 illustrates a plan view showing an internal configuration of the vibratory actuator of Embodiment 1.
Figure 3:
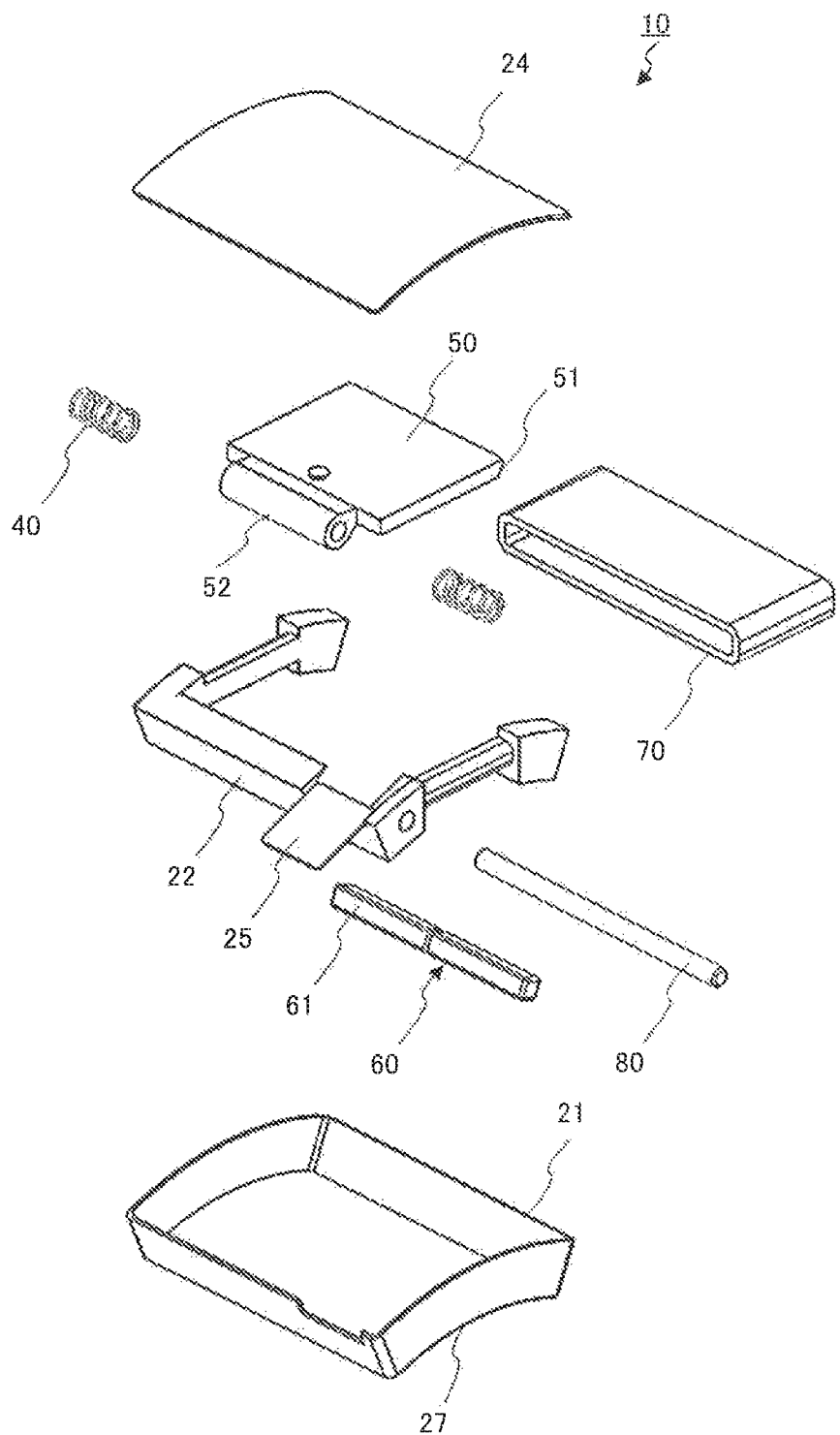
FIG. 3 illustrates an exploded perspective view of the vibratory actuator of Embodiment 1.
Figure 4:
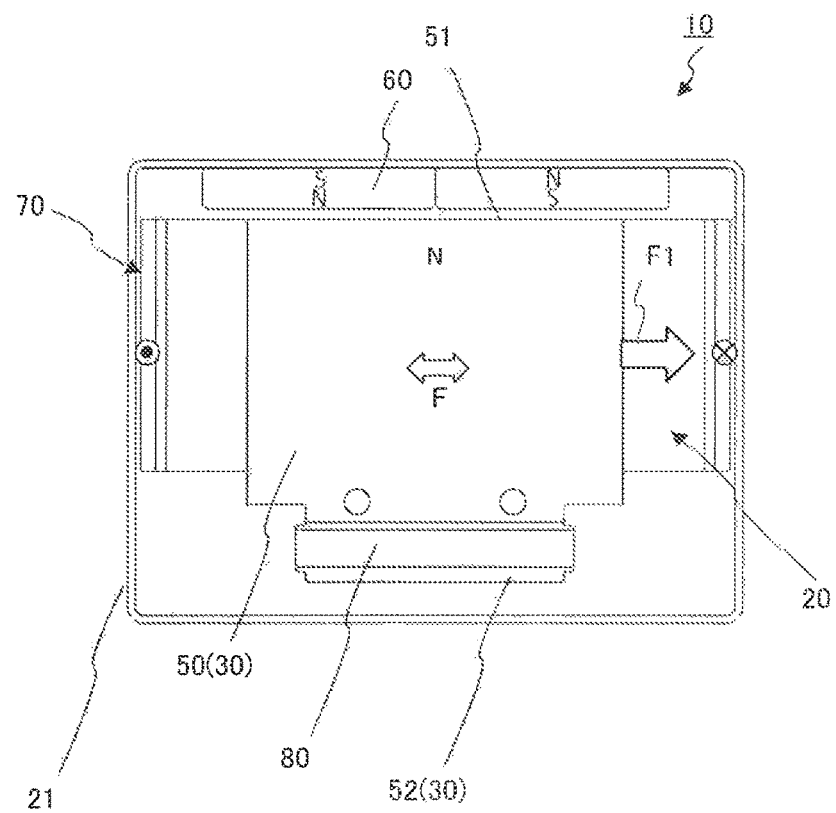
FIG. 4 illustrates a diagram for description of the movement of a movable body of the vibratory actuator of Embodiment 1.

FIG. 1 illustrates an external view showing a configuration of a vibratory actuator of Embodiment 1 according to the present invention. FIG. 2 illustrates a plan view showing an internal configuration of the vibratory actuator. FIG. 3 illustrates an exploded perspective view of the vibratory actuator. FIG. 4 illustrates a diagram for description of the movement of a movable body of the vibratory actuator.

Vibratory actuator 10 shown in FIG. 1 has an arc flat plate shape having a flat arc shape in a sectional view. Vibratory actuator 10 includes stationary body 20, and movable body 30. Movable body 30 is elastically supported by metal springs 40 and by a magnetic spring due to magnetic attractive forces caused by core 50 and magnet 60. Vibratory actuator 10 preliminarily presses movable body 30 by a magnetic attractive force to prevent movable body 30 from rotating and to achieve positioning, thus allowing movable body 30 to have a stable structure. The preliminary pressing described here means a force of eliminating the backlash of a shaft (shaft section) that supports movable body 30 by applying the magnetic attractive force between magnet 60 and a magnetic body (core 50) to make magnet 60 and the magnetic body (core 50) relatively attract each other, or a force of regulating the movements other than the movement in the movable direction (those in the twisting direction of a leaf spring and the direction perpendicular to the movable direction, for example). In vibratory actuator 10, the preliminary pressing eliminates the backlashes of the movable body (e.g., movable body 30 that includes core 50) including one of the magnet (e.g., magnet 60) and the magnetic body (e.g., core 50) against the shaft (e.g., shaft section 80 on stationary body 20 side), and regulates the movement in the rotational direction about the movable body shaft. The movable body reciprocatorily vibrates by an electromagnetic action due to magnet 60 and core 50 and coil 70.

Stationary body 20 includes case 21, frame 22 to which power supply section 25 is connected, shaft section 80, magnet 60, coil 70, and cover 24.

Case 21 includes a peripheral wall section having an arc shape in a side view. Bottom surface 27 of case 21 is curved. Case 21 is a container having an arc shape in a sectional view. That is, case 21 includes a curved surface section serving as bottom surface 27 that is an external surface curved in a concave manner. Case 21 has an opening upward. A hollow inside is formed by attaching cover 24 to the opening. In this embodiment, as well as cover 24, case 21 is formed of a metal material, and functions as an electromagnetic shield together with cover 24. In case 21, frame 22 is disposed at a side peripheral section, on the other surface of bottom surface 27 serving as the curved surface section, along three-wall section including arc-shaped two side surfaces.

Frame 22 is disposed in case 21, and fixes shaft section 80 disposed in the curved direction (the direction orthogonal to the circumferential direction, and is the longitudinal direction in this embodiment) and supports shaft section 80. For example, shaft section 80 is pressed into frame 22 or is fixed thereto by adhesion. Shaft section 80 may be fixed to frame 22 by inserting and fixing the opposite ends of shaft section 80 into and to respective fixation holes formed at the opposite ends of frame 22. Likewise, fixation between frames 22A to 22C and shaft section 80, fixation between holders 22D to 22J and shaft section 80, and fixation between holders 22L to 22N and shaft section 80 in embodiments described later may be achieved in an analogous manner.

Coil 70 is fixed to frame 22. Power supply section 25 is a board for supplying power to coil 70, and includes a board connected to an external power source, for example, a flexible printed circuit (FPC) and the like. Power supply section 25 is connected to coil 70 via frame 22.

In case 21, magnet 60 is attached along the inner surface of a wall where frame 22 is not disposed. Here, magnet 60 is disposed with the different two magnetic poles being arranged in the longitudinal direction (the direction orthogonal to the curved direction). Magnet 60 may be configured by alternately arranging multiple magnets (magnet pieces) that have different magnetic poles, or may be configured by magnetization that achieves alternately different magnetic properties. Likewise, magnets in the embodiments described later are analogously configured. In this embodiment, core 50 is disposed to face the arc direction, i.e., the curved direction, with respect to magnet 60. Coil 70 is disposed around core 50 with predetermined spaces being secured.

Movable body 30 includes core 50 and bearing section 52, and is elastically supported by metal spring 40. Metal spring 40 is, for example, a cylindrical coil spring. Core 50 is a magnetic body. Bearing section 52 may also be a magnetic body.

Core 50 has a flat arc shape in a sectional view in conformity with the shape of case 21 that is to accommodate core 50, and is disposed so that one end surface (facing surface 51) can face magnet 60 and the curved bottom surface can be along bottom surface 27 that is a curved surface section of case 21. Facing surface 51 of core 50 is disposed so as to be on a virtual plane passing through the axis of a virtual cylinder including core 50, to be parallel to an end surface apart in the circumferential direction of case 21, and to be parallel to magnetic pole surface (facing surface) 61 of magnet 60. Core 50 is fixed so that bearing section 52 can extend in the central axis direction of the arc on the other end surface side. Shaft section 80 is disposed across frame 22 on a peripheral wall opposite in the circumferential direction to the peripheral wall to which magnet 60 is attached. Shaft section 80 is rotatably inserted into bearing section 52. Core 50 is in a state of being attached along shaft section 80 slidably in the longitudinal direction. Bearing section 52 is a sintered sleeve bearing. Shaft section 80 protrudes from bearing section 52 in the longitudinal direction (here, the central axis direction of the arc). Metal springs 40 are externally applied on the protruding portions. Bearing section 52 is urged by clamping metal springs 40 so as to be disposed at the center in the longitudinal direction.

In case 21, core 50, which is the magnetic body, and magnet 60 are disposed to face each other, thereby causing a magnetic attractive force between core 50 and magnet 60.

In case 21, core 50 is rotatably attached to shaft section 80. Accordingly, core 50 is elastically supported by the magnetic attractive force with magnet 60, i.e., what is called a magnetic spring. The magnetic attractive force achieves a state of preliminarily pressing movable body 30 including core 50. Consequently, the backlash of the shaft is negated. Movable body 30 including core 50 is in the positioned state (positioning of the movable body). The rotation about shaft section 80 is regulated (what is called rotation stop).

The power is supplied from power supply section 25 to coil 70, thereby exciting core 50 to move reciprocatorily (vibrate reciprocatorily) in the longitudinal direction, i.e., the direction orthogonal to the circumferential direction. For example, as shown in FIG. 4, the polarities of magnet 60 (magnetic pole surface 61) are the N-pole and S-pole, which are disposed so as to be arranged to face facing surface (one end surface) 51 serving as the magnetic pole surface of core 50 in the longitudinal direction. When current is supplied to coil 70 to cause the polarity of core 50 to be the N-pole, core 50 is driven in F1 direction. When current is supplied to coil 70 in the opposite direction to cause the polarity of core 50 to be the S-pole, core 50 is driven in −F1 direction that is opposite to F1 direction.

That is, in vibratory actuator 10, alternate current waves input from power supply section 25 into coil 70 magnetize core 50, i.e., facing surface 51 of core 50, and effectively cause the magnetic attractive force and repulsion to magnet 60 on stationary body 20 side. Accordingly, core 50 of movable body 30 reciprocatorily moves in both the directions F (F1 direction and −F1 direction) along the longitudinal direction with reference to the position (here, the position where the center of facing surface 51 coincides with the center of the N-pole and S-pole of magnet 60) serving as a drive reference position. That is, movable body 30 reciprocatorily vibrates with respect to stationary body 20 in the direction along facing surfaces 61 and 51 of magnet 60 and core 50 on the other surface of bottom surface 27 serving as the curved surface section. This drive principle is described as follows. The drive principle of vibratory actuator 10 in this embodiment is achieved in all the vibratory actuators in the following embodiments.

According to vibratory actuator 10 in this embodiment, in a case where movable body 30 has a mass m [kg] and a spring constant $K_{sp}$ in the twisting direction, movable body 30 vibrates with respect to stationary body 20 at a resonant frequency $f_r$ [Hz] calculated by following equation 1.

[1]

$$f_r = \frac{1}{2\pi}\sqrt{\frac{K_{sp}}{m}} \quad \text{(Equation 1)}$$

Vibratory actuator 10 in this embodiment supplies alternate current having a frequency substantially equal to resonant frequency $f_r$ of movable body 30 from power supply section 25 to coil 70, thereby exciting core 50 (more specifically, one end surface 51 serving as the magnetic pole surface) via coil 70. Accordingly, movable body 30 can be effectively driven.

Movable body 30 in vibratory actuator 10 is in a state of being supported by a spring-mass structure supported by stationary body 20 via metal springs 40. Consequently, when alternate current having a frequency equal to resonant frequency $f_r$ of movable body 30 is supplied to coil 70, movable body 30 is driven in a resonant state.

An equation of motion and a circuit equation that represent the drive principle of vibratory actuator 10 are illustrated below. Vibratory actuator 10 is driven on the basis of the equation of motion represented by following equation 2 and the circuit equation represented by following equation 3.

[2]

$$m\frac{d^2x(t)}{dt^2} = K_f i(t) - K_{sp} x(t) - D\frac{dx(t)}{dt} \quad \text{(Equation 2)}$$

m: Mass [Kg]
x(t): Displacement [m]
$K_f$: Thrust constant [N/A]
i(t): Current [A]
$K_{sp}$: Spring constant [N/m]
D: Attenuation coefficient [N/(m/s)]

-continued

[3]

$$e(t) = Ri(t) + L\frac{di(t)}{dt} + K_e\frac{dx(t)}{dt} \quad \text{(Equation 3)}$$

e(t): Voltage [V]
R: Resistance [Ω]
L: Inductance [H]
$K_e$: Back electromotive force coefficient [V/(m/s)]

That is, mass m [Kg], displacement x(t) [m], thrust constant $K_f$ [N/A], current i(t) [A], spring constant $K_{sp}$ [N/m], attenuation coefficient D [N/(m/s)] and the like in vibratory actuator 10 can be appropriately changed within a range that satisfies equation 2. Voltage e(t) [V], resistance R [Ω], inductance L [H], back electromotive force coefficient $K_e$ [V/(m/s)] can be appropriately changed within a range that satisfies equation 3.

When vibratory actuator 10 is driven at resonant frequency $f_r$ determined by mass m of movable body 30 and spring constant $K_{sp}$ of spring material (elastic body) 150 as described above, a large output can be effectively obtained.

Vibratory actuator 10 can exert the following advantageous effects.

<Advantageous Effect 1>

In addition to metal springs 40, the magnetic spring that includes core 50, which is the magnetic body, and magnet 60 are provided. Consequently, the spring constant of metal springs 40 that elastically support core 50 at a reference position can be reduced. Accordingly, the lives of metal springs 40 can be improved, which can facilitate improvement in reliability as vibratory actuator 10. In comparison with a case where movable body 30 is supported only by metal springs, the spring constants of metal springs can be reduced to have appropriate spring constants, which negate the need to increase the occupied space owing to increase in the sizes of metal springs. Accordingly, the design flexibility can be prevented from decreasing.

<Advantageous Effect 2>

The position of movable body 30 (positioning to the reference position) is stabilized by the magnetic attractive force, the rotation stop of core 50 can be achieved, and reduction in the size of vibratory actuator 10 itself due to minimization of the clearance between movable body 30 and stationary body 20 can be achieved. The reduction in noise through suppression of backlashes can be achieved at low cost without additionally providing components.

<Advantageous Effect 3>

In a case where a conventional planar- or cylindrical-shaped actuator is attached to a ring-shaped device (e.g., Φ15 to 25 mm), the disposition of the actuator in the device is limited owing to the relationship with peripheral parts (e.g., fingers etc.), and cannot be freely configured. The orientation is regulated also in view of the ring. Accordingly, the actuator cannot be worn at a freely selected position. On the other hand, in a case where the width of the actuator itself is increased to increase the output of the actuator, a problem occurs in that increase in width with the shape being the planar shape increases the size of the ring, which is an end product.

In a case where the actuator has a planar shape, the actuator is apart by a distance from the skin at outer peripheral sides, and the contact surface with the skin is reduced (linear contact). The housing intervenes between the vibration source and the skin Consequently, there is a possibility of reduction in vibration transmission.

Figure 5:
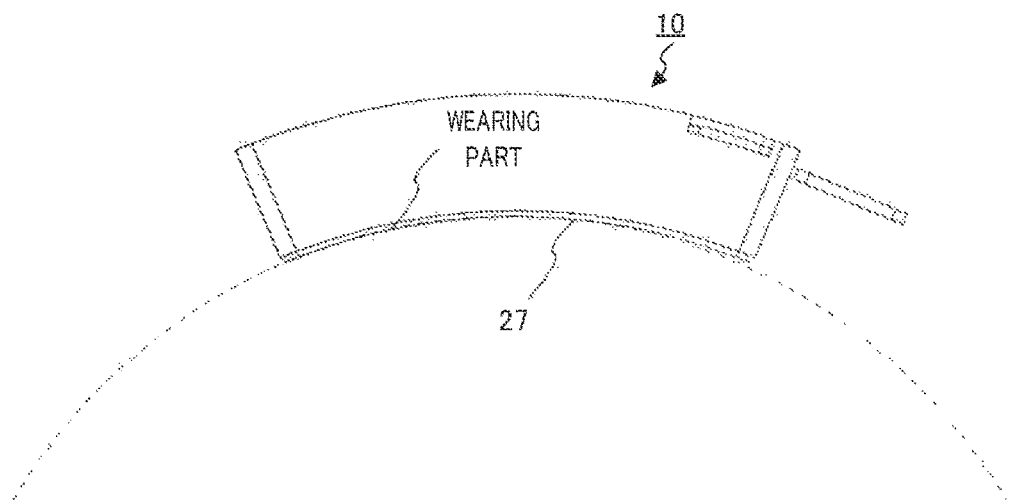
FIG. 5 illustrates a state where the vibratory actuator of Embodiment 1 is worn.

On the contrary, according to this embodiment, vibratory actuator 10 has the flat arc shape. Consequently, the end product to which vibratory actuator 10 is attached can be disposed so as to have a shape where the curve of the peripheral surface of the cylinder conforms to the curved surface that configures the arc. Accordingly, as shown in FIG. 5, for example, even if the end product has a curved surface, such as of a cylinder, (corresponding to the wearing part in FIG. 5), vibratory actuator 10 can be disposed at any position on the cylinder. As a result, for example, in the case of the ring-shaped device, this device has a curved surface shape and can be disposed on the skin on the palm side where the mechanoreceptors in the skin tissue have a high density, which can make sensory vibrations larger.

More specifically, vibratory actuator 10 is disposed at a wearing part on the skin where the mechanoreceptors have a high density in the skin tissue. The skin tissue is formed of a three-layered viscoelastic body that includes epidermis, dermis, and subcutaneous tissue in the order from the skin surface.

The mechanoreceptors are receptors that generate afferent impulses in response to received mechanical stimuli. The detection mechanoreceptors include haptic receptors that include Meissner's corpuscles disposed in recesses, Merkel's corpuscles disposed on convexes, etc. at the irregularities of the boundary between the epidermis and the dermis thereunder in the skin tissue, and Pacini's corpuscles, Ruffini terminals, etc., which reside in the deep inside of the dermis. Here, the wearing part is finger pulp having skin tissue where mechanoreceptors closely reside. Vibratory actuator 10 is attached such that curved bottom surface (curved surface section) 27 that is the inner peripheral surface of vibratory actuator 10 having a flat shape with an arc shape in a sectional view and is a vibration applying surface is in close contact with the wearing part. Accordingly, the reciprocating movement of movable body 30 can apply a vibratory stimulus directly to the mechanoreceptors via bottom surface 27. Consequently, vibrations can be effectively applied by the user without changing the external shape, and the user's sensory vibrations can be increased.

Even in a case where the width that is the length in the curved direction is increased in order to increase the output, the adverse effects to the outer dimensions of the end product can be eliminated even with increase in the width that is the length in the curved direction because bottom surface (curved surface section) 27 that is the inner peripheral surface is an arch-shaped curved surface. Wearing can be achieved in conformity with the peripheral surface that is a curved surface. In a case of wearing around a finger having an outer periphery with a large diameter, multiple pieces can be implemented. Bottom surface (curved surface section) 27 of vibratory actuator 10 serves as the vibration applying surface, while vibrations can be applied through the entire surface. Consequently, the vibration applying surface is enlarged, the distance to the mechanoreceptors of the skin can be reduced, and vibration transmission can be improved. The end product can have the cylindrical shape. Consequently, in a case of the configuration of wearing on a finger, the housing can be reduced in size, thereby achieving advantages of reducing the size, weight and cost. As described above, reduction in size can be facilitated, while vibrations can be effectively applied to the user.

<Advantageous Effect 4>

In vibratory actuator 10, movable body 30 has the shape conforming to the shape of case 21, and is linearly driven in the direction parallel to the center of the arc-shaped curve of case 21. Consequently, there are advantageous effects that drive can be achieved at the minimum clearance in case 21 that has a flat planar shape with an arc shape in a sectional view, the occupied volume of movable body 30 can be increased, and the output can be improved. For example, a vibratory actuator having the same external shape as vibratory actuator 10 has can securely facilitate reduction in size and increase in output in comparison with the configuration where a rectangular parallelepiped-shaped movable body is allowed to move in the case having the same external shape as case 21 has. In case 21, the clearance between each section of stationary body 20 including case 21 and movable body 30 can be minimized, thereby improving the design flexibility of each section.

<Advantageous Effect 5>

In a typical conventional VCM actuator, the air gap between the magnetic pole surfaces of the movable body and the stationary body is increased, the magnetic efficiency is low, the structure is complicated, and the assemblability is low. On the other hand, vibratory actuator 10 has the configuration where magnet 60 including magnetic pole surface (facing surface) 61 with N and S two poles, and coil 70 are disposed in stationary body 20, and core 50 that is the magnetic body is disposed in movable body 30.

Accordingly, the mechanism is achieved where the magnetic poles at the center of coil 70 are excited, and the thrust is generated by the magnetic attractive force with magnet 60. Consequently, improvement in the electromagnetic conversion efficiency can be facilitated in comparison with that of the conventional VCM scheme having a large magnetic resistance.

<Advantageous Effect 6>

Furthermore, the disposition flexibility of the space occupied by coil 70 in case 21 is high, and coil 70 can be designed to be large, which can achieve a high output. Core 50 is an arc-shaped planar material, and can be easily subjected to a bending process. The arc-shaped vibratory actuator itself has a wearing surface where wearing is made can be configured to be a curved surface conforming to the shape at a wearing site, for example, a curved plane. That is, vibratory actuator 10 itself is formed in an arc shape, and can thus be easily formed so that vibrations to the wearing site can be transmitted through the entire wearing surface.

In the configuration of vibratory actuator 10 of Embodiment 1 shown in FIGS. 1 to 5, the configuration elements including the magnetic circuit may be formed as they are, while the external shape may be changed from the flat shape having the arc shape in a sectional view to another shape, such as a flat planar shape.

<Advantageous Effect 7>

Movable body 30 is elastically supported in a state of being subjected to preliminary pressing by the magnetic spring, and is supported by shaft section 80 serving as a support shaft.

Accordingly, even while the clearance with movable body 30 in case 21 is reduced, assembly can be made without any interference. Furthermore, the trajectory of movable body 30 is stable, which facilitates the design and allows movable body 30 to be stably driven. In the case where coil springs are adopted as metal springs 40, the configuration where shaft section 80 is inserted along the centers of the coil springs is achieved. Consequently, the assemblability can be improved, and the springs can be stably supported.

Furthermore, shaft section 80 is fixed to stationary body 20. Accordingly, the bearing is eliminated from stationary body 20. The space required for shaft fixation is reduced to facilitate reduction in thickness. The need of fitting between the bearing and stationary body 20 is negated. The tolerances of the bearing external diameter dimension and the sections for fixation of the bearing are loosened. Accordingly, reduction in cost is facilitated.

Bearing section 52 is a sintered material. Accordingly, this section has a higher specific weight than that in a case where bearing section 52 is made of a resin material. Consequently, the mass of movable body 30 can be increased, and increase in output can be facilitated.

<Advantageous Effect 8>

The output of vibratory actuator 10 depends on the stroke of movable body 30. In consideration of the design of the vibratory actuator, in a case of driving in the short-hand direction, it is difficult to secure the stroke of movable body 30.

In a case where metal springs are disposed in the movable direction of movable body 30, a large space where the metal springs are disposed is required to be secured.

In particular, this embodiment can more effectively apply vibrations to the user without changing the external shape. That is, without increase in the size of the external shape, the user's sensory vibrations can be increased. Even with reduction in size, vibrations can be more effectively applied to the user. The movable direction of movable body 30 in vibratory actuator 10 having a flat planar shape which is a rectangular shape in a plan view and an arc shape in a side view is the longitudinal direction of the vibratory actuator. Accordingly, the clearance required for the stroke is easily secured, and a high output can be achieved. Even if the metal springs are disposed in the movable direction, a large space where the metal springs are disposed can be secured, and the design flexibility is improved. As a result, the stresses of the metal springs tend to be relaxed. The durability is excellent. The lives of the metal springs themselves, and the product life of vibratory actuator 10 can be extended.

Modification Example of Embodiment 1

Figure 6:
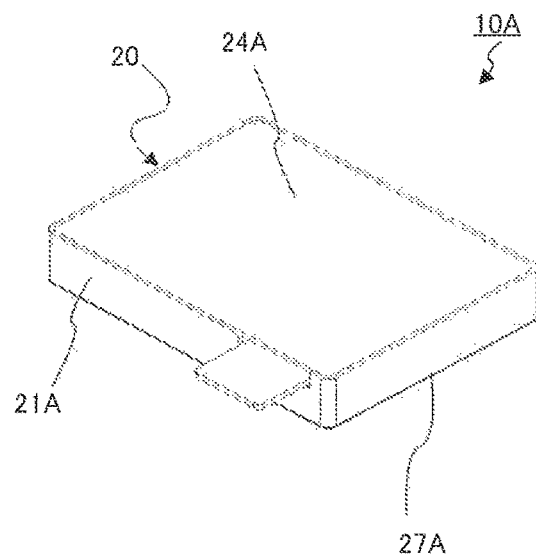
FIG. 6 illustrates an external view showing a configuration of a vibratory actuator of a modification example of Embodiment 1 according to the present invention.
Figure 7:
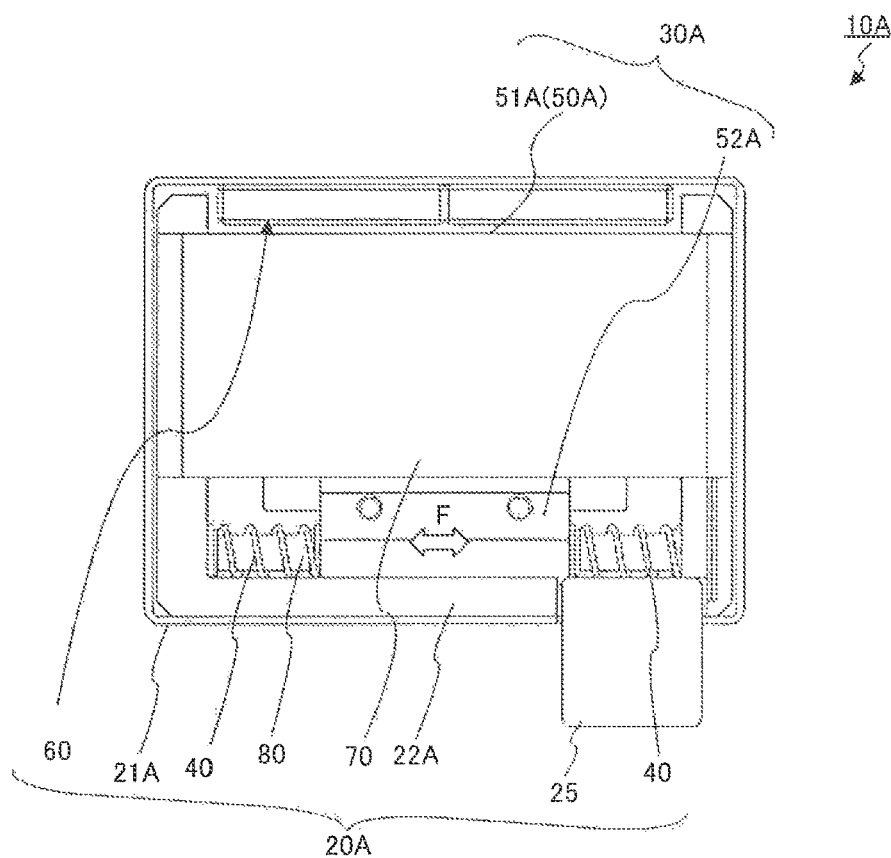
FIG. 7 illustrates a plan view showing an internal configuration of the vibratory actuator of the modification example of Embodiment 1.
Figure 8:
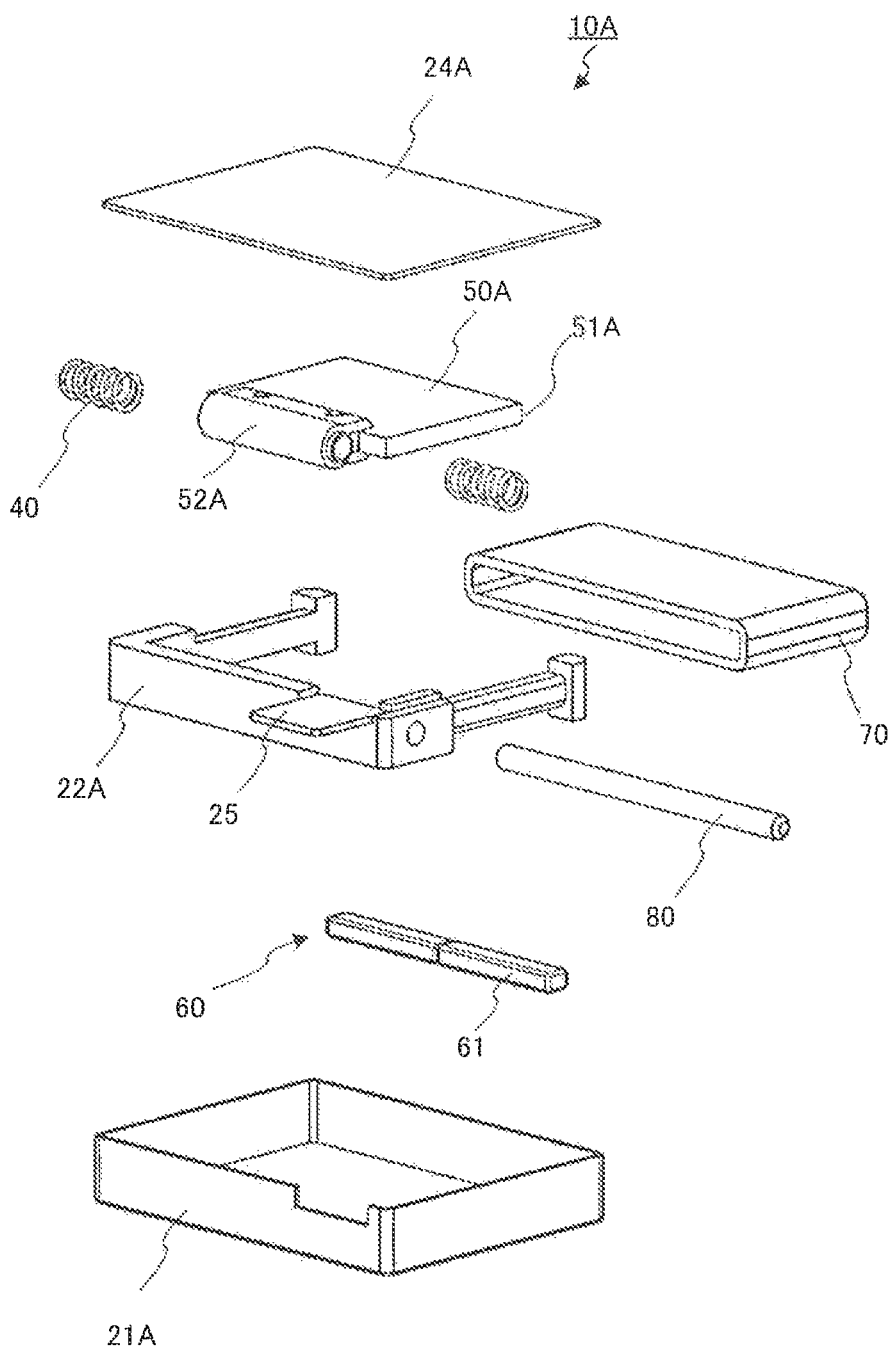
FIG. 8 illustrates an exploded perspective view of the vibratory actuator of the modification example of Embodiment 1.

FIGS. 6 to 8 illustrate vibratory actuator 10A that is a modification example of vibratory actuator 10.

As shown in FIG. 6, vibratory actuator 10A has a planar external shape.

Vibratory actuator 10A is vibratory actuator 10 whose external shape is a planar shape. Each configuration member is changed from the arc shape to a planar shape accordingly.

Vibratory actuator 10A includes configuration elements having functions analogous to the functions of the configuration elements of vibratory actuator 10.

Vibratory actuator 10A includes stationary body 20A, and movable body 30A.

Stationary body 20A includes rectangular box-shaped case 21A, frame 22A to which power supply section 25 is connected, shaft section 80, magnet 60, coil 70, and cover 24A. Movable body 30A includes core A, and is supported movably in F directions via frame 22A with respect to stationary body 20A. More specifically, in a manner analogous to that of movable body 30 of vibratory actuator 10, movable body 30A is elastically supported by metal springs 40 and by a magnetic spring due to magnetic attractive forces caused by core 50A and magnet 60.

That is, vibratory actuator 10A has the structure where the movable body 30A is preliminarily pressed by a magnetic attractive force to prevent movable body 30A from rotating and to achieve positioning, thus allowing stable movable body 30A. Movable body 30A reciprocatorily vibrates in the longitudinal direction (F direction) by an electromagnetic action due to magnet 60 and core 50A and coil 70. That is, movable body 30A reciprocatorily vibrates with respect to stationary body 20A in the direction along facing surfaces 61 and 51A of magnet 60 and core 50A.

Together with cover 24A, case 21A forms a hollow rectangular inside, and functions as an electromagnetic shield. Frame 22A is disposed along a three-wall section, and is fixed with shaft section 80 being oriented in the longitudinal direction and the vibrating direction (F direction) in case 21A. Coil 70 disposed so as to encircle the outer periphery of core 50A is fixed to frame 22A, as with frame 22.

In case 21A, as with magnet 60 of vibratory actuator 10, magnet 60 is attached along the inner surface of a wall where frame 22A is not disposed. Movable body 30A includes core 50A, and bearing section 52A.

Core 50A is different only in shape from core 50. The other configuration and functions are analogous. Core 50A is rotatably attached to shaft section 80, and is elastically supported by the magnetic attractive force with magnet 60, i.e., what is called a magnetic spring. The magnetic attractive force achieves a state of preliminarily pressing movable body 30 including core 50A. Accordingly, core 50A is brought into a state where the rotation about shaft section 80 is regulated (what is called rotation stop) and positioning is made (positioning of the movable body).

The power is supplied from power supply section 25 to coil 70, thereby exciting core 50A to move reciprocatorily (vibrate reciprocatorily) in the longitudinal direction, i.e., F directions orthogonal to the circumferential direction, in a manner analogous to that of core 50.

Vibratory actuator 10A can exert <Advantageous Effect 1> and <Advantageous Effect 2> described above, while in vibratory actuator 10A, magnet 60A including magnetic pole surface (facing surface) 61A having N and S two poles and coil 70 are disposed in stationary body 20A, and core 50A that is the magnetic body is disposed in movable body 30A.

Consequently, there are advantageous effects that drive can be achieved at the minimum clearance in case 21A that has a flat planar shape, the occupied volume of movable body 30 can be increased, and the output can be improved.

Furthermore, the mechanism is achieved where the magnetic poles at the center of coil 70 are excited, and the thrust is generated by the magnetic attractive force with magnet 60. Consequently, improvement in the electromagnetic conversion efficiency can be facilitated in comparison with that of the conventional VCM scheme having a large magnetic resistance. Furthermore, the disposition flexibility of the space occupied by coil 70 in case 21A is high, and coil 70 can be designed to be large, which can facilitate a high output.

Embodiment 2

Figure 9:
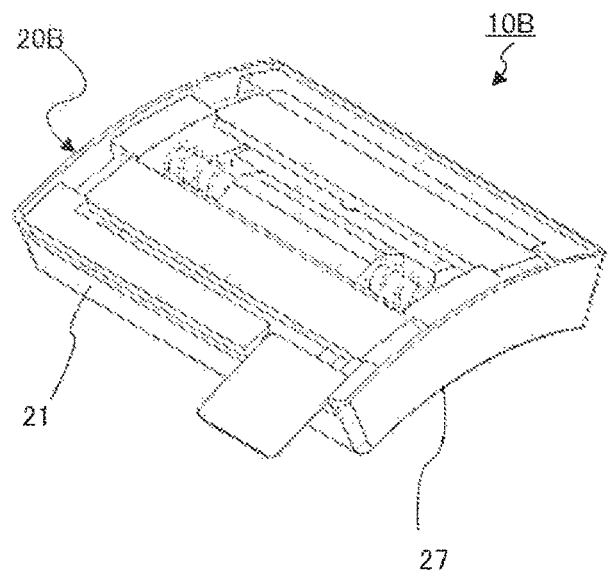
FIG. 9 illustrates a perspective view showing an internal configuration of a vibratory actuator of Embodiment 2 according to the present invention.
Figure 10:
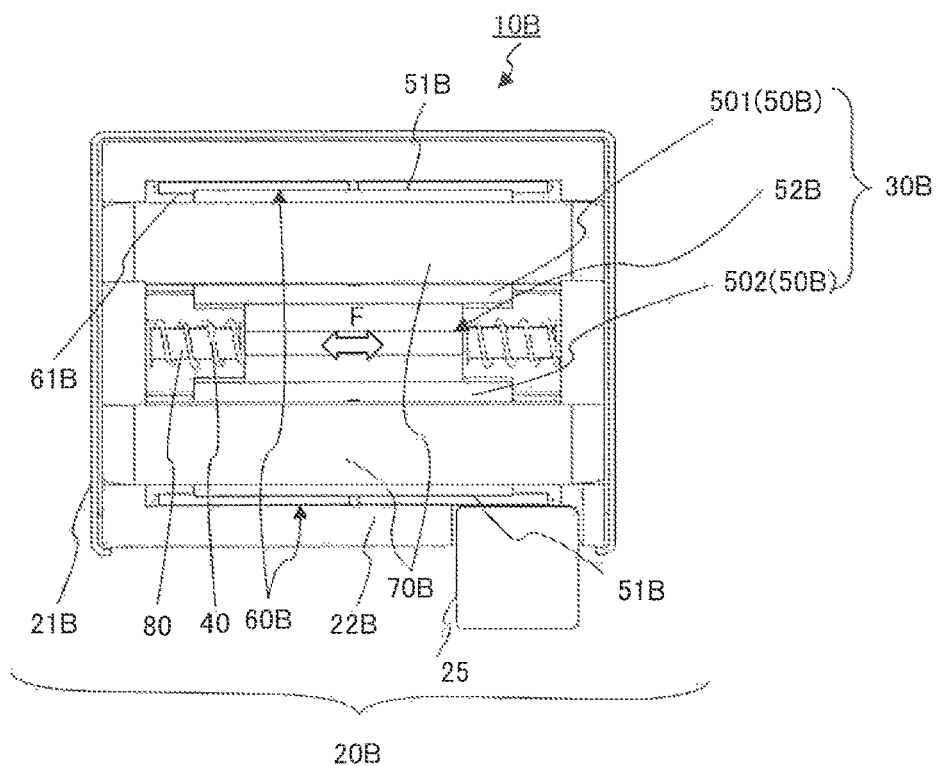
FIG. 10 illustrates a plan view showing an internal configuration of the vibratory actuator of Embodiment 2.
Figure 11:
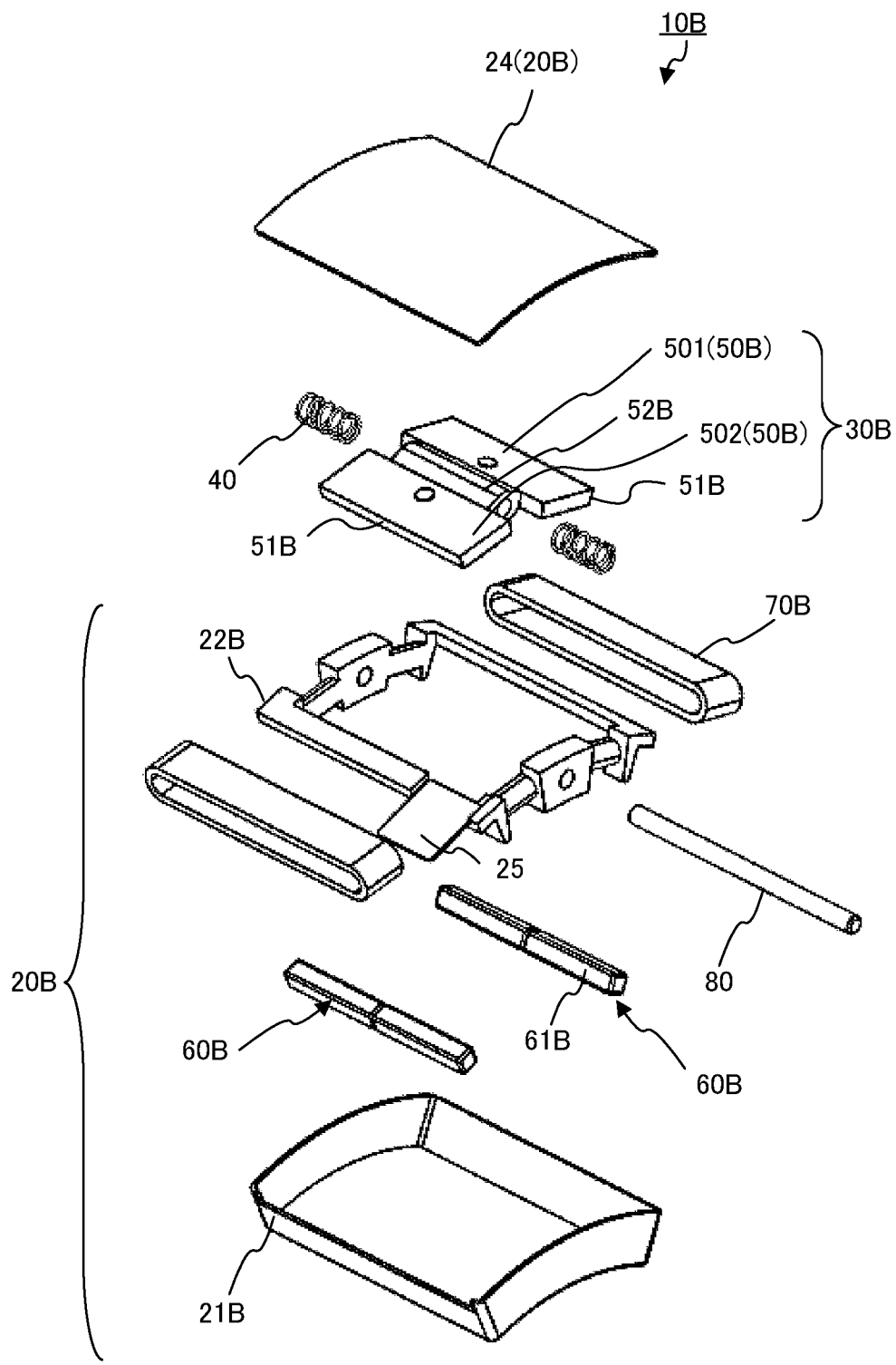
FIG. 11 illustrates an exploded perspective view of the vibratory actuator of Embodiment 2.
Figure 12:
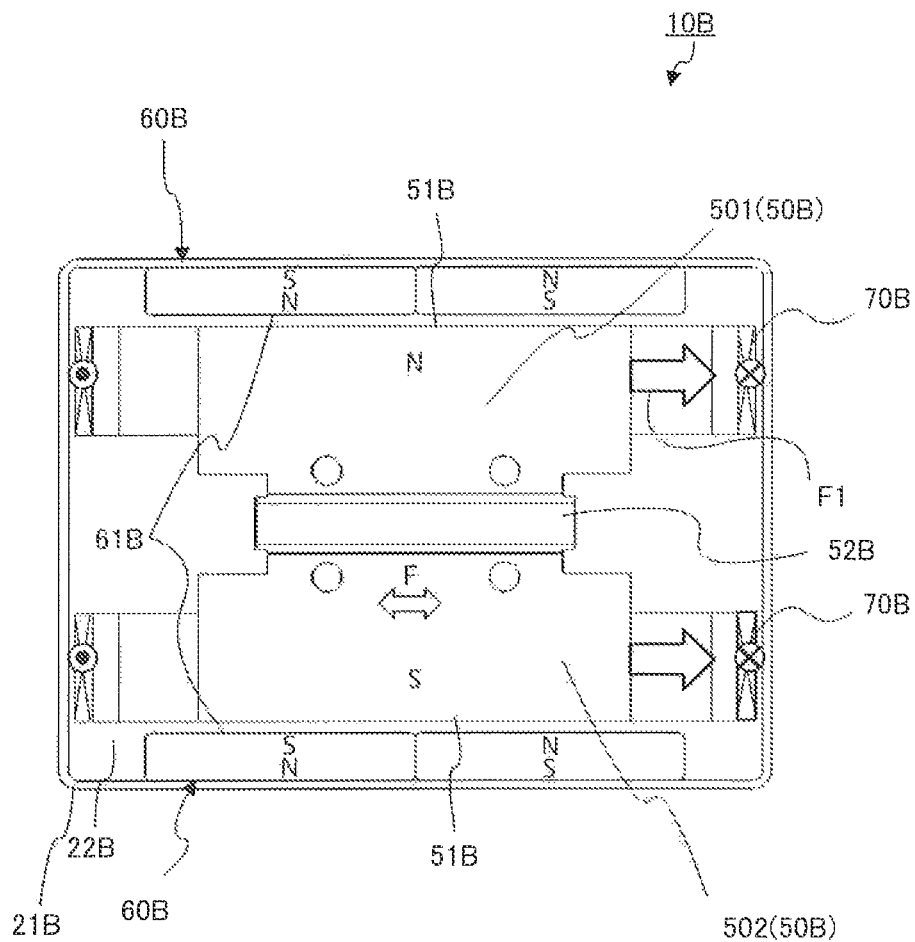
FIG. 12 illustrates a diagram for description of the movement of a movable body of the vibratory actuator of Embodiment 2.

FIG. 9 illustrates an external view showing a configuration of vibratory actuator 10B of Embodiment 2 according to the present invention. FIG. 10 illustrates a plan view showing an internal configuration of vibratory actuator 10B. FIG. 11 illustrates an exploded perspective view of vibratory actuator 10B. FIG. 12 illustrates a diagram for description of the movement of movable body 30B of vibratory actuator 10B. FIG. 12 illustrates a plan sectional view schematically showing a magnetic circuit configuration of vibratory actuator 10B, and shaft section 80 is omitted.

Vibratory actuator 10B shown in FIGS. 9 to 12 has a modified structure of vibratory actuator 10 where shaft section 80 is disposed at the center of case 21 along the longitudinal direction, and cores 501 and 502 are disposed on the opposite sides apart in the direction orthogonal to the axial direction of shaft section 80. Configuration elements of vibratory actuator 10B that are analogous to those of vibratory actuator 10 are assigned the same names and the same symbols, and the description of these elements is omitted. Configuration elements that are different only in shape are assigned the same names and are described.

That is, vibratory actuator 10B has an arc flat plate shape having a flat arc shape in a sectional view.

Vibratory actuator 10B includes stationary body 20B, movable body 30B, and metal springs 40.

Stationary body 20B includes case 21B, frame 22B to which power supply section 25 is connected, shaft section 80, magnets 60B, coils 70B, and cover 24 (see FIG. 11). Movable body 30B includes cores 50B and bearing section 52B.

Case 21B includes a peripheral wall section having an arc shape in a side view. Shaft section 80 is disposed across the inside of case 21B via frame 22B. Case 21B is a container having an arc shape in a side view. Bottom surface 27 of case 21B is a curved surface. Cover 24, which is an arc-shaped plate, is attached to an opening of case 21B, thereby forming a hollow electromagnetic shield.

In case 21B, casing-shaped frame 22B is attached. Shaft section 80 disposed in the curved direction (orthogonal to circumferential direction) via frame 22B is supported in case 21B. Coils 70B and magnets 60B are fixed to frame 22B.

Shaft section 80 is disposed on a line parallel to the central axis of the circle including the arc (curved surface) of case 21B as its circumference, and is disposed between opposite arms of frame 22B.

Shaft section 80 is disposed between the pair of magnets 60B in parallel to magnets 60B. Coils 70B are disposed in parallel to each other, between magnets 60B and shaft section 80, along the longitudinal direction (the direction parallel to the central direction of the arc).

Shaft section 80 is rotatably inserted into bearing section 52B of movable body 30B. Metal springs 40 are externally applied around parts protruding from bearing section 52B in the longitudinal direction, so as to clamp bearing section 52B. Bearing section 52B is urged by clamping metal springs 40 so as to be disposed at the center in the longitudinal direction.

Bearing section 52B is disposed between arc-shaped cores 501 and 502 extending in the longitudinal direction, and is formed integrally with cores 501 and 502.

Cores 501 and 502 are disposed in coils 70B in a non-contact manner movable in the longitudinal direction. One end surfaces (facing surfaces) 51B of cores 501 and 502, between which bearing section 52B intervenes and which are apart from each other in the circumferential direction, are disposed to face respective magnetic pole surfaces 61B of magnets 60B. Here, facing surfaces 51B are disposed in parallel to respective magnetic pole surfaces 61B with gaps being secured therebetween.

As described above, in case 21B, cores 50B, which are the magnetic bodies, and magnets 60B are disposed to face each other, thereby causing magnetic attractive forces between cores 50B and corresponding magnets 60B. Elastic support is achieved by the magnetic attractive forces with magnets 60B, what are called magnetic springs. The state is brought by the magnetic attractive forces into a state where movable body 30B including cores 50B is preliminarily pressed, that is, a state where the rotations of cores 50B about shaft section 80 are regulated (what is called rotation stop) and are positioned (positioning of the movable body).

Thus configured movable body 30B (cores 50B and bearing section 52B) is elastically supported by metal springs 40 and the magnetic springs due to magnetic attractive forces caused by cores 50B and magnets 60B.

That is, vibratory actuator 10B has the structure where movable body 30B is preliminarily pressed by the magnetic attractive forces to prevent movable body 30B from rotating and to achieve positioning, thus allowing stable movable body 30B. Movable body 30B reciprocatorily vibrates by electromagnetic actions due to magnets 60B and cores 50B and coils 70B. The power is supplied from power supply section 25 to coils 70B, thereby exciting cores 50B to move reciprocatorily (vibrate reciprocatorily) in the longitudinal direction, i.e., the F directions (see FIG. 10) orthogonal to the circumferential direction. That is, movable body 30B reciprocatorily vibrates with respect to stationary body 20B in the direction along facing surfaces 51B and 61B of magnets 60B and cores 50B.

For example, as shown in FIG. 12, the polarities of magnets 60B (magnetic pole surfaces 61B) are the N-poles and S-poles arranged in the longitudinal direction, which are disposed so as to be arranged to face one end surfaces (facing surfaces) 51B serving as the magnetic pole surfaces of cores 50B in the longitudinal direction. Current is supplied to coils 70B to cause the polarity of core 501 to be the N-pole and cause the polarity of core 502 to be the S-pole. More specifically, alternate current having a frequency substantially equal to resonant frequency $f_r$ of movable body 30B is supplied from power supply section 25 to coils 70B, thereby exciting coils 70B. Cores 501 and 502 are driven in F1 direction. When current is supplied to coils 70B in the inverted directions to cause the polarities of cores 501 and 502 to be the S-poles and N-poles, movable body 30B including cores 501 and 502 are driven in −F1 direction that is opposite to F1 direction.

According to repetition of this process, cores 501 and 502 of movable body 30B reciprocatorily vibrate in both directions F (F1 direction and −F1 direction) along the longitudinal directions with reference to the positions (here, the positions where the centers of facing surfaces 51B in the longitudinal directions coincide with the centers of the N-poles and S-poles of magnets 60B) serving as drive reference positions. This drive principle is an operation principle analogous to that of vibratory actuator 10 in Embodiment 1 achieved by equations 1, 2 and 3 described above.

As described above, in vibratory actuator 10B, cores 50B, i.e., facing surfaces 51B of cores 50B, are magnetized by alternate current waves input from power supply section 25 into coils 70B. Magnetic attractive forces and repulsions effectively occur to magnets 60B on stationary body 20B side, and movable body 30B can be effectively driven.

According to vibratory actuator 10B, advantageous effects analogous to <Advantageous Effect 1> to <Advantageous Effect 8> can be obtained, and furthermore the following advantageous effect can be obtained.

Vibratory actuator 10B is in the state where movable body 30B is preliminarily pressed by the magnetic attractive forces between cores 501 and 502 and magnets 60B on both the sides of shaft section 80. In this configuration, supply of electricity to coils 70B reciprocatorily moves movable body 30B in the direction of shaft section 80 in proximity to the other surface of bottom surface 27. Consequently, movable body 30B can reciprocatorily vibrate in the longitudinal direction in a well-balanced manner in the circumferential direction.

In the configuration of vibratory actuator 10B of Embodiment 2 shown in FIGS. 9 to 12, the configuration elements including the magnetic circuit may be formed as they are, while the external shape may be changed from the flat shape having the arc shape in a sectional view to another shape, such as a flat planar shape.

Modification Example of Embodiment 2

Figure 13:
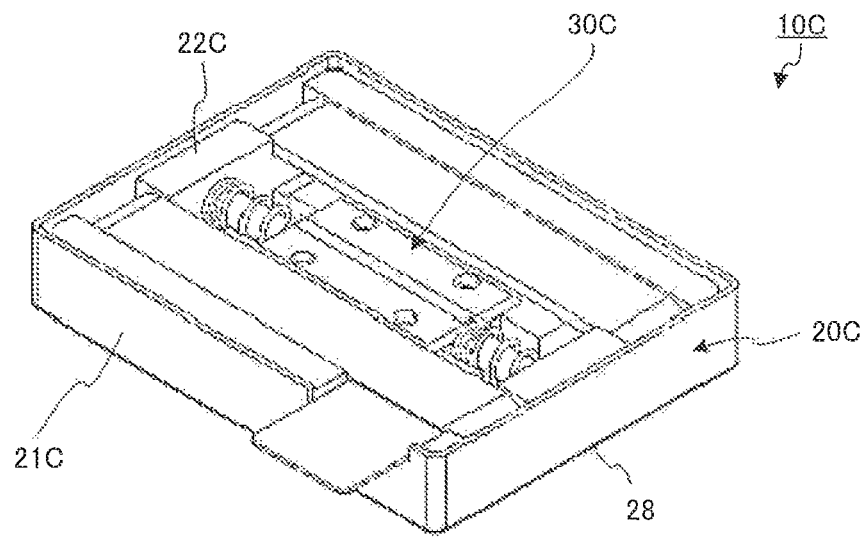
FIG. 13 illustrates a perspective view of an internal configuration of a vibratory actuator of a modification example of Embodiment 2 according to the present invention.
Figure 14:
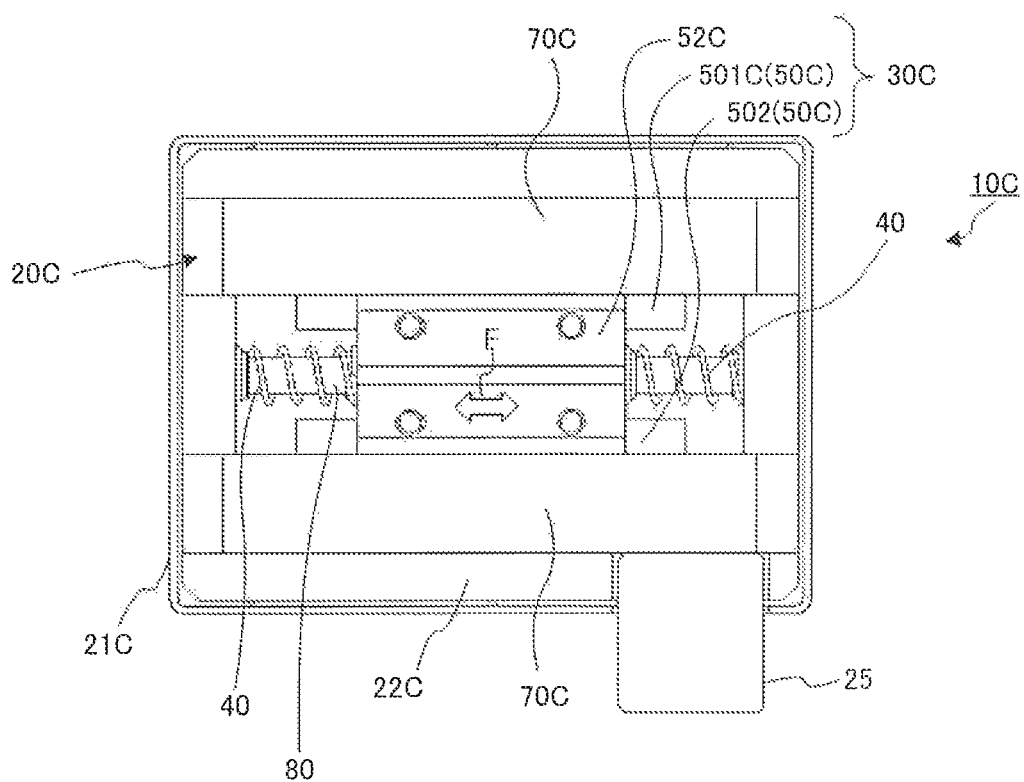
FIG. 14 illustrates a plan view showing an internal configuration of the vibratory actuator of the modification example of Embodiment 2.
Figure 15:
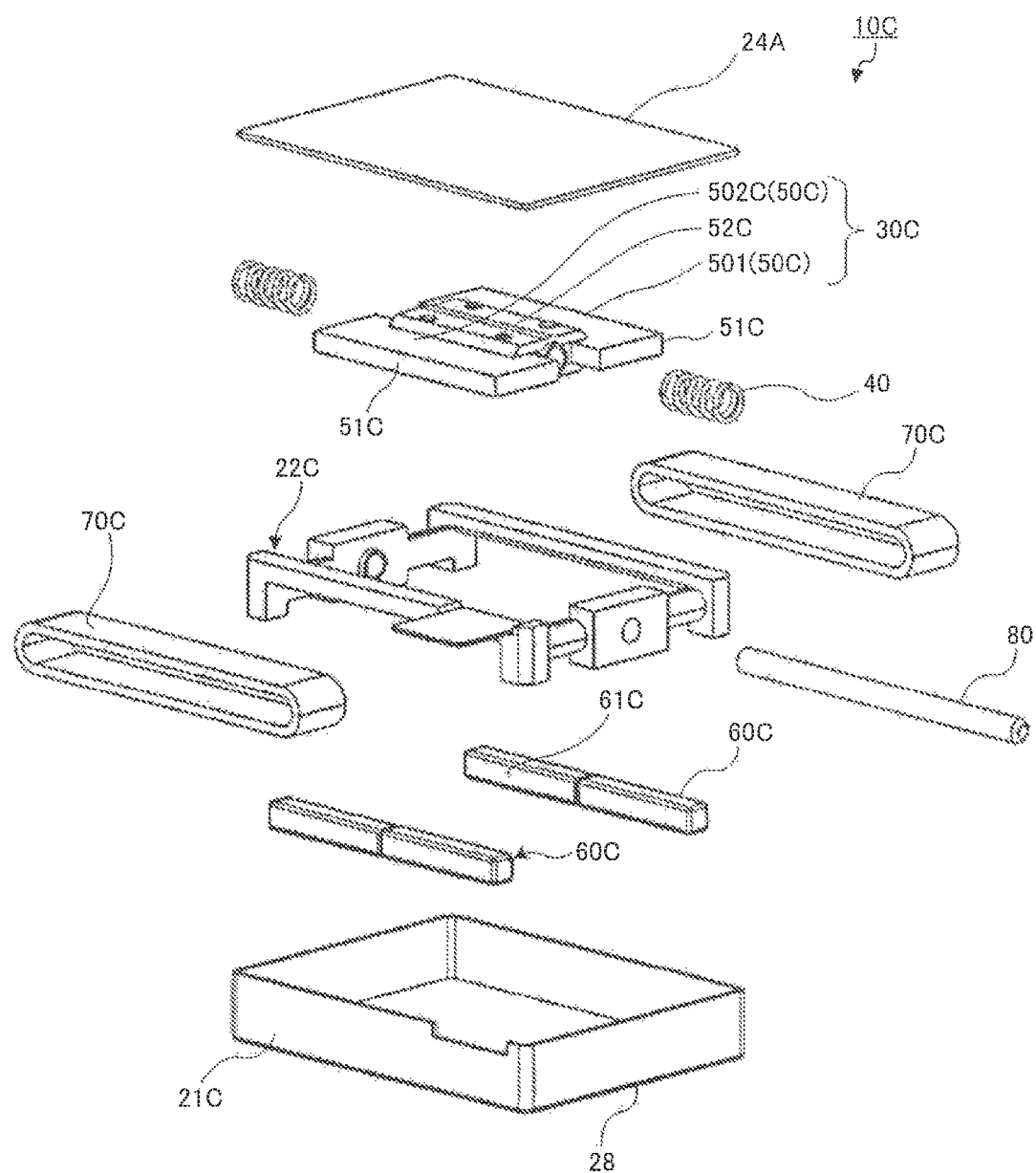
FIG. 15 illustrates an exploded perspective view of the vibratory actuator of the modification example of Embodiment 2.

FIGS. 13 to 15 illustrate vibratory actuator 10C that is a modification example of vibratory actuator 10B.

As shown in FIG. 13, vibratory actuator 10C has a planar external shape.

Vibratory actuator 10C is vibratory actuator 10 whose external shape is a planar shape. Each configuration member is changed from the arc shape to a planar shape accordingly.

Vibratory actuator 10C includes configuration elements having functions analogous to the functions of the configuration elements of vibratory actuator 10.

Vibratory actuator 10C includes stationary body 20C, and movable body 30C.

Stationary body 20C includes rectangular box-shaped case 21C, frame 22C to which power supply section 25 is connected, shaft section 80, magnets 60C, coils 70C, and cover 24A.

Movable body 30C includes cores 501C and 502C and bearing section 52C, and is supported movably in F directions via frame 22C with respect to stationary body 20C.

Case 21C includes rectangular bottom surface 28 that is a vibration transmitting surface and functions as the vibration transmitting surface, and a rectangular casing-shaped peripheral wall section. Shaft section 80 is disposed across the inside of case 21C via rectangular casing-shaped frame 22C. Cover 24A, which is a planar-shaped plate, is attached to an opening of case 21C, thereby forming a hollow electromagnetic shield.

Casing-shaped frame 22C is attached in case 21C. Shaft section 80 extending in the longitudinal direction is disposed at the center in the short-hand direction of frame 22C. Shaft section 80 is disposed between the pair of magnets 60C in parallel to magnets 60C. Coils 70C are disposed in parallel to each other, between magnets 60C and shaft section 80, along the longitudinal direction (the direction parallel to the central direction of the arc).

Shaft section 80 is rotatably inserted into bearing section 52C of movable body 30C. Metal springs 40 are externally applied around parts of shaft section 80 protruding from bearing section 52C in the longitudinal direction, so as to clamp bearing section 52C. Bearing section 52C is urged by clamping metal springs 40 so as to be disposed at the center in the longitudinal direction.

Movable body 30 includes planar cores 501C and 502C on both the sides of shaft section 80 via bearing section 52C. Cores 501C and 502C are movably disposed in the longitudinal directions (the directions orthogonal to the winding directions of the respective coils) in coils 70C.

One end surfaces 51C of cores 501C and 502C, between which bearing section 52C intervenes and which are apart from each other in the circumferential direction, are disposed to face respective magnetic pole surfaces 61C of magnets 60C. Here, one end surfaces 51C are disposed in parallel to respective magnetic pole surfaces 61C with gaps being secured therebetween. As described above, in case 21C, cores 50C, which are the magnetic bodies, and magnets 60C are disposed to face each other, thereby causing magnetic attractive forces between cores 50C and corresponding magnets 60C. Elastic support is achieved by the magnetic attractive forces with magnets 60C, what are called magnetic springs. The state is brought by the magnetic attractive forces into a state where movable body 30C including cores 50C is preliminarily pressed, that is, a state where the rotations of cores 50C about shaft section 80 are regulated (what is called rotation stop) and are positioned (positioning of the movable body).

Thus configured movable body 30C (cores 50C and bearing section 52C) is elastically supported by metal springs 40 and the magnetic springs due to magnetic attractive forces caused by cores 50C and magnets 60C.

That is, vibratory actuator 10C has the structure where movable body 30C is preliminarily pressed by magnetic attractive forces to prevent movable body 30C from rotating and to achieve positioning, thus allowing stable movable body 30C. Movable body 30C reciprocatorily vibrates by electromagnetic actions due to magnets 60C and cores 50C and coils 70C. The power is supplied from power supply section 25 to coils 70C, thereby exciting cores 50C to move reciprocatorily (vibrate reciprocatorily) in the longitudinal direction, i.e., the F directions (see FIG. 10) orthogonal to the circumferential direction. That is, movable body 30C reciprocatorily vibrates with respect to stationary body 20C in the direction along facing surfaces 61C and 51C of magnets 60C and cores 50C. The configuration diagram of the magnetic circuit showing the drive principle of the reciprocating movement is analogous to the magnetic circuit configuration shown in FIG. 12.

According to vibratory actuators 10B and 10C of Embodiment 2 and its modification example, multiple magnets 60B and 60C and coils 70B and 70C can be arranged in stationary bodies 20B and 20C with mutual spaces (air gaps) being small. Vibratory actuators 10B and 10C include two thrust generating structures for driving movable bodies 30B and 30C, that is, two magnetic circuit structures.

Accordingly, thrusts occur at multiple sites. Consequently, high thrust outputs due to the magnetic circuits for driving movable bodies 30B and 30C can be achieved. Inclusion of multiple magnets 60B and 60C and multiple coils 70B and 70C can increase the sizes of the magnetic springs that include magnets 60B and 60C and coils 70B and 70C, reduce and alleviate the design requirements of the magnetic springs, and improve the design flexibility. According to vibratory actuator 10B of Embodiment 2, shaft section 80 that constitutes a support shaft portion at the center of frame 22B serves as a bent section, thereby allowing the external shape of vibratory actuator 10B to be a flat shape having an arc in a sectional view (also called an arch shape). That is, assembled movable body 30B is attached to frame 22B via shaft section 80, and subsequently coils 70B are attached to frame 22B, thus arranging these coils at the outer peripheries of cores 501 and 502. Consequently, improvement in assemblability can be facilitated.

Unlike the conventional VCM actuator, the air gaps between magnets 60B and 60C and cores 50B and 50C disposed in coils 70B and 70C are reduced, thereby allowing the magnetic efficiencies to be improved. In comparison with the case of the single thrust generating structure (the one series of the magnetic circuit), the magnetic pole areas become larger, thereby allowing the thrust to be securely achieved.

Embodiment 3

Figure 16:
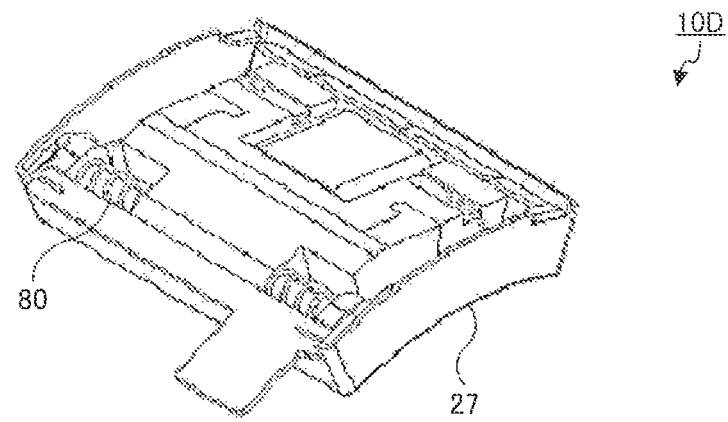
FIG. 16 illustrates a perspective view showing an internal configuration of a vibratory actuator of Embodiment 3 according to the present invention.
Figure 17:
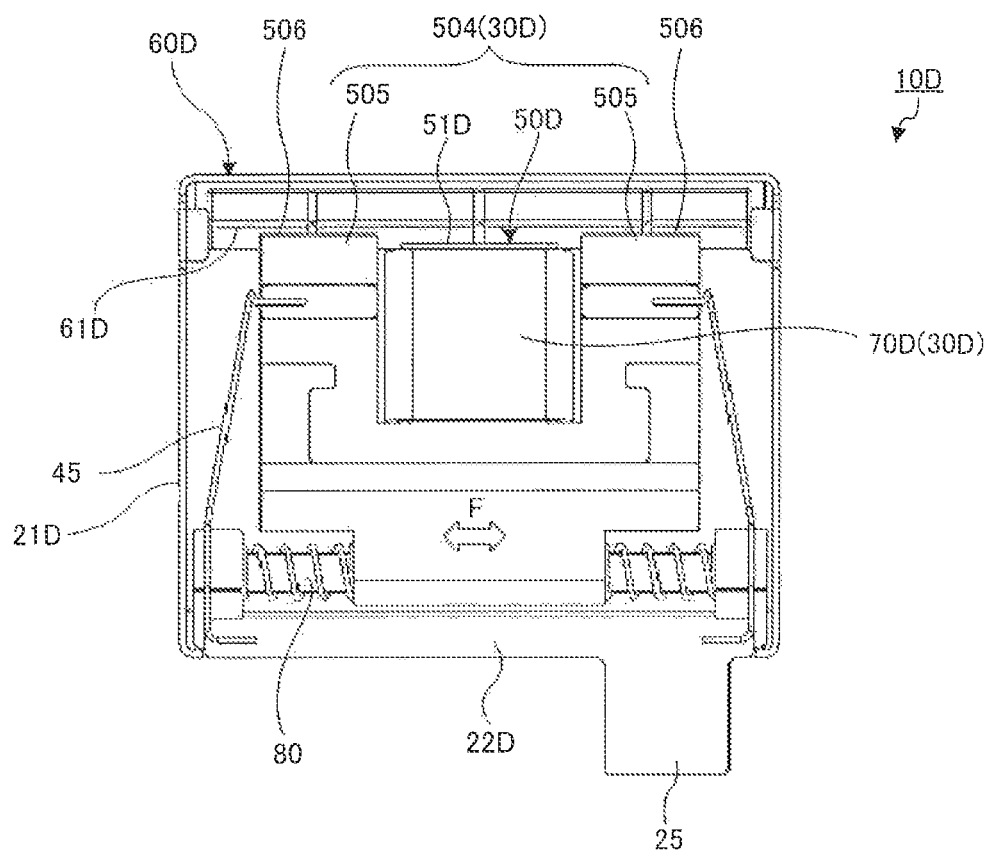
FIG. 17 illustrates a plan view showing an internal configuration of the vibratory actuator of Embodiment 3.
Figure 18:
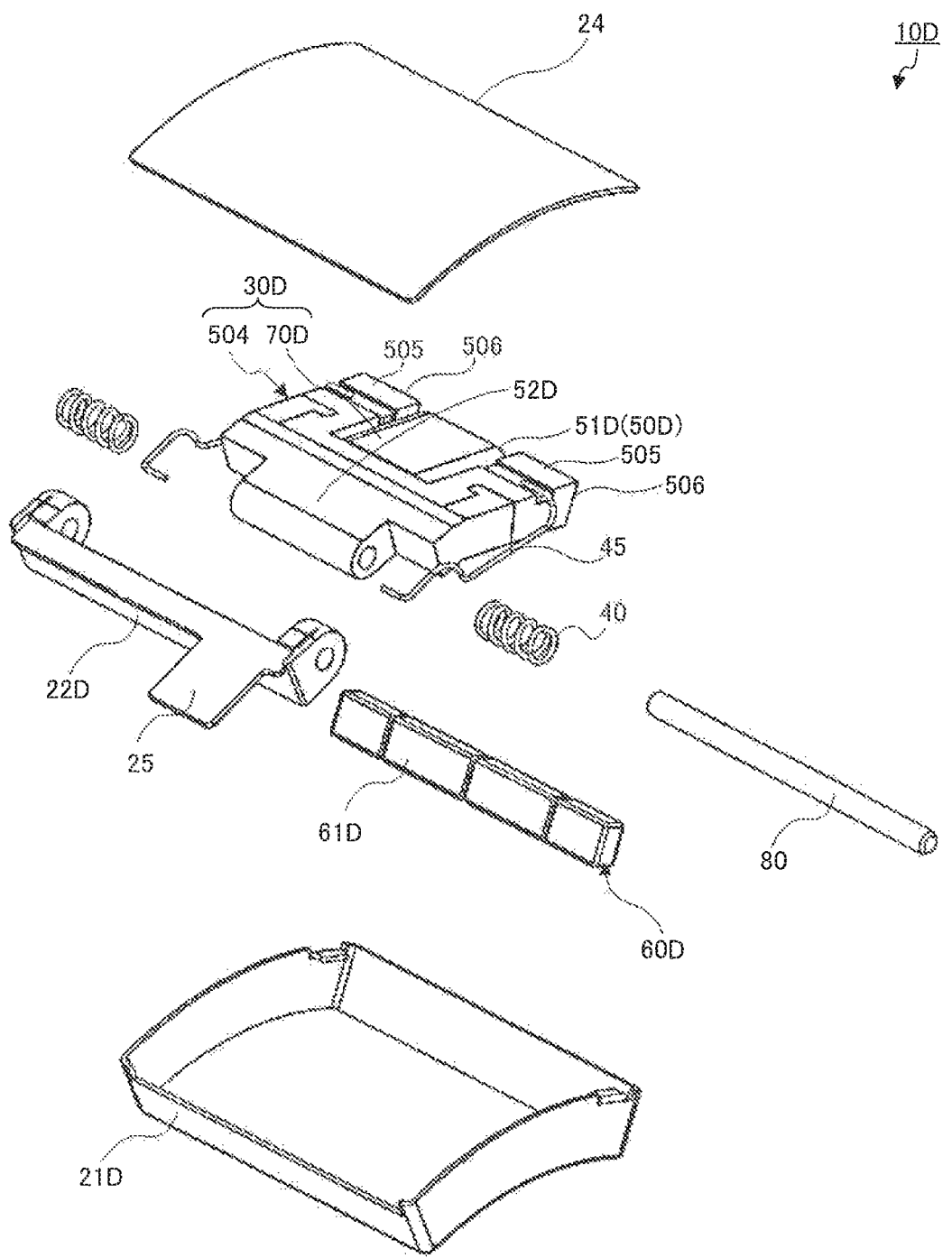
FIG. 18 illustrates an exploded perspective view of the vibratory actuator of Embodiment 3.
Figure 19:
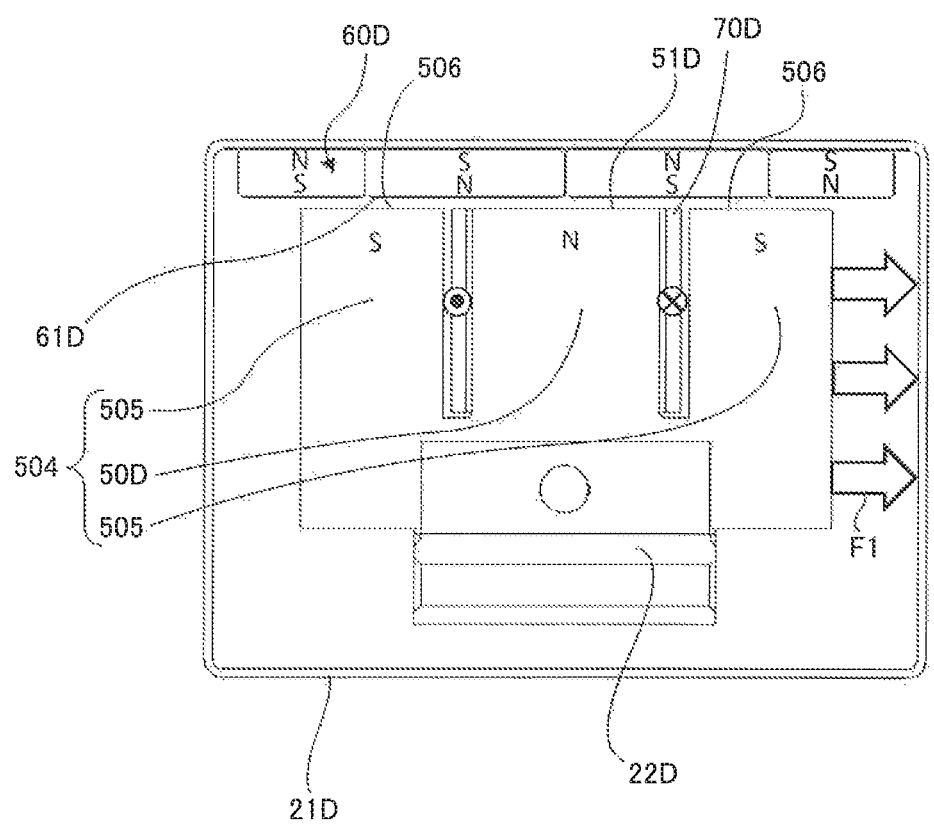
FIG. 19 illustrates a diagram for description of the movement of a movable body of the vibratory actuator of Embodiment 3.

FIG. 16 illustrates an external view showing a configuration of vibratory actuator 10D of Embodiment 3 according to the present invention. FIG. 17 illustrates a plan view showing an internal configuration of vibratory actuator 10D. FIG. 18 illustrates an exploded perspective view of vibratory actuator 10D. FIG. 19 illustrates a diagram for description of the movement of movable body 30D of vibratory actuator 10D. FIG. 19 illustrates a plan sectional view schematically showing a magnetic circuit configuration of vibratory actuator 10D, and shaft section 80 is omitted.

As with the magnetic circuit of vibratory actuator 10, vibratory actuator 10D shown in FIGS. 16 to 19 has the magnetic circuit structure which preliminarily presses the movable body and in which core 50D and coil 70D are provided for movable body 30D, and magnet 60D having multiple poles is provided for stationary body 20D. Configuration elements of vibratory actuator 10D that are analogous to those of vibratory actuator 10 are assigned the same names and the same symbols, and the description of these elements is omitted. Configuration elements that are different only in shape are assigned the same names and are described.

In vibratory actuator 10D, stationary body 20D includes magnet 60D having multiple magnetic poles (for example, two or four poles), and movable body 30D includes E-shaped core 504 having slits, and coil 70D disposed in the slits.

Vibratory actuator 10D has a flat planar shape having an arc shape in a sectional view (curved flat planar shape). Vibratory actuator 10D includes stationary body 20D, movable body 30D, and metal springs 40.

Stationary body 20D includes not only magnet 60D but also case 21D, holder 22D to which power supply section 25 is connected, shaft section 80, and cover 24 (see FIG. 18). Movable body 30D includes not only E-shaped core 504 including core 50D but also bearing section 52D.

Case 21D is formed as with case 21, and has a peripheral wall section having an arc shape in a side view, magnet 60D is internally disposed nearer to one side wall (back side wall) along the longitudinal direction via holder 22D, and shaft section 80 is disposed thereacross nearer to the other side wall.

Case 21D is a container having an arc shape in a sectional view. Bottom surface 27 of case 21D is a curved surface. Cover 24 that is an arc-shaped plate is attached to an upper opening, thereby forming a hollow electromagnetic shield.

Holder 22D supports movable body 30D via shaft section 80 movably in the axial direction in case 21D.

Shaft section 80 is disposed along the other side wall section, and is supported by holder 22D at the opposite ends through fixation by pressing insertion or adhesion. Shaft section 80 is disposed on a line parallel to the central axis of a circle including an arc (curved surface) of case 21D as its circumference.

Metal springs 40 are externally applied around parts of shaft section 80 protruding from bearing section 52D in the longitudinal direction, so as to clamp bearing section 52D. Bearing section 52D (E-shaped core 504 being in an analogous manner) is urged by clamping metal springs 40 so as to be disposed at the center in the longitudinal direction.

Magnet 60D includes magnetic pole surface 61D as multiple magnetic poles. In this embodiment, as shown in FIGS. 16 to 19, four magnetic poles are included. Magnet 60D is fixed (adhered in this case) onto the one side wall section so that different polarities can be arranged alternately in the longitudinal direction (axial central direction) of case 21D. Magnetic pole surface 61D is disposed in parallel to a surface positioned on a surface passing through the central axis of the arc.

Facing surfaces 51D and 506 of E-shaped core 504 of movable body 30D are disposed to be parallel to and to face magnetic poles (magnetic pole surface) 61D of magnet 60D disposed along the one side wall of case 21.

E-shaped core 504 is formed in an E-shape in a plan view, and is formed so as to conform to the shape of case 21D, more specifically, formed to have a flat planar shape that is an arc shape in a sectional view to conform to bottom surface 27 having a curved surface of case 21D. More specifically, E-shaped core 504 has an E-shape where slits are formed so as to divide a portion on one side along the longitudinal direction of the flat plate having an arc shape in a sectional view into three pieces. E-shaped core 504 includes: core 50D around which coil 70D is wound is formed as a central protruding section (central protruding pole); and core pieces 505 that are adjacent to core 50D serving as the central protruding section on both the sides in the longitudinal direction and protrude toward magnet 60D as with core 50D.

Coil 70D is wound around the outer periphery of core 50D so as to encircle a part of core 50D that faces magnetic pole surface 61D of magnet 60D. Coil 70D is connected to wire spring 45 that is a flexible conductive member. Coil 70D is supplied with electricity via connected wire spring 45 from power supply section 25 connected to an external power source.

Wire spring (also called suspension wire) 45 has a conductivity, and is connected to coil 70D and power supply section 25.

Core 50D and core pieces 505 are formed integrally with each other.

In case 21D, E-shaped core 504 is attached movably in the longitudinal direction to stationary body 20D via shaft section 80 inserted into bearing section 52D on a side opposite to the side where facing surfaces 51D and 506 face magnetic pole surface 61D of magnet 60D.

As described above, according to vibratory actuator 10D, in case 21D, core 50D that is the magnetic body (more specifically, E-shaped core 504) and magnet 60D are disposed to face each other in the direction orthogonal to the drive direction of movable body 30D. Accordingly, the magnetic attractive force occurs between core 50D and magnet 60D. Movable body 30D is elastically supported by the magnetic attractive force, or what is called a magnetic spring. Even if power is not supplied to coil 70D, the magnetic attractive force brings movable body 30D including core 50D into the state of being preliminarily pressed. Accordingly, core 50D is brought into a state where the rotation about shaft section 80 is regulated (what is called rotation stop) and positioning is made with respect to stationary body 20D (mainly case 21D etc.) (positioning of the movable body).

Thus configured movable body 30D (core 50D and bearing section 52D) is elastically supported by metal springs 40 and the magnetic spring due to the magnetic attractive force caused by core 50D and magnet 60D.

Stationary body 20D includes not only case 21D and cover 24 but also four-pole magnet 60D adhering to case 21D, shaft section 80, and holder 22D. Movable body 30D includes E-shaped core 504, air-core coil 70D adhering and fixed to core 50D, and bearing section 52D that is a sintered sleeve caulked and fixed to core 50D and core pieces 505. The core excited by the coil is magnetized, and causes a thrust according to the relationship between the magnetic poles of the magnet disposed opposite thereto.

The power is supplied from power supply section 25 to coil 70D, thereby exciting core 50D to move reciprocatorily (vibrate reciprocatorily) in the longitudinal direction, i.e., the F directions (see FIG. 17) orthogonal to the circumferential direction.

For example, as shown in FIG. 19, the polarities of magnet 60D (magnetic pole surface 61D) are the N-poles and S-poles arranged in the longitudinal direction, which are disposed so as to be arranged to face facing surfaces 51D and 506 serving as the magnetic pole surface of core 50D in the longitudinal direction. Alternate current having a frequency substantially equal to resonant frequency $f_r$ of movable body 30D is supplied from power supply section 25 to coil 70D, thereby exciting coil 70D. For example, current is supplied to coil 70D to cause the polarity of core 50D to be the N-pole and cause core pieces 505, between which core 50D intervenes, to be the S-pole. Accordingly, core 50D and core pieces 505 (E-shaped core 504) move in F1 direction. When current is supplied to coil 70D in the inverted direction to cause the polarities of core 50D and core pieces 505 to be the S-pole and N-poles, movable body 30D that includes E-shaped core 504 including core 50D and core pieces 505 are driven in −F1 direction that is opposite to F1 direction.

According to repetition of this process, cores 501 and 502 of movable body 30D reciprocatorily vibrate in both directions F (F1 direction and −F1 direction) along the longitudinal directions with reference to the positions (here, the positions where the centers of facing surface 51D in the longitudinal directions coincide with the centers of the N-poles and S-poles of magnets 60D) serving as drive reference positions. This drive principle is an operation principle analogous to that of vibratory actuator 10 in Embodiment 1 achieved by equations 1, 2 and 3 described above.

As described above, in vibratory actuator 10D, core 50D, i.e., facing surface 51D of core 50D, is magnetized by alternate current waves input from power supply section 25 into coil 70D. The magnetic attractive force and repulsion effectively occur to magnet 60D on stationary body 20D side, and movable body 30D can be effectively driven.

According to vibratory actuator 10D, advantageous effects analogous to <Advantageous Effect 1> to <Advantageous Effect 8> can be obtained, and furthermore the following advantageous effect can be obtained.

In E-shaped core 504 of movable body 30D, multiple different facing surfaces 51D and 506 serving as magnetic pole surfaces are disposed so that facing surface 51D at the center can intervene between facing surfaces 506 having the magnetic pole different from that of facing surface 51D on both the sides of facing surface 51D in the longitudinal direction. Accordingly, the thrust can be exerted in a well-balanced manner in the longitudinal direction while movable body 30D is moved by the magnetic attractive force and magnetic repulsion.

Coil 70D is thus included in movable body 30D. Consequently, the mass of movable body 30D can be increased, which can facilitate a high output. In comparison with the VCM scheme, the magnetic resistance can be reduced, the conversion efficiency can be improved, and a high output can be achieved. Furthermore, the number of magnetic poles can be increased. Consequently, in comparison with a configuration where the number of magnetic poles of the cores and the magnets is one or two, not only the conversion efficiency but also the magnetic spring force is increased with increase in the number of magnetic poles accordingly. Consequently, the design requirements for springs are alleviated, and improvement in the design flexibility of vibratory actuator 10D can be facilitated.

In the configuration of vibratory actuator 10D of Embodiment 3 shown in FIGS. 16 to 19, the configuration elements including the magnetic circuit may be formed as they are, while the external shape may be changed from the flat shape having the arc shape in a sectional view to another shape, such as a flat planar shape.

Modification Example of Embodiment 3

Figure 20:
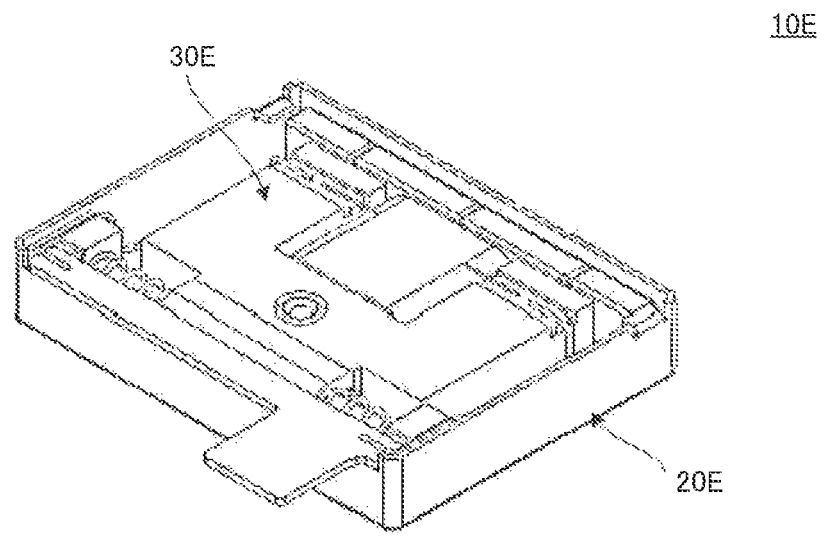
FIG. 20 illustrates a perspective view of an internal configuration of a vibratory actuator of a modification example of Embodiment 3 according to the present invention.
Figure 21:
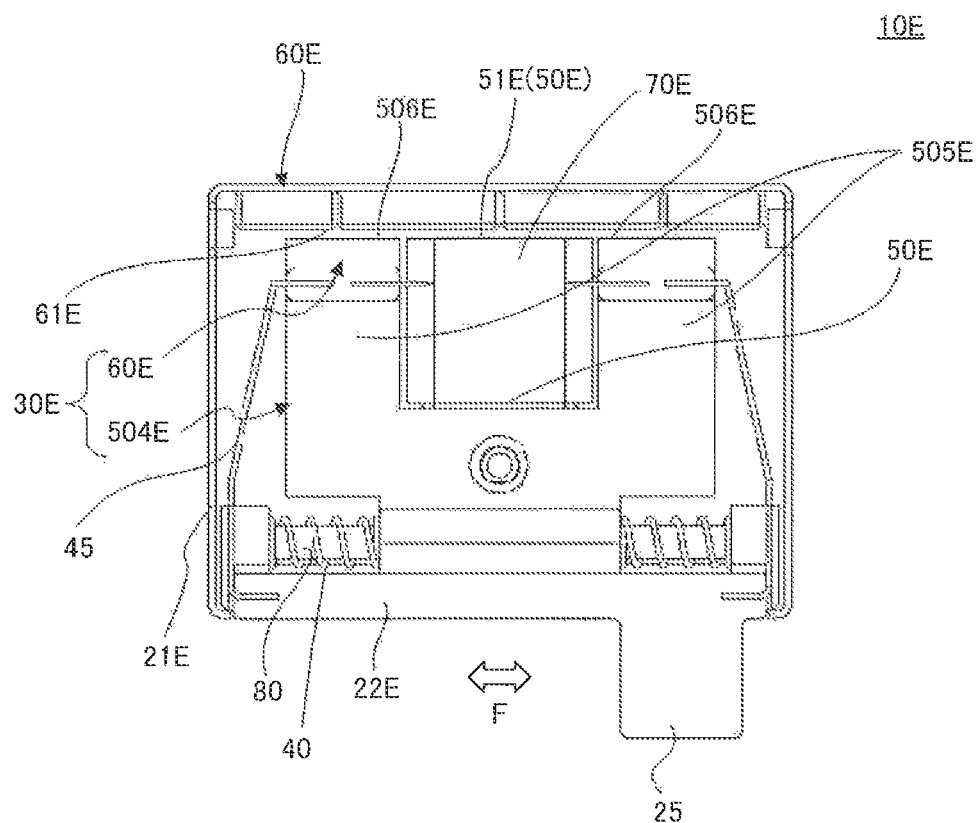
FIG. 21 illustrates a plan view showing an internal configuration of the vibratory actuator of the modification example of Embodiment 3.
Figure 22:
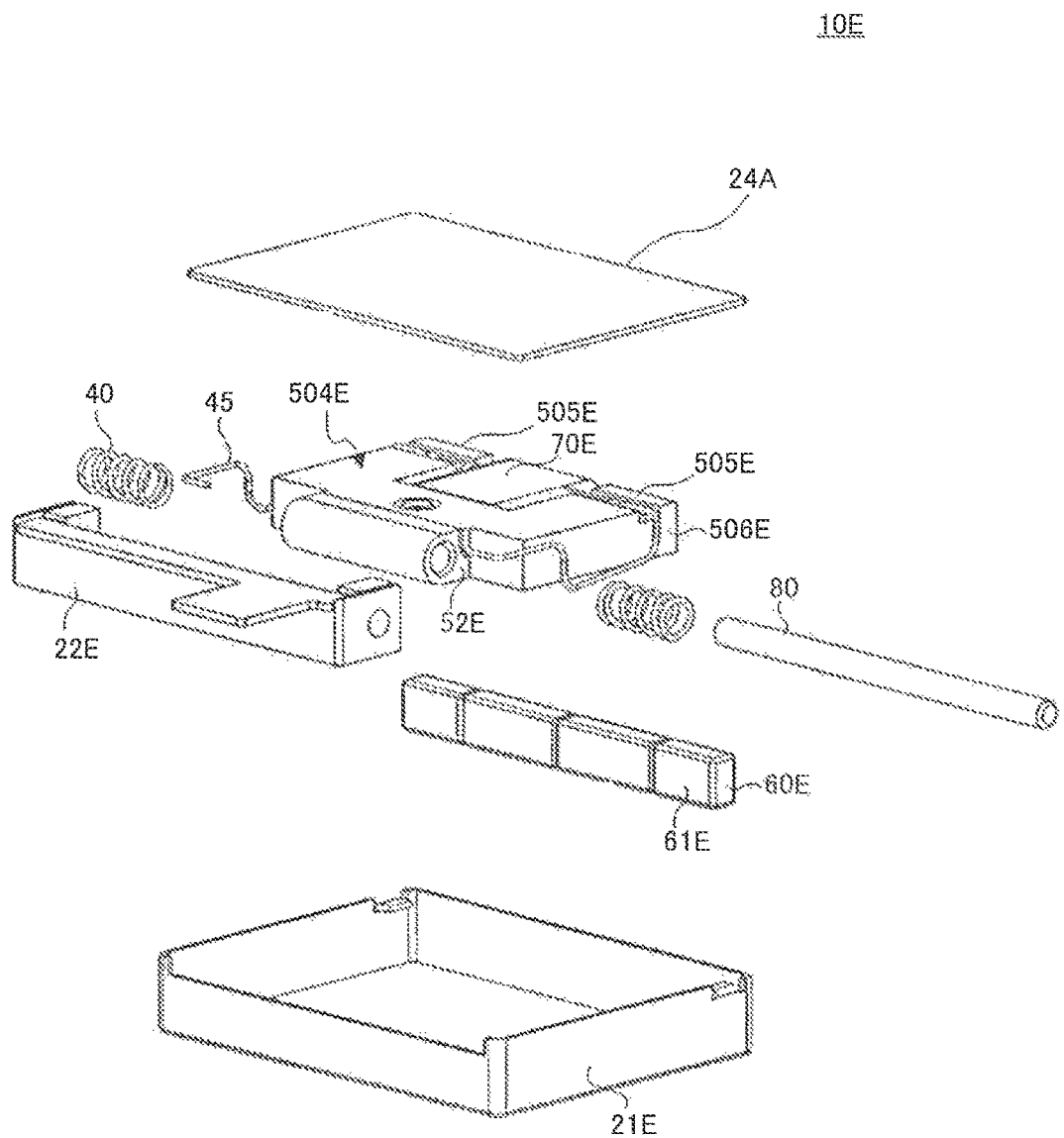
FIG. 22 illustrates an exploded perspective view of the vibratory actuator of the modification example of Embodiment 3.

FIGS. 20 to 22 illustrate vibratory actuator 10E that is a modification example of vibratory actuator 10D.

As shown in FIG. 20, vibratory actuator 10E has a planar external shape.

Vibratory actuator 10E is vibratory actuator 10 whose external shape is a planar shape. Each configuration member is changed from the arc shape to a planar shape accordingly.

Vibratory actuator 10E includes configuration elements having functions analogous to the functions of the configuration elements of vibratory actuator 10D, and has a magnetic circuit structure that preliminarily presses the movable body as with the magnetic circuit of vibratory actuator 10D. Configuration elements of vibratory actuator 10E that are analogous to those of vibratory actuator 10D are assigned the same names and the same symbols, and the description of these elements is omitted. Configuration elements that are different only in shape are assigned the same names and are described. The magnetic circuit configuration of vibratory actuator 10E is analogous to the magnetic circuit configuration of vibratory actuator 10D shown in FIG. 19. Accordingly, the magnetic circuit configuration of vibratory actuator 10E is described with reference to FIG. 19.

Vibratory actuator 10E includes stationary body 20E, movable body 30E, and metal springs 40. Stationary body 20E includes magnet 60E having multiple magnetic poles (for example, two or four poles), and movable body 30E includes E-shaped core 504E having slits, and coil 70E disposed in the slits.

Vibratory actuator 10E has a flat planar shape having an arc shape in a sectional view (curved flat planar shape).

As shown in FIGS. 21 and 22, stationary body 20E includes not only magnet 60E but also rectangular box-shaped case 21E, holder 22E to which power supply section 25 is connected, shaft section 80, and cover 24A. Movable body 30E includes not only E-shaped core 504E including core 50E but also bearing section 52E.

Shaft section 80 is disposed via holder 22E across the inside of case 21E in the longitudinal direction nearer to the other side wall (front side wall). On the one side along the longitudinal direction on the side opposite to shaft section 80, magnet 60E is attached to the other side wall so that the alternately different magnetic pole surfaces can be disposed in the longitudinal direction.

One side part of planar E-shaped core 504E having an E-shape in a plan view is externally applied movably in the longitudinal direction around shaft section 80.

E-shaped core 504E has an E-shape where slits are formed so as to divide a portion on one side along the longitudinal direction of the flat plate into three pieces. E-shaped core 504E includes: core 50E around which coil 70E is wound is formed as a central protruding section (central protruding pole); and core pieces 505E that are adjacent to the central protruding section on both the sides in the longitudinal direction and protrude toward magnet 60E as with core 50E.

In E-shaped core 504E, facing surfaces 51E and 506E are disposed to be in parallel to and to face magnetic pole (magnetic pole surface) 61E of magnet 60E.

Holder 22E supports movable body 30E via shaft section 80 movably in the axial direction in case 21E. The structure around shaft section 80 is analogous to that of shaft section 80 of vibratory actuator 10D. Accordingly, detailed description thereof is omitted.

Coil 70E is wound around the outer periphery of core 50E so as to encircle facing surface 51E of core 50E that faces magnetic pole surface 61E of magnet 60E. Coil 70E is supplied with electricity from power supply section 25 via connected wire spring 45.

According to vibratory actuator 10E, in case 21E, core 50E that is the magnetic body (more specifically, E-shaped core 504E) and magnet 60E are disposed to face each other in the direction orthogonal to the drive direction of movable body 30E. Accordingly, the magnetic attractive force occurs between core 50E and magnet 60E. Movable body 30E is elastically supported by the magnetic attractive force, or what is called a magnetic spring. Even if power is not supplied to coil 70E, the magnetic attractive force brings movable body 30E including core 50E into the state of being preliminarily pressed. Accordingly, core 50E is brought into a state where the rotation about shaft section 80 is regulated (what is called rotation stop) and positioning is made with respect to stationary body 20E (mainly case 21E etc.) (positioning of the movable body).

Thus configured movable body 30E (core 50E and bearing section 52E) is elastically supported by metal springs 40 and the magnetic spring due to the magnetic attractive force caused by core 50E and magnet 60E.

Core 50E (E-shaped core 504E) excited by coil 70E is magnetized, and causes a thrust according to the relationship between the magnetic poles of magnet 60E disposed opposite thereto.

The power is supplied from power supply section 25 to coil 70E, thereby exciting core 50E to move reciprocatorily (vibrate reciprocatorily) in the longitudinal direction, i.e., the F directions (as with the magnetic circuit configuration shown in FIG. 19) orthogonal to the circumferential direction.

For example, the polarities of magnet 60E (magnetic pole surface 61E) are the N-poles and S-poles (see FIG. 19) arranged in the longitudinal direction, which are disposed so as to be arranged to face facing surfaces 51E and 506E serving as the magnetic pole surface of core 50E in the longitudinal direction. Alternate current having a frequency substantially equal to resonant frequency $f_r$ of movable body 30E is supplied from power supply section 25 to coil 70E, thereby exciting coil 70E. For example, current is supplied to coil 70E to cause the polarity of core 50E to be the N-pole and cause core pieces 505, between which core 50E intervenes, to be the S-pole. Accordingly, core 50E and core pieces 505 (E-shaped core 504E) drive in F1 direction. When current is supplied to coil 70E in the inverted direction to cause the polarities of core 50E and core pieces 505 to be the S-pole and N-poles, movable body 30E that includes E-shaped core 504E including core 50E and 505E are driven in −F1 direction that is opposite to F1 direction.

According to repetition of this process, cores 50E and 502E of movable body 30E reciprocatorily vibrate in both directions F (F1 direction and −F1 direction) along the longitudinal directions with reference to the positions (here, the positions where the centers of facing surface 51E in the longitudinal directions coincide with the centers of the N-poles and S-poles of magnets 60E) serving as drive reference positions. This drive principle is an operation principle analogous to that of vibratory actuator 10 in Embodiment 1 achieved by equations 1, 2 and 3 described above.

Embodiment 4

Figure 23:
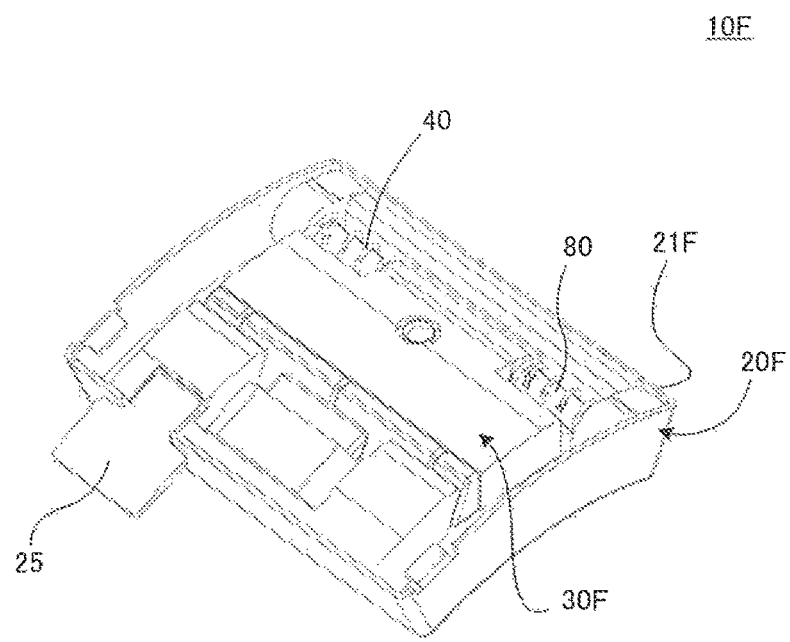
FIG. 23 illustrates a perspective view showing an internal configuration of a vibratory actuator of Embodiment 4 according to the present invention.
Figure 24:
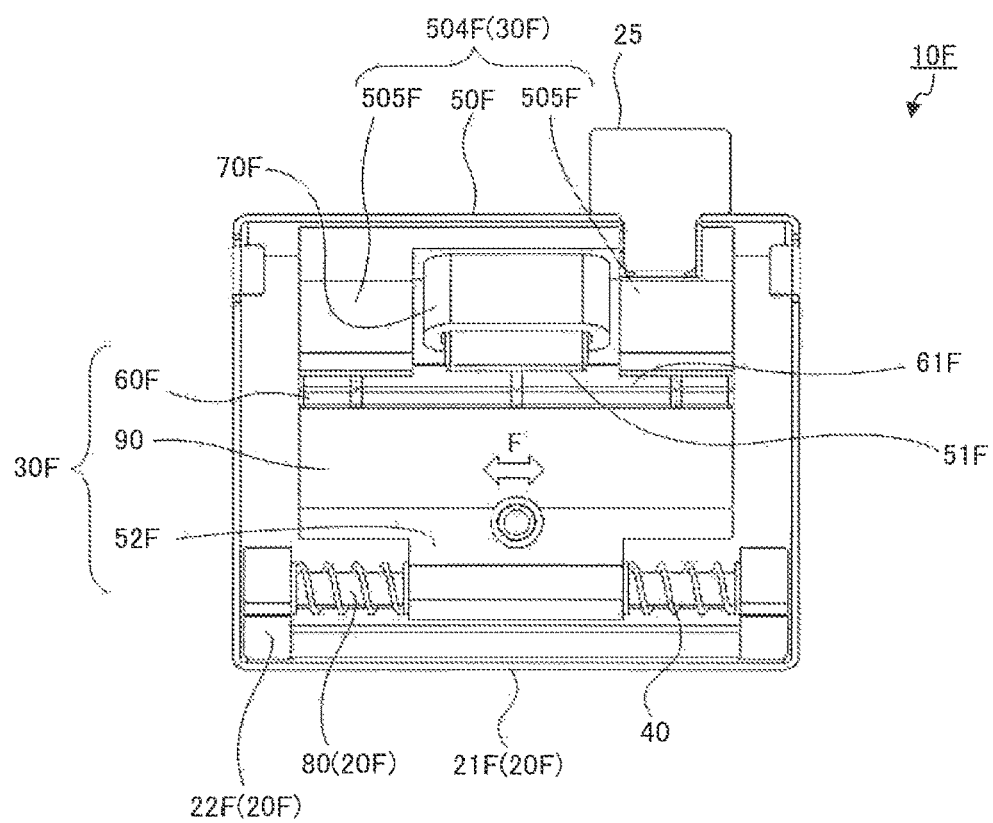
FIG. 24 illustrates a plan view showing an internal configuration of the vibratory actuator of Embodiment 4.
Figure 25:
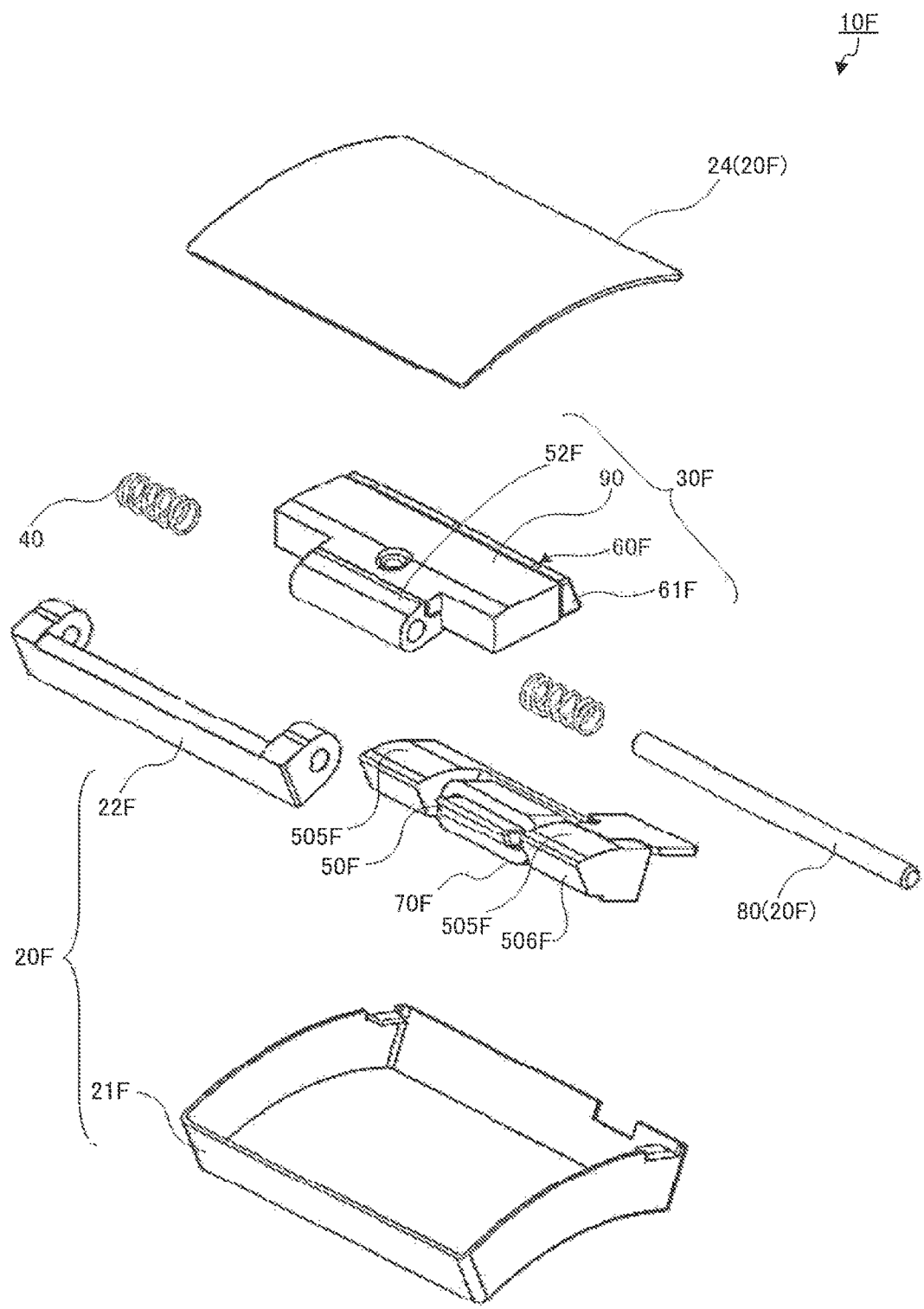
FIG. 25 illustrates an exploded perspective view of the vibratory actuator of Embodiment 4.
Figure 26:
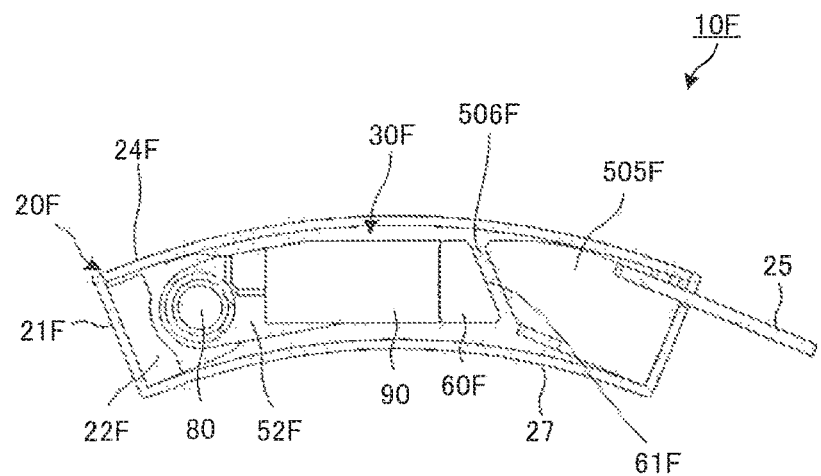
FIG. 26 illustrates a side view showing the positional relationship among the main components of the vibratory actuator of Embodiment 4.
Figure 27:
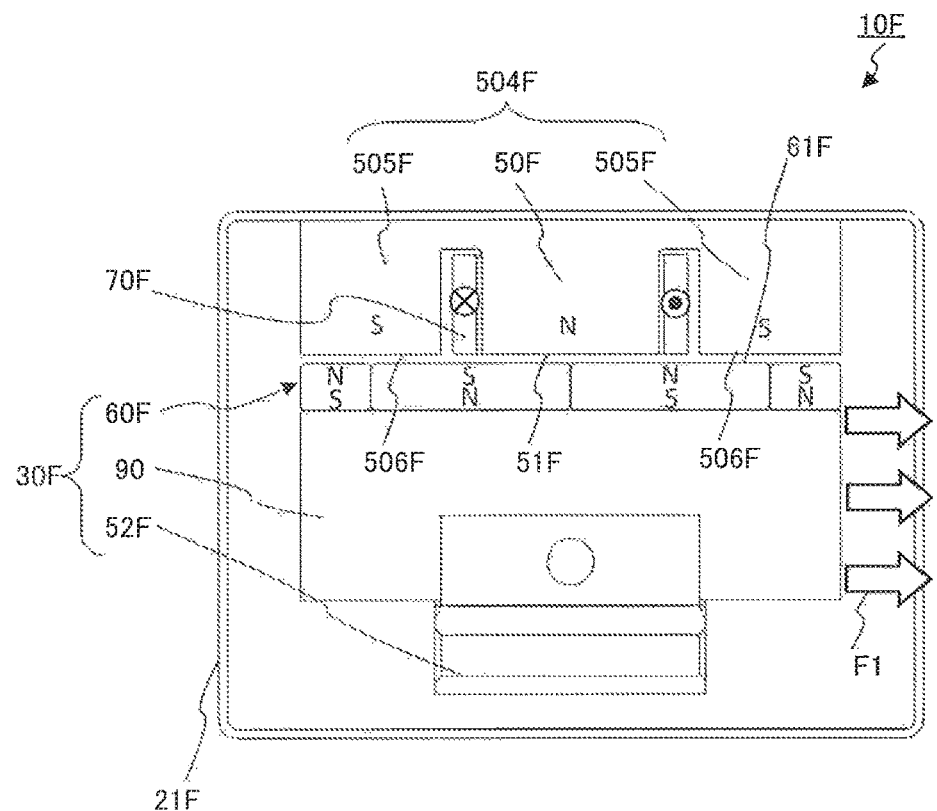
FIG. 27 illustrates a diagram for description of the movement of a movable body of the vibratory actuator of Embodiment 4.

FIG. 23 illustrates an external view showing a configuration of vibratory actuator 10F of Embodiment 4 according to the present invention. FIG. 24 illustrates a plan view showing an internal configuration of vibratory actuator 10F. FIGS. 23 and 24 illustrate vibratory actuator 10F in a state where cover 24 is taken away so as to show the internal configuration. In an actual external view, the internal configuration is covered with this cover as with the vibratory actuator shown in FIG. 1. FIG. 25 illustrates an exploded perspective view of vibratory actuator 10F. FIG. 26 illustrates a side view showing the positional relationship among the main components of vibratory actuator 10F. FIG. 27 is a diagram for description of the operation of movable body 30F. More specifically, this diagram is a plan sectional view schematically illustrating the magnetic circuit configuration of vibratory actuator 10F. In FIG. 27, shaft section 80, holder 22F and the like are omitted.

Vibratory actuator 10F shown in FIGS. 23 to 27 has a magnetic circuit structure which preliminarily presses the movable body as with the magnetic circuit of vibratory actuator 10 and in which a magnet and yoke are provided for the movable body and a coil and a core are provided for the stationary body. Configuration elements of vibratory actuator 10F that are analogous to those of vibratory actuator 10 are assigned the same names and the same symbols, and the description of these elements is omitted. Configuration elements that are different only in shape are assigned the same names and are described.

As shown in FIG. 23, vibratory actuator 10F includes stationary body 20F, movable body 30F, and metal springs 40.

As shown in FIG. 24, stationary body 20F includes case 21F, holder 22F, shaft section 80, cover 24 (see FIG. 25), coil (air core) 70F and slits, and further includes E-shaped core 504F where coil 70F is disposed through the slits, and power supply section 25.

Meanwhile, movable body 30F includes: magnet 60F including multiple magnetic poles (for example, two or four poles) arranged alternately in the longitudinal direction; and yoke 90 to which magnet 60F and bearing section 52F are fixed.

Vibratory actuator 10F includes stationary body 20F having a flat planar external shape having an arc shape in a sectional view (curved flat planar shape).

Case 21F is formed as with case 21, and has a peripheral wall section having an arc shape in a side view. E-shaped core 504F is disposed nearer to one side wall (back side wall) along the longitudinal direction. Shaft section 80 is fixed via holder 22F nearer to the other side wall facing E-shaped core 504F in the circumferential direction.

Shaft section 80 is supported at its opposite ends by holder 22F in a state of being inserted into bearing section 52F of movable body 30F, and is disposed on a line parallel to the central axis of a circle including an arc (curved surface) of case 21F as its circumference. Cover 24 is attached to case 21F, thereby forming a hollow electromagnetic shield.

Holder 22F supports movable body 30F via shaft section 80 movably in the axial direction in case 21F.

Externally applied metal springs 40 are externally applied around parts of shaft section 80 protruding from bearing section 52F in the longitudinal direction, so as to clamp bearing section 52F. Bearing section 52F and E-shaped core 504F are urged by clamping metal springs 40 so as to be disposed at the center in the longitudinal direction.

E-shaped core 504F is formed in an E-shape in a plan view, and is formed in conformity with the shape of case 21F. In detail, this core is formed in a flat planar shape having an arc shape in a sectional view in conformity with bottom surface 27 that is the curved surface section of case 21F, and is fixed to one side surface of case 21F along a direction in which the one side surface extends. E-shaped core 504F has an E-shape where slits are formed so as to divide a portion on one side along the longitudinal direction of the flat plate having the arc shape in a sectional view into three pieces. In E-shaped core 504F, coil 70F is disposed around the outer periphery of core 50F while being wound through the slits. Curved planar core 50F functions as the central protruding section (central protruding pole) of E-shaped core 504F. E-shaped core 504F includes core pieces 505F that are formed integrally with the central protruding section so as to be adjacent to both the sides of the central protruding section in the longitudinal direction and protrude toward magnet 60F in a manner analogous to that of core 50F.

Coil 70F is wound around the outer periphery of core 50F so as to encircle facing surface 51F that faces magnetic pole surface 61F of magnet 60F, around core 50F, and is connected to power supply section 25. Coil 70F is excited by electricity supplied from power supply section 25.

Magnet 60F includes magnetic pole surface 61F as multiple magnetic poles. In this embodiment, on magnetic pole surface 61F, four different magnetic poles are alternately arranged, as shown in FIGS. 23 to 25 and 27. That is, magnet 60F is disposed so that this magnet can face the facing surface of E-shaped core 504F and the polarities can be alternately different in the longitudinal direction (axial central direction).

Magnetic pole surface 61 is disposed to face and be in parallel to facing surfaces 51F and 506F of E-shaped core 504F with predetermined spaces being secured.

Here, as shown in FIG. 26, magnetic pole surface 61F and facing surfaces 51F and 506F are inclined from the direction of the tangent of arc-shaped bottom surface 27. Such inclination of magnetic pole surface 61F and facing surfaces 51F and 506F can make the areas of magnetic pole surface 61F and facing surfaces 51F and 506F that face each other as large as possible in the limited space in the curved case 21F. Accordingly, when the magnetic circuit is driven, the magnetic flux can be efficiently concentrated, and a high output can be facilitated.

As shown in FIG. 26, it is assumed that the height of magnet 60F (the length of the arc in the radial direction) is substantially equal to the height of E-shaped core 504E. Accordingly, the position of movable body 30F can be regulated, that is, this body can vibrate in the longitudinal direction (axial direction) without deviating in the height direction. Consequently, the clearance can be easily designed.

Magnet 60 adheres to yoke 90 on the side opposite to E-shaped core 504F in the circumferential direction. Yoke 90 is formed integrally with bearing section 52F. Shaft section 80 is inserted into bearing section 52F, which is formed of a sintered sleeve bearing. Bearing section 52F is caulked and fixed to yoke 90.

Bearing section 52F is elastically supported via metal springs 40. Accordingly, in a case where no electricity is supplied to coil 70F, movable body 30F is urged so as to position at the center in the longitudinal direction (the central axis direction of the arc or curve) in case 21F (stationary body 20F) by metal springs 40 and the magnetic spring.

In case 21F, E-shaped core 504F including core pieces 505F and core 50F that are magnetic bodies, and magnet 60F are disposed to face each other in a direction orthogonal to the drive direction of movable body 30F. Accordingly, the magnetic attractive force occurs between E-shaped core 504F and magnet 60F. Movable body 30F is elastically supported by the magnetic attractive force, or what is called a magnetic spring. Even if power is not supplied to coil 70F, the magnetic attractive force brings movable body 30A including core 50F and core pieces 505F into the state of being preliminarily pressed.

Accordingly, magnet 60F is brought into a state where the rotation about shaft section 80 is regulated (rotation-stopped) and positioning is made with respect to stationary body 20F (mainly case 21F etc.) (positioning of the movable body).

Accordingly, movable body 30F (magnet 60F, yoke 90 and bearing section 52F) is elastically supported by metal springs 40 and the magnetic spring due to the magnetic attractive force caused by magnet 60F and E-shaped core 504F.

Stationary body 20F includes case 21F and cover 24F, and additionally includes E-shaped core 504F which adheres to case 21F and around which coil 70F is wound, shaft section 80, and holder 22F. Movable body 30F includes magnet 60F, yoke 90 that adheres and is fixed to magnet 60F, and bearing section 52F that is a sintered sleeve caulked and fixed to yoke 90.

When coil 70F is supplied with power through power supply section 25 and excited, core 50F of E-shaped core 504F is magnetized, and a thrust occurs according to the relationship of the magnetic poles of the magnet disposed opposite thereto.

More specifically, core 50F is supplied with power to coil 70F from power supply section 25 and excited, which in turn excites E-shaped core 50F itself, and reciprocatorily moves (reciprocatorily vibrates) movable body 30F including magnet 60F in the longitudinal direction, i.e., F direction (see FIG. 24) orthogonal to the circumferential direction.

For example, as shown in FIG. 27, movable body 30F is configured by attaching magnet 60F to yoke 90, with the polarities of magnet 60F (magnetic pole surface 61F) being N-poles and S-poles arranged in the longitudinal direction. Magnetic pole surface 61F of magnet 60F is disposed with the magnetic poles being alternately arranged in the longitudinal direction so as to face facing surfaces 51F and 506F serving as the magnetic pole surfaces of core 50F and core pieces 505F. Here, the numbers of polarities that are opposite to each other are configured such that magnet 4:core 3. The ratio of the mutual numbers of polarities may be that magnet:core=2:3 or 3:2. Alternate current having a frequency substantially equal to resonant frequency $f_r$ of movable body 30F is supplied from power supply section 25 to coil 70F, thereby exciting coil 70F. Current is supplied to coil 70F to cause the polarity of core 50F to be the N-pole and cause the polarity of core pieces 505, between which core 50F intervenes, to be the S-pole. Magnet 60F is then driven in F1 direction. When current is supplied to coil 70F in the inverted direction to cause the polarities of core 50F and core pieces 505F to be the S-poles and N-poles, movable body 30F including magnet 60F is driven in −F1 direction that is opposite to F1 direction.

According to repetition of this process, magnet 60F of movable body 30F reciprocatorily vibrates in both directions F (F1 direction and −F1 direction) along the longitudinal directions with reference to the position serving as the drive reference position, which is herein the position where the center of magnetic pole surface 61F in the longitudinal direction (the boundary position between the N-pole and S-pole) overlaps with the central position of the N-pole of facing surface 51F at the center of E-shaped core 504F, and is the position of movable body 30F shown in FIGS. 24 and 27. This drive principle is an operation principle analogous to that of vibratory actuator 10 in Embodiment 1 achieved by equations 1, 2 and 3 described above.

As described above, in vibratory actuator 10F, E-shaped core 504F, i.e., facing surface 51F of core 50F and facing surfaces 506F of core pieces 505F are magnetized by alternate current waves input from power supply section 25 into coil 70F. The magnetic attractive force and repulsion effectively occur to magnetic pole surface 61F of magnet 60F of movable body 30F. Accordingly, movable body 30F can be effectively driven on the other surface of bottom surface 27 in a direction along the surfaces opposite to each other, that is, a direction along the mutual surfaces that are facing surface 51F of core 50F and facing surfaces 506F of core pieces 505F, and magnetic pole surface 61F of magnet 60F of movable body 30F.

According to vibratory actuator 10F, advantageous effects analogous to <Advantageous Effect 1> to <Advantageous Effect 6> can be obtained, and furthermore the following advantageous effect can be obtained.

Magnet 60F and E-shaped core 504F facing magnet 60F have the same height (the length in the thickness direction). Accordingly, the neutral point of the magnetic attractive force becomes stable. Consequently, deviation to the rotational direction becomes resistant to occurring, and movable body 30F can be linearly driven in the longitudinal direction orthogonal to the height direction. In addition, the position of movable body 30F is regulated by the magnetic attractive force of magnet 60F. Consequently, movable body 30J can be prevented from coming into contact with the inner wall surfaces of case 21F and cover 24F. Furthermore, the position can be regulated without separately adding any sliding member for favorably, linearly driving movable body 30F, thereby negating the cost.

In E-shaped core 504F of stationary body 20F, facing surfaces 51F and 506F are disposed so that power supply to coil 70F can cause both the sides of facing surface 51F at the center to have a magnetic pole different from that of facing surface 51F at the center. Meanwhile, magnet 60F is disposed so that the centers of core 50F and core pieces 505F of E-shaped core 504F can be positioned at the boundaries of the different four pole surfaces on magnetic pole surface 61F.

Accordingly, the thrust can be exerted in a well-balanced manner in the longitudinal direction while magnet 60F of movable body 30F is moved by the magnetic attractive force and magnetic repulsion.

Coil 70F is thus included in movable body 30E Consequently, the mass of movable body 30F can be increased, which can facilitate a high output. In comparison with the VCM scheme, the magnetic resistance can be reduced, the conversion efficiency can be improved, and a high output can be achieved. Furthermore, the configuration can increase the number of magnetic poles. Consequently, in comparison with the configuration where the number of magnetic poles of a core and a magnet is one or two, not only the conversion efficiency but also the magnetic spring force is increased with increase in the number of magnetic poles accordingly. Consequently, the design requirements for springs are alleviated, and improvement in the design flexibility of vibratory actuator 10F can be facilitated.

In vibratory actuator 10F, E-shaped core 504F where coil 70F is wound around the central protruding section (core 50F) is disposed in stationary body 20F, multiple-pole (2- to 4-pole, here, 4-pole) magnet 60F is disposed in movable body 30F (provided that the number of magnet poles is X, the number of cores is X+1 or X−1). Accordingly, in comparison with the case of using the conventional VCM thrust generating principle to move the core according to the law of action and reaction, the mass can be increased and a high output can be facilitated.

This embodiment can reduce the magnetic resistance in comparison with the case of the conventional VCM, improve the energy conversion efficiency, and facilitate achievement of a high output.

Furthermore, vibratory actuator 10F can be manufactured only by accommodating an assembly of movable body 30F and shaft section 80, and an assembly of coil 70F of stationary body 20F and E-shaped core 504F, in case 21F. Consequently, the assemblability is high, and the air gap can be easily adjusted.

Magnet 60F is disposed on movable body 30F side, while coil 70F supplied with power is disposed on stationary body 20F side. Consequently, in comparison with the configuration of moving the coil, the need to provide the wire spring for supplying power to coil is negated, the number of components can be reduced, improvement in the assemblability, reliability, and cost advantage of the vibratory actuator can be facilitated.

In the configuration of vibratory actuator 10F of Embodiment 4 shown in FIGS. 23 to 27, the configuration elements including the magnetic circuit may be formed as they are, while the external shape may be changed from the flat shape having the arc shape in a sectional view to another shape, such as a flat planar shape.

Modification Example of Embodiment 4

Figure 28:
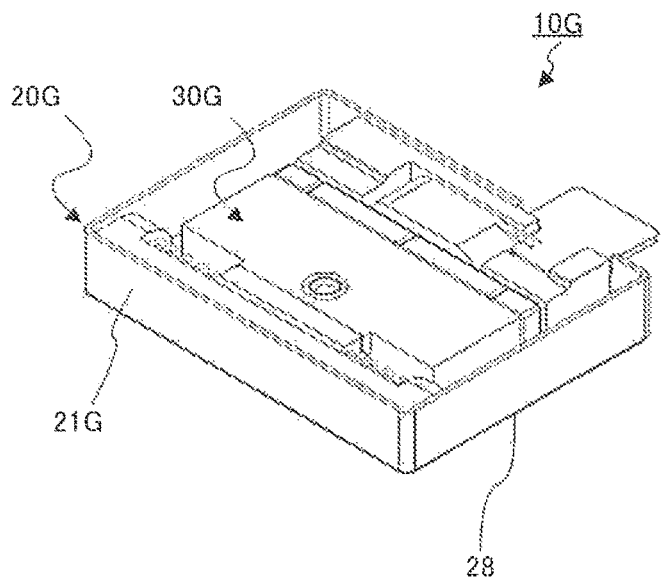
FIG. 28 illustrates a perspective view of an internal configuration of a vibratory actuator of a modification example of Embodiment 4 according to the present invention.
Figure 29:
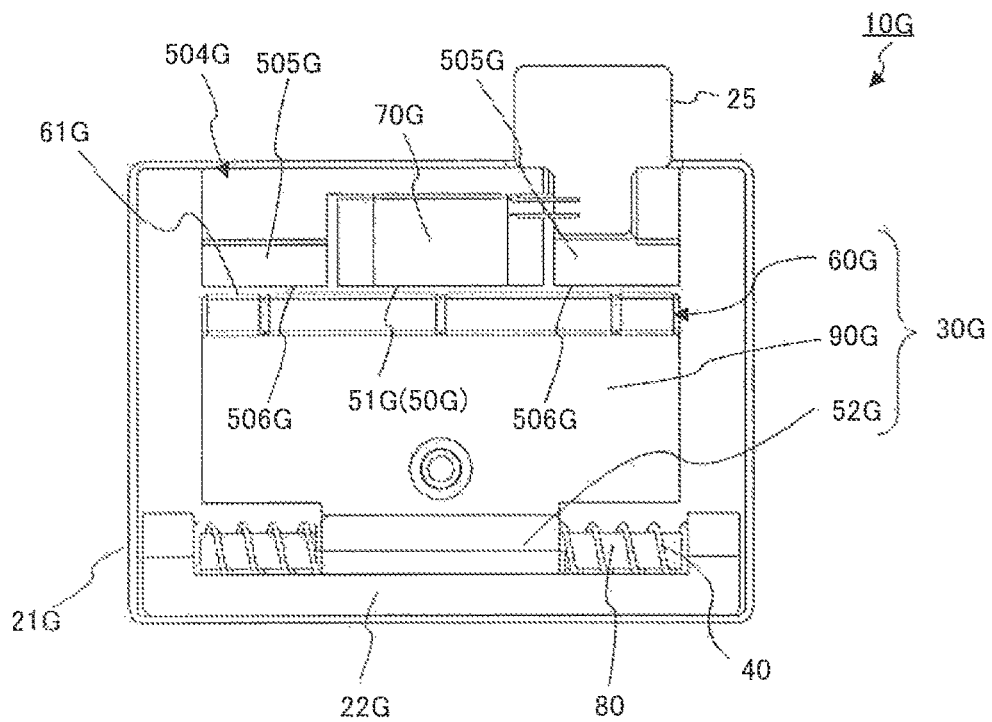
FIG. 29 illustrates a plan view showing an internal configuration of the vibratory actuator of the modification example of Embodiment 4.
Figure 30:
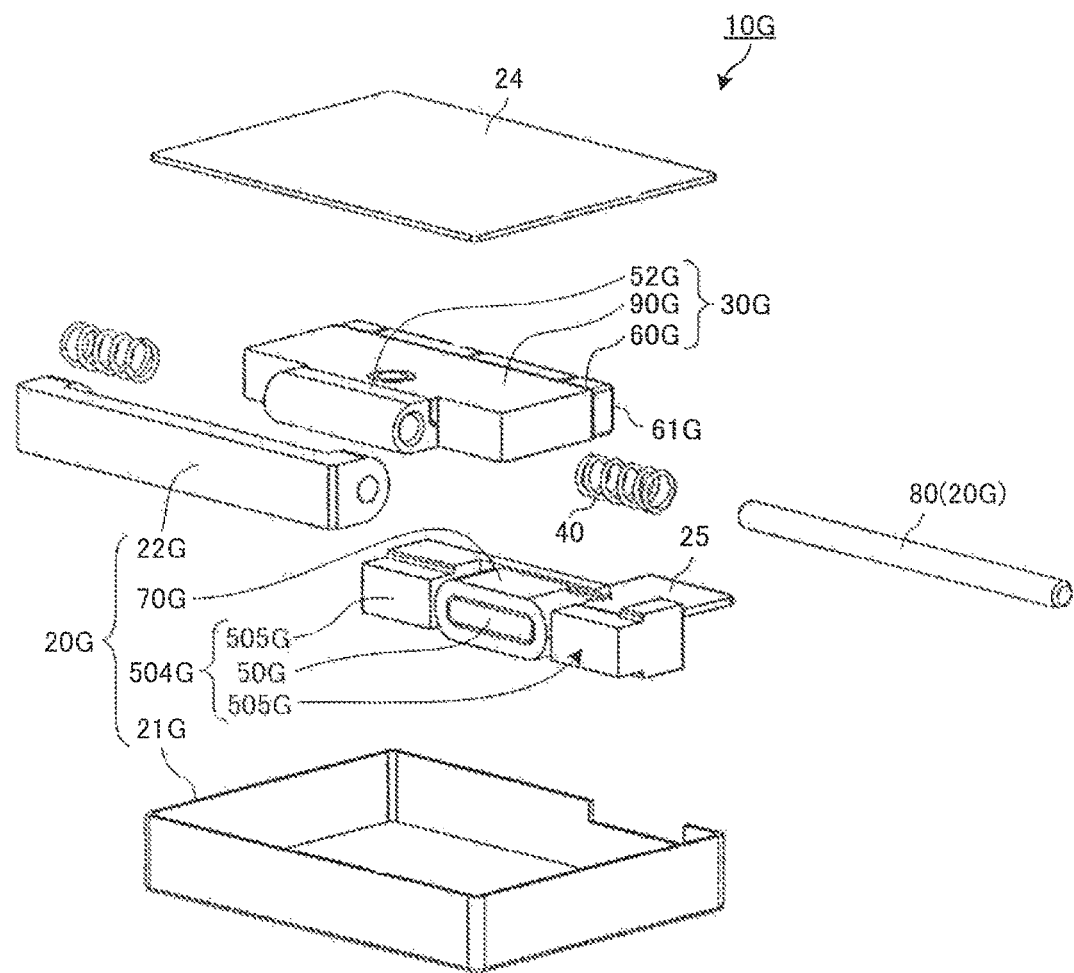
FIG. 30 illustrates an exploded perspective view of the vibratory actuator of the modification example of Embodiment 4.
Figure 31:
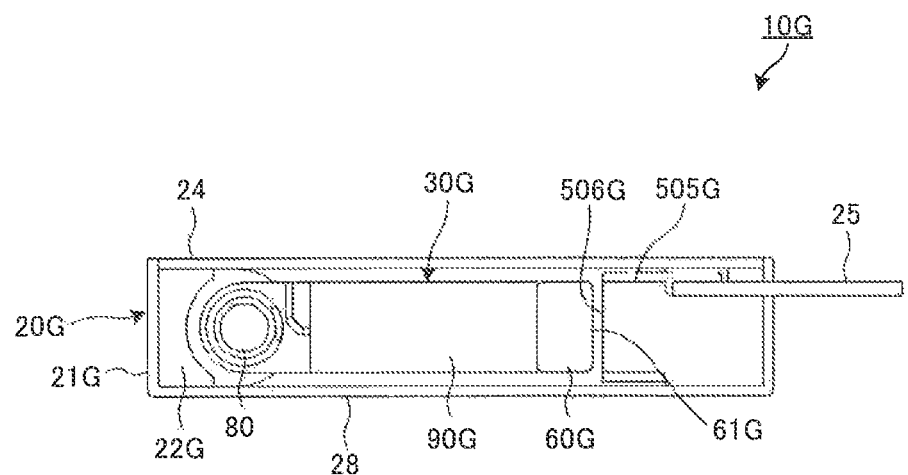
FIG. 31 illustrates a side view showing the positional relationship among the main components of the vibratory actuator of the modification example of Embodiment 4.

FIG. 28 illustrates a perspective view showing the internal configuration of vibratory actuator 10G that is a modification example of vibratory actuator 10F in Embodiment 4. FIG. 29 illustrates a plan view showing the internal configuration of vibratory actuator 10G. FIG. 30 illustrates an exploded perspective view of vibratory actuator 10G. FIG. 31 illustrates a side view showing the positional relationship among the main components of vibratory actuator 10G.

As shown in FIG. 28, vibratory actuator 10G is vibratory actuator 10F whose external shape is a planar shape. Each configuration member is changed from the arc shape to a planar shape accordingly.

Vibratory actuator 10G includes configuration elements having functions analogous to the functions of the configuration elements of vibratory actuator 10F, and has a magnetic circuit structure that preliminarily presses the movable body as with the magnetic circuit of vibratory actuator 10F.

Consequently, configuration elements of vibratory actuator 10G that are analogous to those of vibratory actuator 10F are assigned the same names and the same symbols, and the description of these elements is omitted. Configuration elements that are different only in shape are assigned the same names and are described.

Stationary body 20G includes case 21G, holder 22G, shaft section 80, cover 24 (see FIG. 25), and slits, and further includes E-shaped core 504G where coil (air core) 70G is disposed through the slits, and power supply section 25 connected to coil 70G. Meanwhile, movable body 30G includes: magnet 60G including multiple magnetic poles (for example, two or four poles) arranged alternately in the longitudinal direction; and yoke 90 to which magnet 60G and bearing section 52G are fixed. Vibratory actuator 10G includes stationary body 20G having a flat planar external shape having an arc shape in a sectional view (curved flat planar shape). Movable body 30G (magnet 60G, yoke 90G and bearing section 52G) is elastically supported by metal springs 40 and the magnetic spring due to the magnetic attractive force caused by magnet 60G and E-shaped core 504G.

In case 21G, E-shaped core 504G is disposed on a one side wall along the longitudinal direction. Shaft section 80 is fixed via holder 22G on the other side wall side opposite thereto in the circumferential direction. Shaft section 80 is disposed along the longitudinal direction of case 21G. In a state of being inserted into bearing section 52G of movable body 30G, shaft section 80 is supported by holder 22G at the opposite ends. Holder 22G supports movable body 30G via shaft section 80 movably in the longitudinal direction in case 21G. Metal springs 40 are externally applied around the opposite ends of bearing section 52G. When coil 70F is supplied with power through power supply section 25 and excited, E-shaped core 504G is magnetized, and a thrust occurs according to the relationship of the magnetic poles of magnet 60F disposed opposite thereto. In E-shaped core 504G, core 50G and core piece 505G are excited with different polarities. Movable body 30G including magnet 60G disposed opposite thereto reciprocatorily moves (reciprocatorily vibrates) in the longitudinal direction, that is, F direction (see FIG. 24) orthogonal to the circumferential direction. The movement of movable body 30G in vibratory actuator 10G is analogous to the movement shown in FIG. 27. This drive principle is an operation principle analogous to that of vibratory actuator 10 in Embodiment 1 achieved by equations 1, 2 and 3 described above. Vibratory actuator 10G exerts advantageous effects analogous to those of planar-shaped vibratory actuators 10A, 10C and 10E.

Embodiment 5

Figure 32:
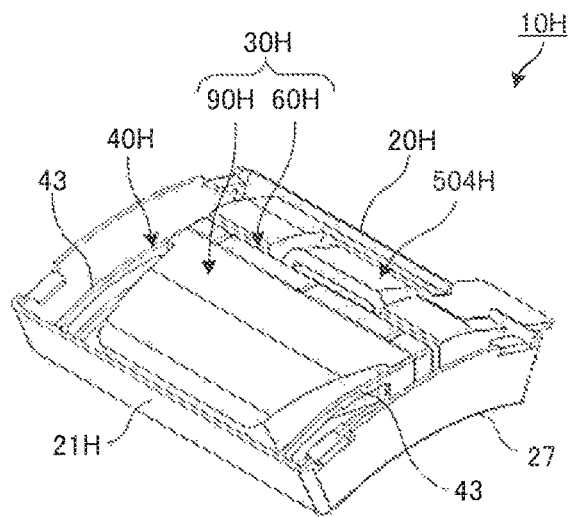
FIG. 32 illustrates a perspective view showing an internal configuration of a vibratory actuator of Embodiment 5 according to the present invention.
Figure 33:
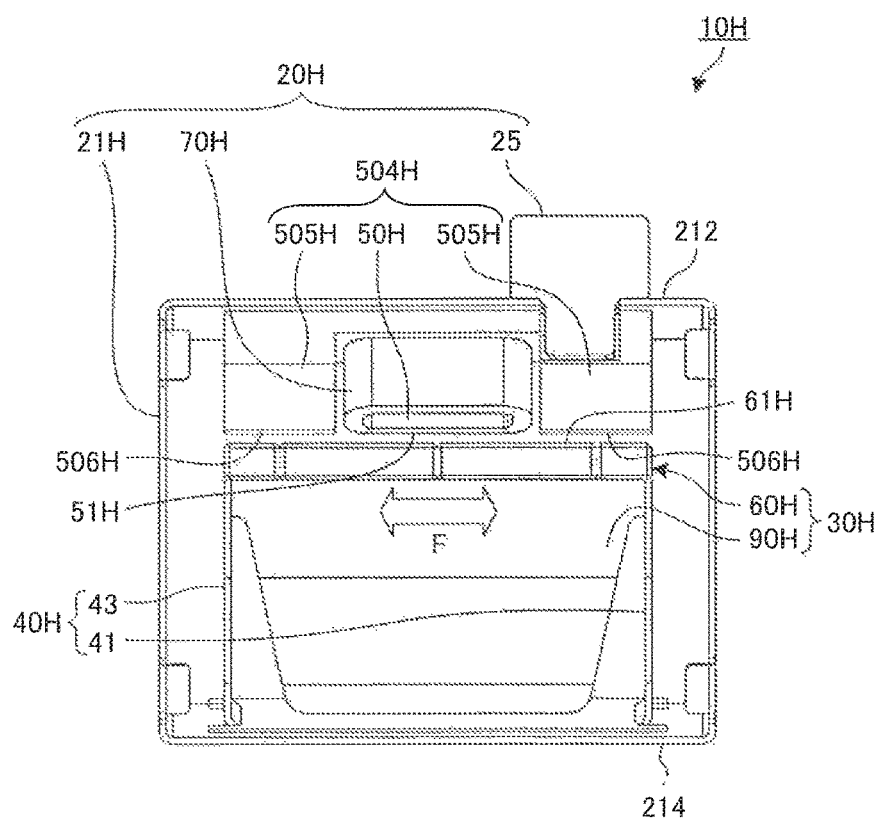
FIG. 33 illustrates a plan view showing an internal configuration of the vibratory actuator.
Figure 34:
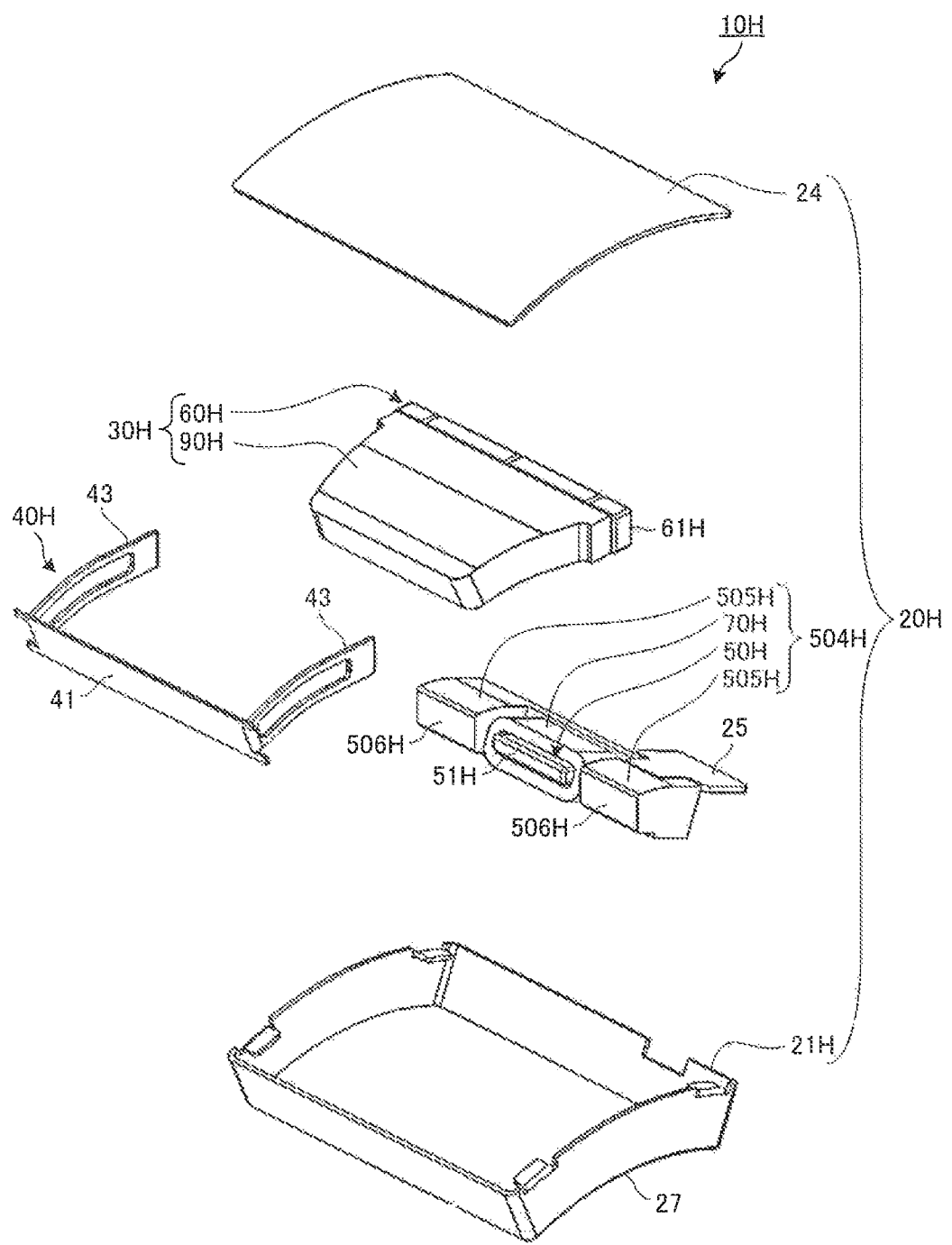
FIG. 34 illustrates an exploded perspective view of the vibratory actuator of Embodiment 5.
Figure 35:
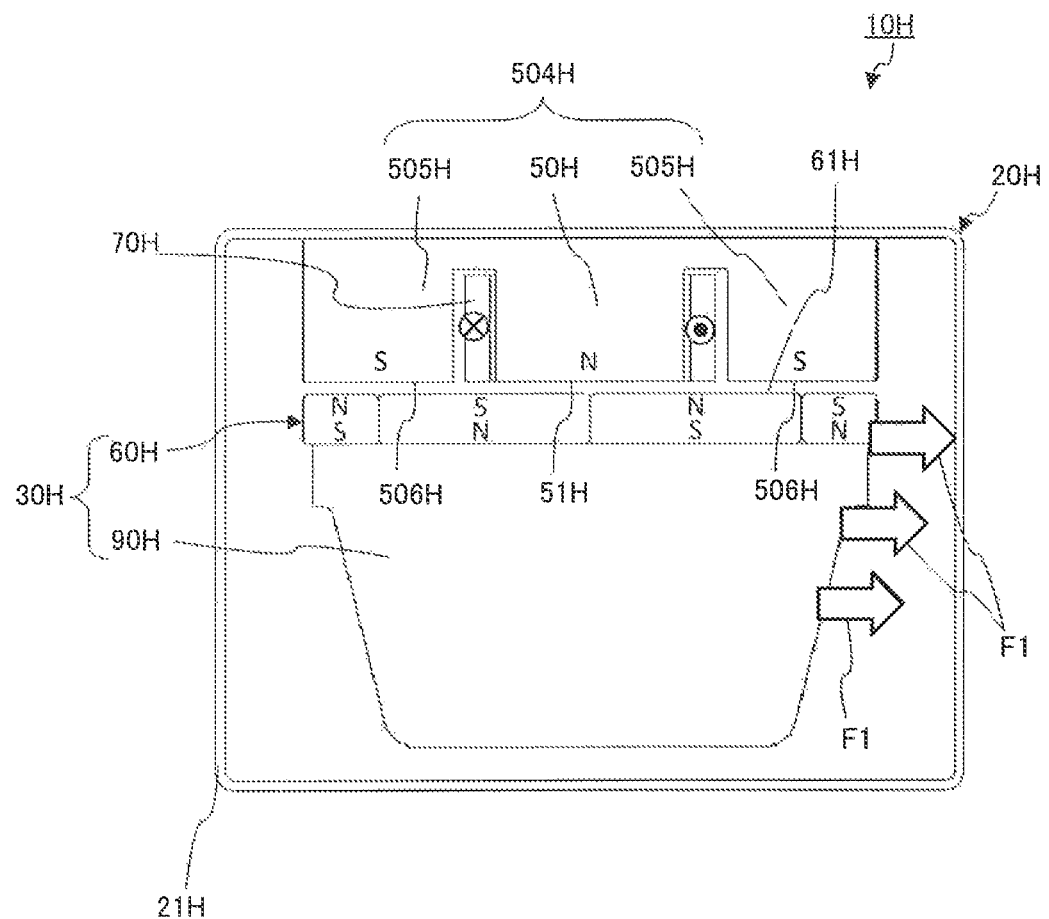
FIG. 35 illustrates a diagram for description of the movement of a movable body of the vibratory actuator of Embodiment 5.

FIG. 32 illustrates an external view showing a configuration of vibratory actuator 10H of Embodiment 5 according to the present invention. FIG. 33 illustrates a plan view showing the internal configuration of vibratory actuator 10H. FIGS. 32 and 33 show vibratory actuator 10H in a state where cover 24 is taken away. In an actual external view, the internal configuration is covered with this cover as with the vibratory actuator shown in FIG. 1. FIG. 34 illustrates an exploded perspective view of vibratory actuator 10H. FIG. 35 is a diagram for description of the operation of movable body 30H. More specifically, this diagram is a plan sectional view schematically illustrating the magnetic circuit configuration of vibratory actuator 10H. In FIG. 35, configuration elements other than the magnetic circuit configuration and movable body 30H (for example, holding spring section 40H to be shown in FIGS. 32 to 34) are omitted.

Vibratory actuator 10H shown in FIGS. 32 to 35 has a magnetic circuit structure which preliminarily presses the movable body, and in which a magnet and a yoke are provided for the movable body and a coil and a core are provided for the stationary body. Since no shaft is provided as described above, the preliminary pressing in the configuration of vibratory actuator 10H regulates the movements other than the movement in the movable direction (here, the movement of the leaf spring, such as holding spring section 40H, in the twisting direction, movement in the movable direction and the movement in the vertical direction). Configuration elements of vibratory actuator 10H that are analogous to those of vibratory actuator 10 are assigned the same names and the same symbols, and the description of these elements is omitted. Configuration elements that are different only in shape are assigned the same names and are described.

Vibratory actuator 10H includes stationary body 20H, movable body 30H, and holding spring section 40H that elastically supports movable body 30H.

Stationary body 20H includes case 21H formed as with case 21, power supply section 25, cover 24 (see FIG. 34), and E-shaped core 504H having slits where coil (air core) 70H is disposed. Meanwhile, movable body 30H includes: magnet 60H including multiple magnetic poles (for example, two or four poles) arranged alternately in the longitudinal direction; and yoke 90H to which magnet 60H is fixed.

Stationary body 20H includes bottom surface 27 formed as a curved surface. Here, stationary body 20H itself is formed in a flat planar external shape having an arc shape in a sectional view (curved flat planar shape).

Case 21H is formed as with case 21, and includes a peripheral wall section having an arc shape in a side view from outer edges of bottom surface 27. The peripheral wall section is formed like a framework including arc-shaped opposite end walls and rectangular side walls 212 and 214. E-shaped core 504H is disposed nearer to one side wall (back side wall) 212 along the longitudinal direction in the peripheral wall section. Fixation plate section 41 of holding spring section 40H is fixed onto the other side wall 214 opposite, in the circumferential direction, to E-shaped core 504H.

Movable body 30H is disposed between E-shaped core 504H and fixation plate section 41. Cover 24 is attached to case 21H, thereby forming a hollow electromagnetic shield.

Holding spring section 40H is formed of an elastically deformable material, such as metal material. Holding spring section 40H connects case 21H and movable body 30H to each other, and supports movable body 30H movably in the central axis direction (here, the longitudinal direction) of a circle including an arc (curved surface) as its circumference.

Here, holding spring section 40H is formed by processing a narrow belt-shaped metal plate. In holding spring section 40H, arm sections 43 protrude from the opposite ends of belt-shaped fixation plate section 41 fixed onto other side wall 214 of case 21, in the substantially orthogonal direction.

Arm sections 43 have the same shape, are disposed opposite to each other, and are formed to have arc plate shapes with bottom sides having shapes along bottom surface 27.

Arm sections 43 are fixed to yoke 90H at one ends of the opposite side surfaces that are close to each other, the one ends being closer to magnet 60H. Arm sections 43 are separated from the opposite side surfaces of yoke 90H at areas other than the distal ends, clamps yoke 90H at the distal ends of arm sections 43, and supports yoke 90H movably in the longitudinal direction through deformation.

Holding spring section 40H holds magnet 60H attached to yoke 90H in a state of facing E-shaped core 504H with a predetermined space being secured, at a position (normal position) where the centers in the longitudinal direction overlap with each other. The position is a position at the center of case 21H in the longitudinal direction. According to this configuration, holding spring section 40H urges yoke 90H, that is, movable body 30H, so as to be positioned at a normal position owing to elastic deformation in a state of being elastically deformed.

E-shaped core 504H is formed in an E-shape in a plan view, and is formed to have a size movable in the longitudinal direction in case 21H in conformity with the shape of case 21H. In detail, this core is formed in a flat planar shape having an arc shape in a sectional view in conformity with bottom surface 27 that is the curved surface of case 21H, and is fixed to one side wall of case 21H along a direction in which the one side wall 214 extends.

As for E-shaped core 504H, slits are formed at positions for dividing a flat-planar-shaped one side having an arc shape in a sectional view into three pieces, thereby forming the E-shape. That is, the slits cause E-shaped core 504H to be configured so that core 50H serving as a central protruding section (central protruding pole), and core pieces 505H formed integrally with and adjacent to core 50H at both the sides in the longitudinal direction can be formed to protrude toward magnet 60H.

Core piece 505H, core 50H and the distal end surfaces of core piece 505H, which are arranged in the longitudinal direction and between which the slits intervene, are facing surfaces 506H, 51H and 506H that are opposite to magnetic pole surface 61H of magnet 60H. Coil 70H resides in the slits, and is wound so as to encircle the outer periphery of core 50H. Thus, coil 70H is disposed around the outer periphery of core 50H.

Coil 70H is disposed around core 50H so as to encircle facing surface 51H, and is connected to power supply section 25. Coil 70H is supplied with power from power supply section 25. Accordingly, coil 70H excites facing surfaces 506H, 51H and 506H of E-shaped core 504H.

Magnet 60H includes magnetic pole surface 61H as multiple magnetic poles. Magnetic pole surface 61H is disposed to face and be in parallel to facing surfaces 51H and 506H of E-shaped core 504H with predetermined spaces being secured.

In this embodiment, as shown in FIG. 35, four polarities are arranged on magnetic pole surface 61H so as to have different polarities alternately in the longitudinal direction (axial central direction) of case 21H and to face facing surfaces 506H, 51H and 506H of E-shaped core.

Magnetic pole surface 61H and facing surfaces 51H and 506H may be inclined from arc-shaped bottom surface 27 at any degree. For example, magnetic pole surface 61H, and facing surfaces 506H, 51H and 506H, which are parallel to each other, are more inclined than those in a case where the arc is disposed on the radius of the circle including the circumference in a side view, thereby allowing the facing areas to be increased as large as possible within a limited space in curved case 21H. Accordingly, when the magnetic circuit is driven, the magnetic flux can be efficiently concentrated, and a high output can be facilitated.

In this embodiment, as with magnet 60F and core pieces 505F shown in FIG. 26, it is assumed that the height of magnet 60H (the length of the arc in the radial direction) is substantially equal to the height of E-shaped core 504H. Accordingly, the position of movable body 30H can be regulated, that is, this body can vibrate in the longitudinal direction (axial direction) without deviating in the height direction. Consequently, the clearance can be easily designed.

Magnet 60H adheres to yoke 90H on the opposite side, in the circumferential direction, to E-shaped core 504H. Yoke 90H has an arc shape in a side view and an isosceles trapezoid shape in a plan view. Magnet 60H adheres to a longer side of the trapezoid in the plan view including sides serving as the upper side and the lower side in yoke 90H, and the short side is opposed to fixation plate section 41. Yoke 90H is elastically supported on other side wall 214 side via arm sections 43 of holding spring section 40H.

In case 21H, E-shaped core 504H including core pieces 505H and core 50H that are magnetic bodies, and magnet 60H are disposed to face each other in a direction orthogonal to the drive direction of movable body 30H. Accordingly, the magnetic attractive force occurs between E-shaped core 504H and magnet 60H. Movable body 30H is elastically supported by the magnetic attractive force, or what is called a magnetic spring. Even if power is not supplied to coil 70H, the magnetic attractive force brings movable body 30H including core 50H and core pieces 505H into the state of being preliminarily pressed.

Accordingly, magnet 60H is brought into a state where the rotation is regulated (what is called rotation stop) and positioning is made with respect to stationary body 20H (mainly case 21H etc.) (positioning of the movable body).

Accordingly, if coil 70H is not supplied with power, movable body 30H (magnet 60H, and yoke 90H) is elastically supported by holding spring section 40H and the magnetic spring due to the magnetic attractive force caused by magnet 60H and E-shaped core 504H. Holding spring section 40H and magnetic spring have a function of urging movable body 30H so as to be positioned at the center of the longitudinal direction (the central axis direction of the arc or curve) in stationary body 20H.

When coil 70H is supplied with power through power supply section 25, core 50H of E-shaped core 504H is magnetized, E-shaped core 504H itself is excited, and a thrust occurs according to the relationship of the magnetic poles of the magnet disposed opposite thereto. When facing surfaces 506H, 51H and 506H of E-shaped core 50H are excited by alternately changing the direction of flow of current to coil 70H, that is, by supplying coil 70H with alternate current, movable body 30H including magnet 60H reciprocatorily moves (reciprocatorily vibrates) on the other surface side of bottom surface 27 in the longitudinal direction, i.e., F direction (see FIG. 33) orthogonal to the circumferential direction.

For example, shown in FIG. 35, movable body 30H is configured by attaching magnet 60H to yoke 90H, with the polarities of magnet 60H (magnetic pole surface 61H) being N-poles and S-poles arranged in the longitudinal direction. Magnetic pole surface 61H of magnet 60H is disposed with the magnetic poles being alternately arranged in the longitudinal direction so as to face facing surfaces 51H and 506H serving as the magnetic pole surfaces of core 50H and core pieces 505H of E-shaped core 504H.

Here, the numbers of polarities that are opposite to each other are configured such that magnet 4:core 3. The ratio of the mutual numbers of polarities may be that magnet: core=2:3 or 3:2. Alternate current having a frequency substantially equal to resonant frequency $H_r$ of movable body 30H is supplied from power supply section 25 to coil 70H, thereby exciting coil 70H. Current is supplied to coil 70H to cause the polarity of core 50H to be the N-pole and cause core pieces 505, between which core 50H intervenes, to be the S-pole. Magnet 60H is then driven in F1 direction. When current is supplied to coil 70H in the opposite direction to cause the polarities of core 50H and core pieces 505 to be the S-pole and N-pole, movable body 30H including magnet 60H returns to the drive reference position (normal position) by the spring of holding spring section 40H and the magnetic spring, and is subsequently driven in −F1 direction, which is opposite to F1 direction. The drive reference position is a position where the center of magnetic pole surface 61H in the longitudinal direction (the boundary position between the N-pole and S-pole) overlaps with the center position of the N-pole of facing surface 51H at the center of E-shaped core 504H, and is the position of movable body 30H shown in FIGS. 33 and 35. According to repetition of this process, magnet 60H of movable body 30H reciprocatorily vibrates in both directions F (F1 direction and −F1 direction) in the longitudinal direction with reference to the drive reference position. This drive principle is an operation principle analogous to that of vibratory actuator 10 in Embodiment 1 achieved by equations 1, 2 and 3 described above.

Accordingly, in vibratory actuator 10H, E-shaped core 504H is excited by alternate current waves input from power supply section 25 into coil 70H, that is, facing surface 51H of core 50H and facing surfaces 506H of core pieces 505H are magnetized. Accordingly, the magnetic attractive force and the repulsion effectively occur between facing surfaces 506H, 51H and 506H and magnetic pole surface 61H of magnet 60H of movable body 30H.

Accordingly, movable body 30H can be effectively driven in a direction along the surfaces opposite to each other, that is, a direction along the mutual surfaces that are facing surface 51H of core 50H and facing surfaces 506H of core pieces 505H, and magnetic pole surface 61H of magnet 60H of movable body 30H without support members.

According to vibratory actuator 10H, advantageous effects analogous to <Advantageous Effect 1> to <Advantageous Effect 6> and <Advantageous Effect 8> can be obtained, and furthermore the following advantageous effect can be obtained.

Movable body 30H is elastically supported in a state of being subjected to preliminary pressing by the magnetic spring, and is held by holding spring section 40H.

Accordingly, even while the clearance with movable body 30H in case 21H is reduced, assembly can be made without any interference. Furthermore, the trajectory of movable body 30H is stable, which facilitates the design and allows movable body 30H to be stably driven.

Shaft section 80 for supporting movable body 30H is not included. Accordingly, the configuration where holding spring section 40H is leaf springs reduces the space required for axial fixation, and facilitates reduction in thickness.

Magnet 60H and E-shaped core 504H facing magnet 60H have the same height (the length in the thickness direction). Accordingly, the neutral point of the magnetic attractive force becomes stable. Consequently, deviation to the rotational direction becomes resistant to occurring, and movable body 30H can be stably linearly driven in the longitudinal direction orthogonal to the height direction.

In addition, the position of movable body 30H is regulated by the magnetic attractive force of magnet 60H. Consequently, movable body 30J can be prevented from coming into contact with the inner wall surfaces of case 21H and cover 24. Furthermore, the position can be regulated without separately adding any sliding member for favorably, linearly driving movable body 30H, thereby negating the cost.

As for E-shaped core 504H of stationary body 20H, facing surfaces 51H and 506H are disposed so that power supply to coil 70H can cause both the sides of facing surface 51H at the center to have a magnetic pole different from that of facing surface 51H at the center. Meanwhile, magnet 60H is disposed so that the centers of core 50H and core pieces 505H of E-shaped core 504H can be positioned at the boundaries of the different four pole surfaces on magnetic pole surface 61H.

Accordingly, the thrust can be exerted in a well-balanced manner in the longitudinal direction while magnet 60H of movable body 30H is moved by the magnetic attractive force and magnetic repulsion.

Coil 70H is thus included in movable body 30H. Consequently, the mass of movable body 30H can be increased, which can facilitate a high output. In comparison with the VCM scheme, the magnetic resistance can be reduced, the conversion efficiency can be improved, and a high output can be achieved. Furthermore, the configuration can increase the number of magnetic poles. Consequently, in comparison with the configuration where the number of magnetic poles of the core and the magnet is one or two, not only the conversion efficiency but also the magnetic spring force is increased with increase in the number of magnetic poles accordingly. Consequently, the design requirements for the springs are alleviated, and improvement in the design flexibility of vibratory actuator 10H can be facilitated.

In vibratory actuator 10H, E-shaped core 504H where coil 70H is wound around the central protruding section (core 50H) is disposed in stationary body 20H, multiple-pole (2- to 4-pole, here, 4-pole) magnet 60H is disposed in movable body 30H (provided that the number of magnet poles is X, the number of core poles is X+1 or X−1). Accordingly, in comparison with the case of using the conventional VCM thrust generating principle to move the core according to the law of action and reaction, the mass can be increased and a high output can be facilitated.

Accordingly, this embodiment can reduce the magnetic resistance in comparison with the case of the conventional VCM, improve the energy conversion efficiency, and facilitate achievement of a high output.

Furthermore, vibratory actuator 10H can be manufactured only by accommodating an assembly of holding spring section 40H and movable body 30H, and an assembly of coil 70H of stationary body 20H and E-shaped core 504H, in case 21H. Consequently, the assemblability is high, and the air gap can be easily adjusted.

Magnet 60H is disposed on movable body 30H side, while coil 70H supplied with power is disposed on stationary body 20H side. Consequently, in comparison with the configuration of moving the coil, the need to provide the wire spring for supplying power to coil is negated, the number of components can be reduced, improvement in the assemblability, reliability, and cost advantage of vibratory actuator 10H can be facilitated.

In the configuration of vibratory actuator 10H of Embodiment 5 shown in FIGS. 32 to 36, the configuration elements including the magnetic circuit may be formed as they are, while the external shape may be changed from the flat shape having the arc shape in a sectional view to another shape, such as a flat planar shape.

Modification Example of Embodiment 5

Figure 36:
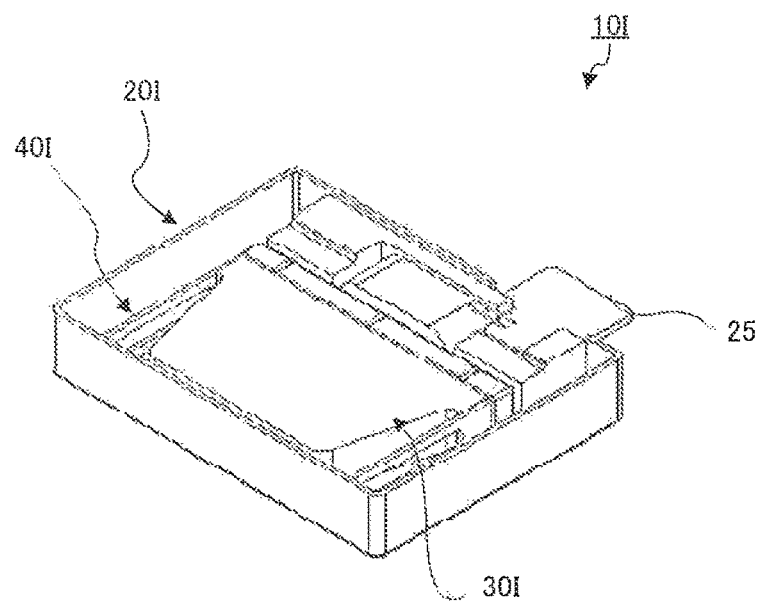
FIG. 36 illustrates a perspective view of an internal configuration of a vibratory actuator of a modification example of Embodiment 5 according to the present invention.
Figure 37:
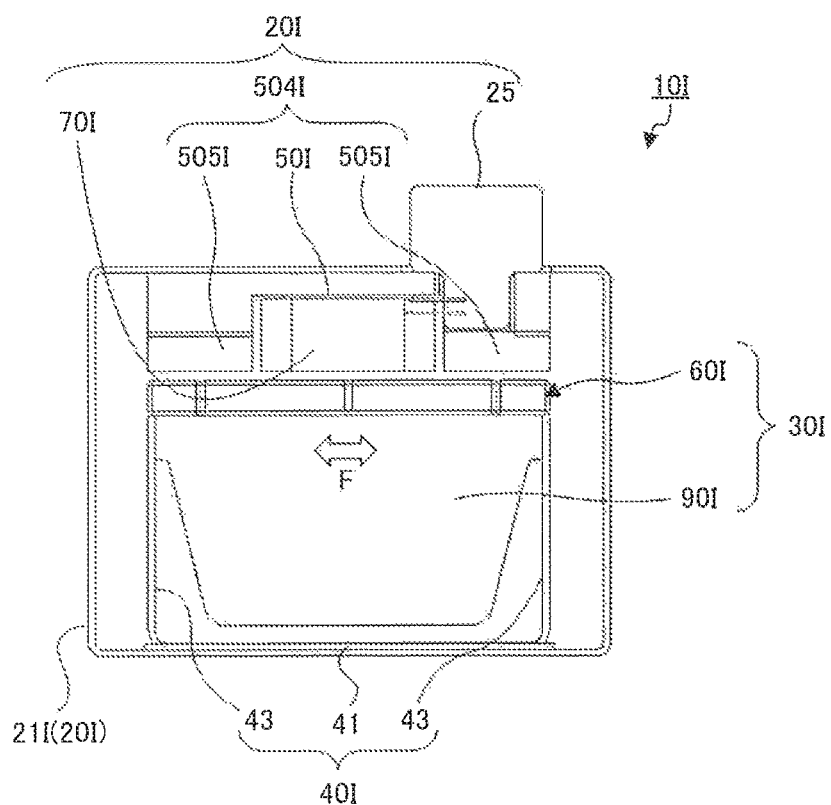
FIG. 37 illustrates a plan view showing an internal configuration of the vibratory actuator of the modification example of Embodiment 5.
Figure 38:
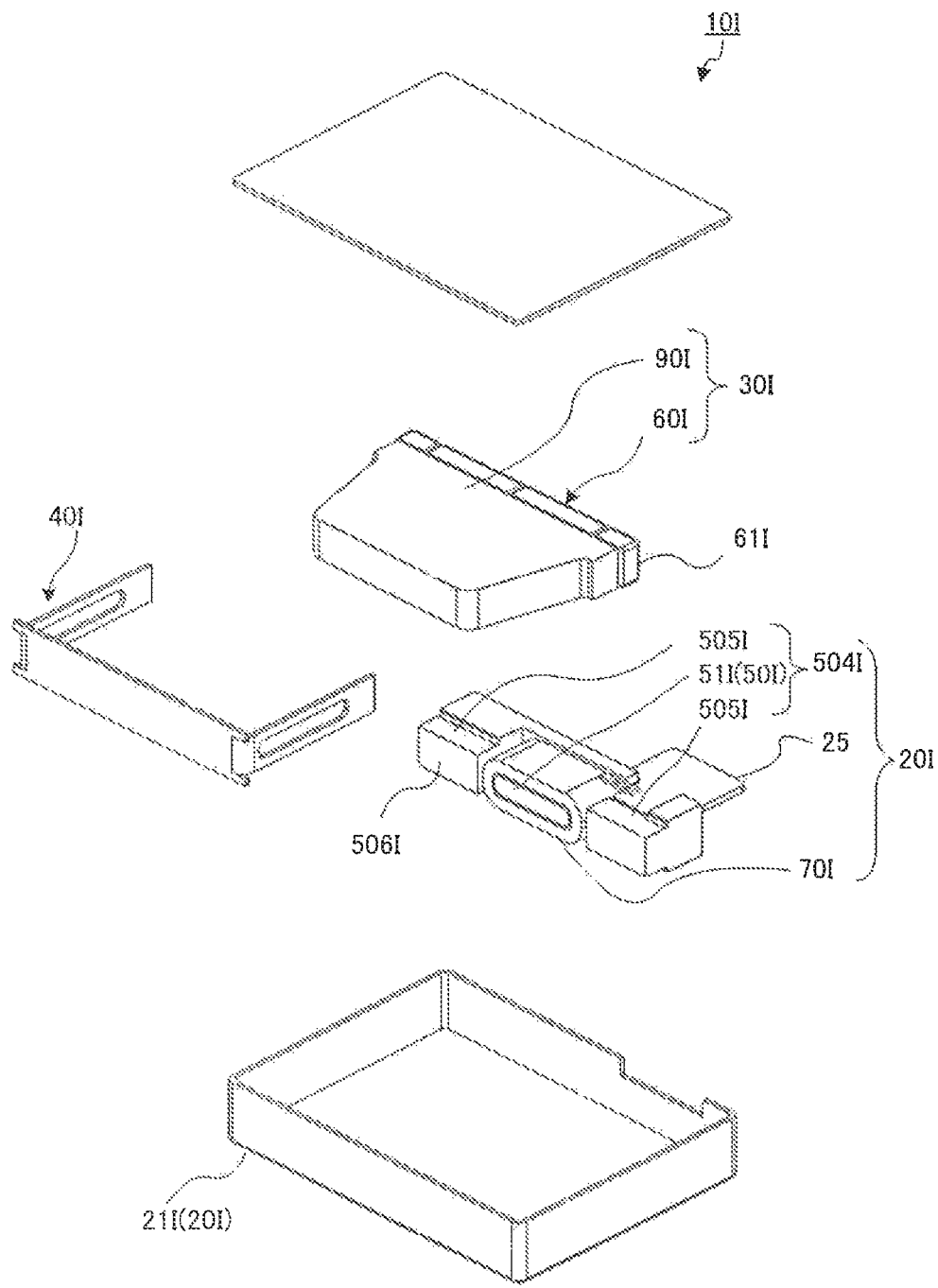
FIG. 38 illustrates an exploded perspective view of the vibratory actuator of the modification example of Embodiment 5.

FIGS. 36 to 38 illustrate vibratory actuator 10I that is a modification example of vibratory actuator 10H.

As shown in FIG. 36, vibratory actuator 10I is vibratory actuator 10 formed to have a planar external shape. Each configuration member is changed from the arc shape to a planar shape accordingly.

Vibratory actuator 10I includes configuration elements having functions analogous to the functions of the configuration elements of vibratory actuator 10H, and has a magnetic circuit structure that preliminarily presses the movable body as with the magnetic circuit of vibratory actuator 10H. The magnetic circuit structure and the movement of movable body 30I are analogous to the magnetic circuit structure and movable body 30H shown in FIG. 35.

In the following description, configuration elements of vibratory actuator 10I that are analogous to those of vibratory actuator 10H are assigned the same names and the same symbols, and the description of these elements is omitted. Configuration elements that are different only in shape are assigned the same names and are described.

Vibratory actuator 10I includes planar stationary body 20I, movable body 30I, and holding spring section 40I that elastically supports movable body 30I.

Stationary body 20I includes planar case 21H, power supply section 25, cover 24 (see FIG. 34), and E-shaped core 504I having slits where coil (air core) 70I is disposed. Meanwhile, movable body 30I includes: magnet 60I including multiple magnetic poles (for example, two or four poles) arranged alternately in the longitudinal direction; and yoke 90I to which magnet 60I is fixed. Magnet 60I and holding spring section 40I are formed of an elastically deformable material, such as metal material. Holding spring section 40I is fixed to case 21I so as to support movable body 30I movably. Holding spring section 40I supports movable body 30I movably in the central axis direction (here, the longitudinal direction) of a circle including an arc (curved surface) as its circumference. Case 21I, cover 24A (see FIG. 34), coil (air core) 70I, E-shaped core 504I, magnet 60I, yoke 90I, holding spring section 40I and the like have analogous configurations and functions, except in that case 21H, cover 24, coil 70H, E-shaped core 504H, magnet 60H, yoke 90H, and holding spring section 40H are configured to have flat plates.

That is, movable body 30I (magnet 60I, and yoke 90I) is elastically supported by holding spring section 40I and the magnetic spring due to the magnetic attractive force caused by magnet 60I and E-shaped core 504I. When coil 70I is supplied with power through power supply section 25 and excited, E-shaped core 504I is magnetized, and a thrust occurs according to the relationship of the magnetic poles of magnet 60I disposed opposite thereto. As for E-shaped core 504I, core 50I and core piece 505I are excited with different polarities. Movable body 30I including magnet 60I disposed opposite thereto reciprocatorily moves (reciprocatorily vibrates) in the longitudinal direction, that is, F direction (see FIG. 37) orthogonal to the circumferential direction. The movement of movable body 30I in vibratory actuator 10I is analogous to the movement shown in FIG. 35. This drive principle is an operation principle analogous to that of vibratory actuator 10 in Embodiment 1 achieved by equations 1, 2 and 3 described above. Vibratory actuator 10I exerts advantageous effects analogous to those of planar-shaped vibratory actuators 10A, 10C and 10E.

Embodiment 6

Figure 39:
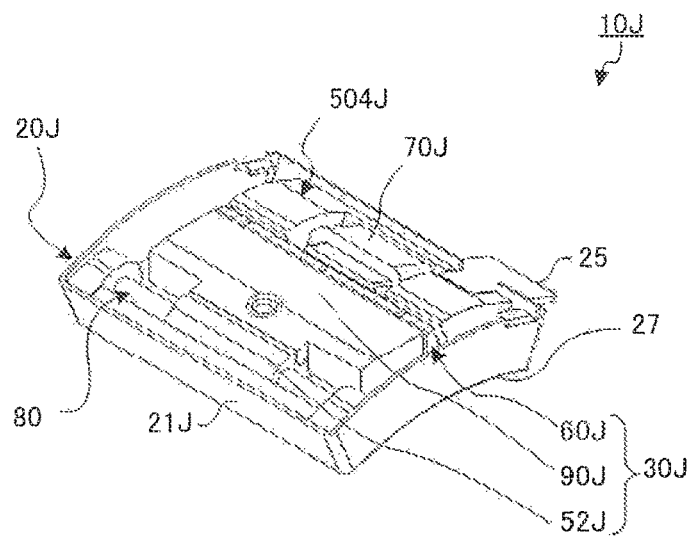
FIG. 39 illustrates a perspective view showing an internal configuration of a vibratory actuator of Embodiment 6 according to the present invention.
Figure 40:
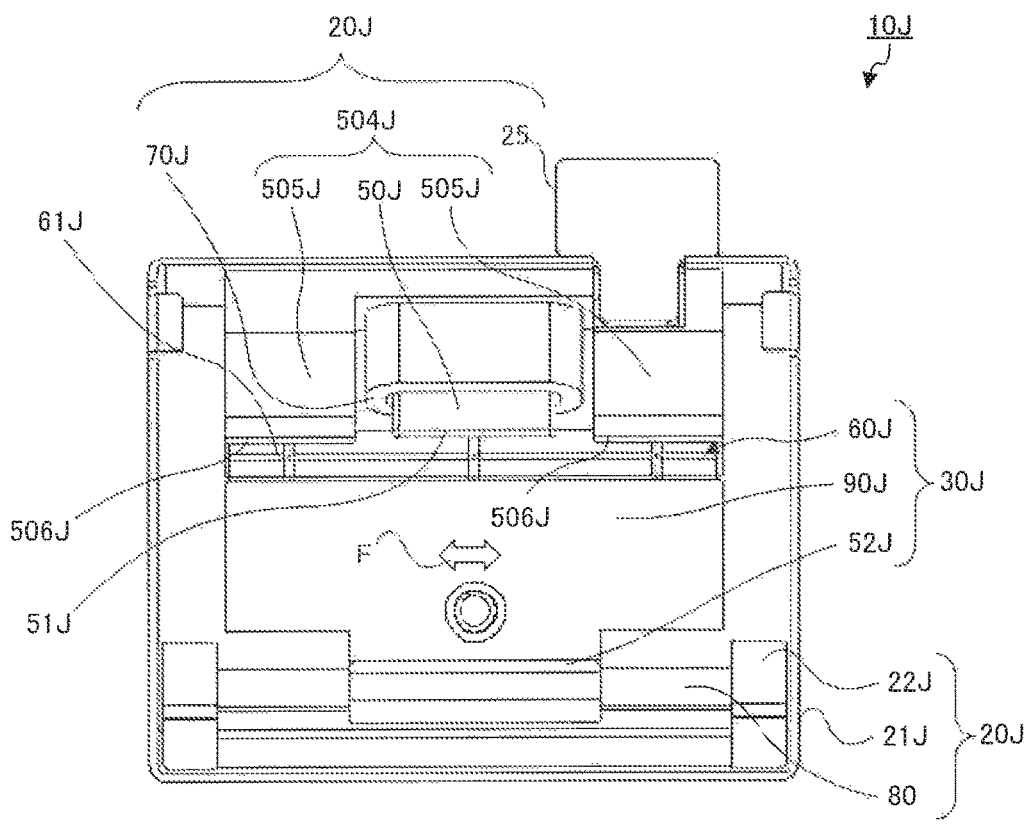
FIG. 40 illustrates a plan view showing an internal configuration of the vibratory actuator of Embodiment 6.
Figure 41:
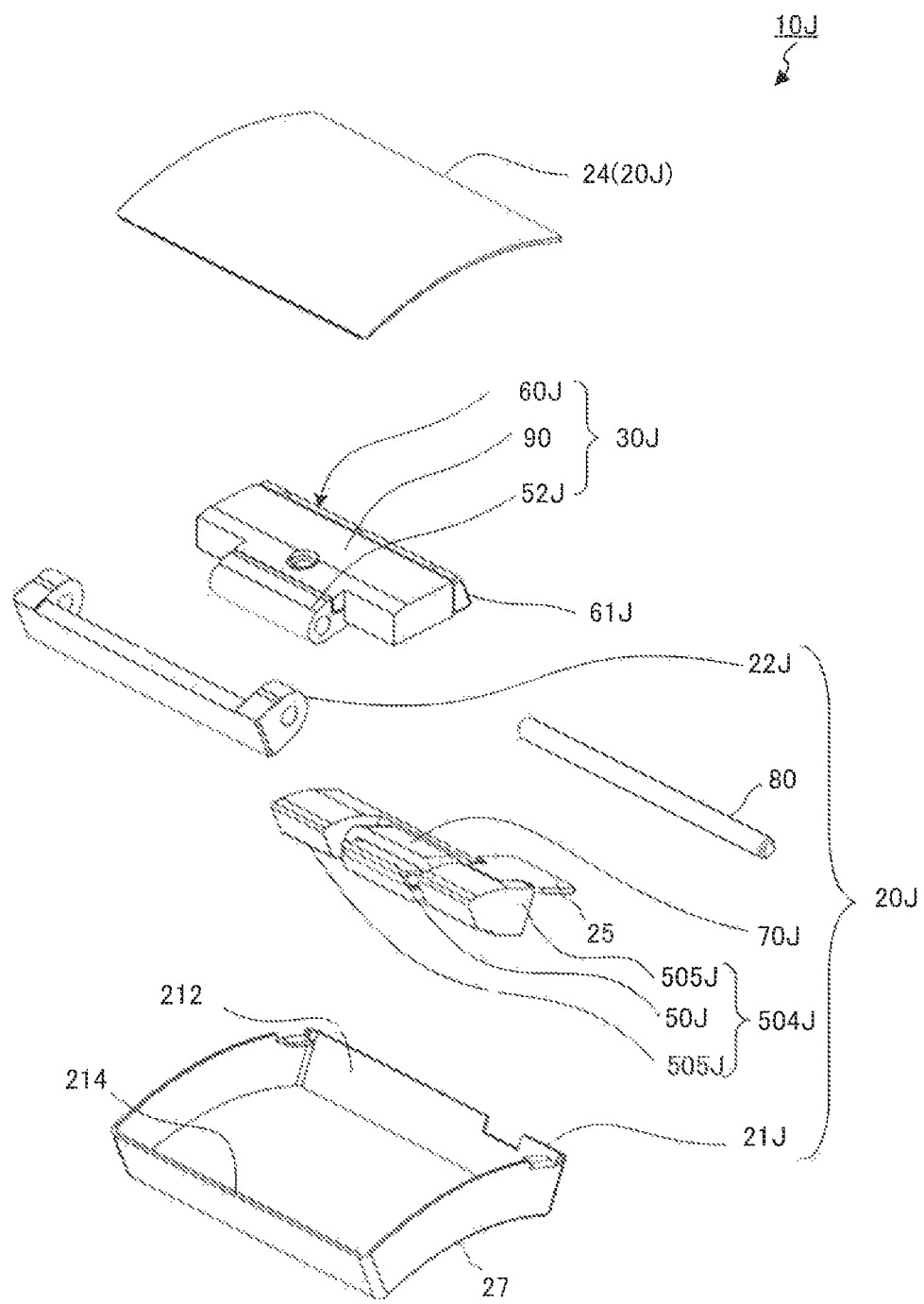
FIG. 41 illustrates an exploded perspective view of the vibratory actuator of Embodiment 6.

FIG. 39 illustrates an external view showing a configuration of vibratory actuator 10J of Embodiment 6 according to the present invention. FIG. 40 illustrates a plan view showing the internal configuration of vibratory actuator 10J. FIGS. 39 and 40 illustrate vibratory actuator 10J in a state where cover 24 is taken away so as to show the internal configuration. In an actual external view, the internal configuration is covered with this cover as with the vibratory actuator shown in FIG. 1. FIG. 41 illustrates an exploded perspective view of vibratory actuator 10J.

Vibratory actuator 10J shown in FIGS. 39 to 41 has a magnetic circuit structure which preliminarily presses the movable body as with the magnetic circuit of vibratory actuator 10 and in which a coil and a core are provided for the stationary body, and a magnet and yoke are provided for a movable body. Configuration elements of vibratory actuator 10J that are analogous to those of vibratory actuator 10 are assigned the same names and the same symbols, and the description of these elements is omitted. Configuration elements that are different only in shape are assigned the same names and are described.

As shown in FIG. 39, vibratory actuator 10J includes stationary body 20J, and movable body 30J movably supported by the magnetic spring to stationary body 20J without intervention of any metal spring.

As shown in FIG. 40, stationary body 20J includes case 21J, holder 22J, shaft section 80, cover 24 (see FIG. 41) and coil (air core) 70J, and further includes E-shaped core 504J where coil 70J is disposed through the slits, and power supply section 25.

Meanwhile, movable body 30J includes: magnet 60J including multiple magnetic poles (for example, two or four poles; four poles in FIGS. 39 to 41) arranged alternately in the longitudinal direction; and yoke 90J to which magnet 60J and bearing section 52J are fixed. Only if the configuration prevents bearing section 52J from being attracted to shaft section 80, bearing section 52J may be integrally formed with yoke 90J.

Stationary body 20J has an external shape that is a flat planar shape having an arc shape in a sectional view (curved flat planar shape). Case 21J is formed as with case 21 in an arc shape in a side view, and includes a peripheral wall section provided vertically from the outer periphery of bottom surface 27. E-shaped core 504J is disposed along the inside of a one side wall (back side wall) 212 along the longitudinal direction in the peripheral wall section. Shaft section 80 is fixed via holder 22J along the inside of other side wall 214 disposed opposite thereto in the circumferential direction.

Shaft section 80 is fixed at its opposite ends to holder 22J in a state of being inserted into bearing section 52J of movable body 30J. Shaft section 80 is disposed on a line parallel to the central axis of a circle including an arc (the sectional shape of curved bottom surface 27) of case 21J as its circumference. Cover 24 is attached to case 21J, thereby forming a hollow electromagnetic shield.

Holder 22J supports movable body 30J via shaft section 80 movably in the axial direction in case 21J.

E-shaped core 504J is disposed to face movable body 30J in case 21J. E-shaped core 504J is fixed to one side surface side of case 21J in a direction where the one side surface extends. E-shaped core 504J is formed in conformity with the shape of case 21J. Slits are formed to divide, into three pieces, one side along the longitudinal direction of the flat plate having an arc shape in a sectional view in conformity with bottom surface 27 that is a curved surface of case 21J, thereby allowing E-shaped core 504J to be formed to have an E-shape in a plan view. E-shaped core 504J includes: a central protruding section (core 50J as a central protruding pole) that is formed with intervention of slits and has a curved planar shape; and core pieces 505J that are formed integrally with and adjacent to the central protruding section on the opposite sides in the longitudinal direction and protrude toward magnet 60J as with core 50J. Coil 70J is wound through the slits around the outer periphery of core 50J.

Core 50J and core pieces 505J include facing surfaces 51J and 506J disposed to face magnetic pole surface 61J of magnet 60J.

Coil 70J is disposed around the outer periphery of core 50J so as to encircle facing surface 51J of core 50J, and is connected to power supply section 25. Coil 70J is excited by electricity supplied from power supply section 25.

Magnetic pole surface 61J of magnet 60J includes multiple magnetic poles. Here, in this embodiment, as shown in FIGS. 39 to 41, four different magnetic poles are disposed in magnetic pole surface 61J to be arranged alternately in the longitudinal direction (axial central direction) of case 21J, and to face facing surfaces 51J and 506J of the E-shaped core.

Here, magnetic pole surface 61J and facing surfaces 51J and 506J are inclined from the direction of the tangent of arc-shaped bottom surface 27, as with the configuration of magnetic pole surface 61F and facing surfaces 51F and 506F in Embodiment 4 in FIG. 26. Such inclination of magnetic pole surface 61J and facing surfaces 51J and 506J in parallel to each other can make the areas of magnetic pole surface 61J and facing surfaces 51J and 506J that face each other as large as possible in the limited space in curved case 21J. Accordingly, when the magnetic circuit is driven, the magnetic flux can be efficiently concentrated, and a high output can be facilitated. The configuration where the height of magnet 60J (the length of an arc in the radial direction) is substantially identical to the height of E-shaped core 504J can vibrate movable body 30J in the longitudinal direction (axial direction) while regulating the position of movable body 30J, that is without deviating in the height direction and facilitate the design of the clearance.

Magnet 60J adheres to yoke 90J on the side opposite to E-shaped core 504J in the circumferential direction. Yoke 90J is formed integrally with bearing section 52J. Shaft section 80 is inserted into bearing section 52J, which is formed of a sintered sleeve bearing. Bearing section 52J is caulked and fixed to yoke 90J.

As for case 21J, E-shaped core 504J including core pieces 505J and core 50J that are magnetic bodies, and magnet 60J are disposed to face each other in a direction orthogonal to the drive direction of movable body 30J. Accordingly, the magnetic attractive force occurs between E-shaped core 504J and magnet 60J. Movable body 30J is elastically supported by the magnetic attractive force, or what is called a magnetic spring. Even if power is not supplied to coil 70J, the magnetic attractive force brings movable body 30J including core 50J and core pieces 505J into the state of being preliminarily pressed.

Accordingly, magnet 60J is brought into a state where the rotation about shaft section 80 is regulated (rotation-stopped) and positioning is made at the center in the longitudinal direction (the central axis direction of the arc or curve) with respect to stationary body 20J (mainly case 21J etc.) (positioning of the movable body).

When coil 70J is supplied with power through power supply section 25 and excited, core 50J of E-shaped core 504J is magnetized, and a thrust occurs according to the relationship of the magnetic poles of the magnet disposed opposite thereto. More specifically, core 50J is supplied with power to coil 70J from power supply section 25 and excited, which in turn excites E-shaped core 50J itself, and reciprocatorily moves (reciprocatorily vibrates) movable body 30J including magnet 60J in the longitudinal direction, i.e., J direction (for example, see FIG. 40) orthogonal to the circumferential direction. That is, movable body 30J reciprocatorily vibrates with respect to stationary body 20J in the direction along facing surfaces 61J and 51J of magnet 60J and core 50J (more specifically, on the other surface of bottom surface 27). This drive principle is an operation principle analogous to that of vibratory actuator 10 in Embodiment 1 achieved by equations 1, 2 and 3 described above.

As described above, in vibratory actuator 10J, E-shaped core 504J, i.e., facing surface 51J of core 50J and facing surfaces 506J of core pieces 505J are magnetized by alternate current waves input from power supply section 25 into coil 70J. The magnetic attractive force and repulsion effectively occur to magnetic pole surface 61J of magnet 60J of movable body 30J. Accordingly, movable body 30J can be effectively driven in a direction along the surfaces opposite to each other, that is, a direction along the mutual surfaces that are facing surface 51J of core 50J and facing surfaces 506J of core pieces 505J, and magnetic pole surface 61J of magnet 60J of movable body 30J.

Vibratory actuator 10J can obtain advantageous effects analogous to <Advantageous Effect 1> to <Advantageous Effect 8>, while movable body 30J (magnet 60J, yoke 90J, and bearing section 52J) is elastically supported by the magnetic spring due to the magnetic attractive force caused by magnet 60J and E-shaped core 504J. That is, movable body 30J is movably and elastically supported without using the metal spring. Consequently, the need to consider the fatigue of the material of the metal spring in a case of including the metal spring is negated, and the reliability of the vibratory actuator is improved.

Furthermore, the following advantageous effects can be obtained.

Magnet 60J and E-shaped core 504J facing magnet 60J have the same height (the length in the thickness direction). Accordingly, the neutral point of the magnetic attractive force becomes stable. Consequently, deviation to the rotational direction becomes resistant to occurring, and movable body 30J can be stably linearly driven in the longitudinal direction orthogonal to the height direction. In addition, the position of movable body 30J is regulated by the magnetic attractive force of magnet 60J. Consequently, movable body 30J can be prevented from coming into contact with the inner wall surfaces of case 21J and cover 24J. Furthermore, the position can be regulated without separately adding any sliding member for favorably, linearly driving movable body 30J, thereby negating the cost.

As for E-shaped core 504J of stationary body 20J, facing surfaces 51J and 506J are disposed so that power supply to coil 70J can cause both the sides of facing surface 51J at the center to have a magnetic pole different from that of facing surface 51J at the center. Meanwhile, magnet 60J is disposed so that the centers of core 50J and core pieces 505J of E-shaped core 504J can be positioned at the boundaries of the different four pole surfaces on magnetic pole surface 61J.

Accordingly, the thrust can be exerted in a well-balanced manner in the longitudinal direction while magnet 60J of movable body 30J is moved by the magnetic attractive force and magnetic repulsion.

Coil 70J is thus included in movable body 30J. Consequently, the mass of movable body 30J can be increased, which can facilitate a high output. In comparison with the VCM scheme, the magnetic resistance can be reduced, the conversion efficiency can be improved, and a high output can be achieved. Furthermore, the configuration can increase the number of magnetic poles. Consequently, in comparison with the configuration where the number of magnetic poles of the core and the magnet is one or two, not only the conversion efficiency but also the magnetic spring force is increased with increase in the number of magnetic poles accordingly. Consequently, the design requirements for the springs are alleviated, and improvement in the design flexibility of vibratory actuator 10J can be facilitated.

In vibratory actuator 10J, E-shaped core 504J where coil 70J is wound around the central protruding section (core 50J) is disposed in stationary body 20J, multiple-pole (2- to 4-pole, here, 4-pole) magnet 60J is disposed in movable body 30J (provided that the number of magnet poles is X, the number of core poles is X+1 or X−1). Accordingly, in comparison with the case of using the conventional VCM thrust generating principle to move the core according to the law of action and reaction, the mass can be increased and a high output can be facilitated.

This embodiment can reduce the magnetic resistance in comparison with the case of the conventional VCM, improve the energy conversion efficiency, and facilitate achievement of a high output.

Furthermore, vibratory actuator 10J can be manufactured only by accommodating an assembly of movable body 30J and shaft section 80, and an assembly of coil 70J of stationary body 20J and E-shaped core 504J, in case 21J. Consequently, the assemblability is high, and the air gap can be easily adjusted.

Magnet 60J is disposed on movable body 30J side, while coil 70J supplied with power is disposed on stationary body 20J side. Consequently, in comparison with the configuration of moving the coil, the need to provide the wire spring for supplying power to coil is negated, the number of components can be reduced, improvement in the assemblability, reliability, and cost advantage of the vibratory actuator can be facilitated.

In the configuration of vibratory actuator 10J of Embodiment 6 shown in FIGS. 39 to 41, the configuration elements including the magnetic circuit may be formed as they are, while the external shape may be changed from the flat shape having the arc shape in a sectional view to another shape, such as a flat planar shape.

Embodiment 7

Figure 42:
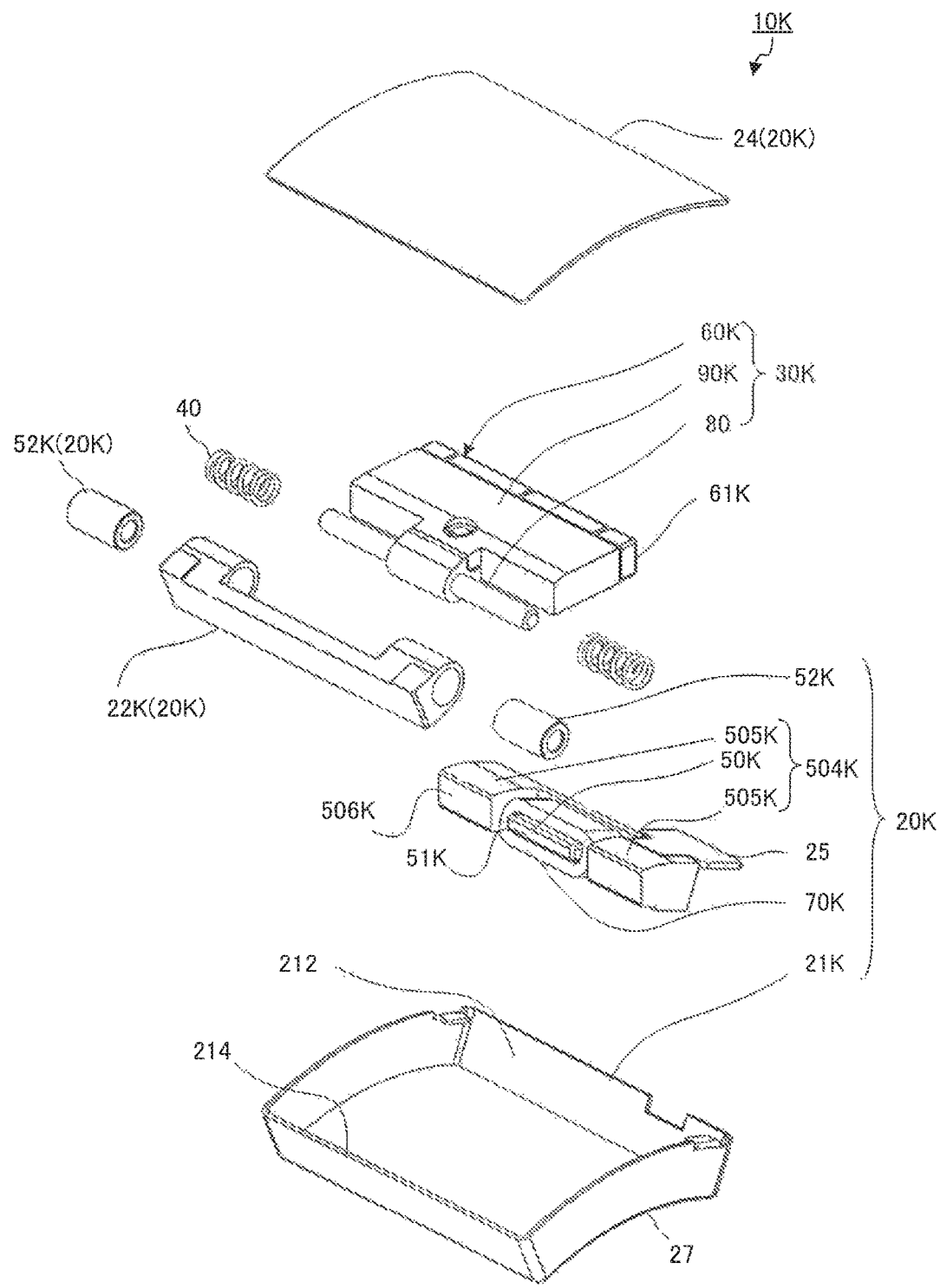
FIG. 42 illustrates an exploded perspective view of a vibratory actuator of Embodiment 7 according to the present invention.
Figure 43:
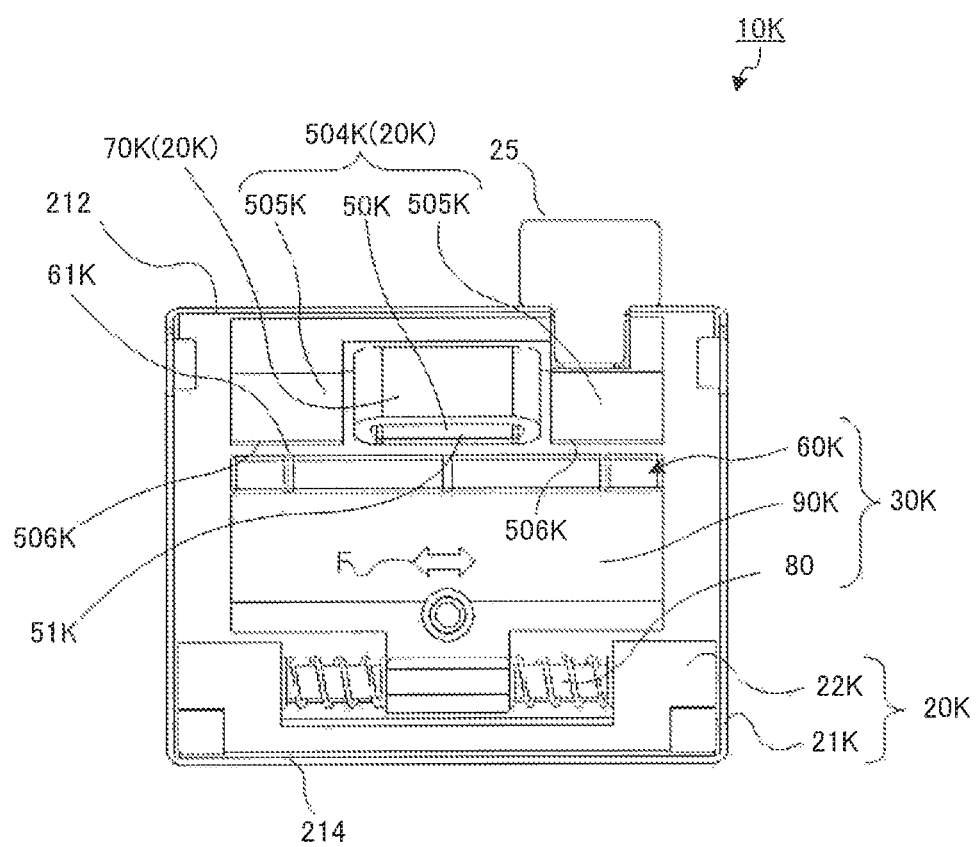
FIG. 43 illustrates a plan view showing an internal configuration of the vibratory actuator of Embodiment 7.

FIG. 42 illustrates an exploded perspective view showing vibratory actuator 10K of Embodiment 7 according to the present invention. FIG. 43 illustrates a plan view showing the internal configuration of vibratory actuator 10K. FIG. 43 shows vibratory actuator 10K in a state where cover 24 is taken away so as to show the internal configuration. In an actual external view, the internal configuration is covered with this cover as with the vibratory actuator shown in FIG. 1.

Vibratory actuator 10K shown in FIGS. 42 and 43 has a magnetic circuit structure which preliminarily presses the movable body as with the magnetic circuit of vibratory actuator 10 and in which a coil and a core are provided for the stationary body, and a magnet, a yoke and a shaft section are provided for a movable body. Configuration elements of vibratory actuator 10K that are analogous to those of vibratory actuator 10 are assigned the same names and the same symbols, and the description of these elements is omitted. Configuration elements that are different only in shape are assigned the same names and are described.

As shown in FIG. 42, vibratory actuator 10K includes stationary body 20K, metal springs 40, and movable body 30K movably elastically supported by metal springs 40 and a magnetic spring.

As shown in FIG. 42, stationary body 20K includes case 21K, holder 22K, bearing section 52K, cover 24 (see FIG. 42) and coil (air core) 70K, and further includes E-shaped core 504K where coil 70K is disposed through the slits, and power supply section 25.

Meanwhile, movable body 30K includes: magnet 60K including multiple magnetic poles (for example, two or four poles; four poles in FIGS. 42 to 43) arranged alternately in the longitudinal direction; shaft section 80; and yoke 90K to which magnet 60K is fixed.

Stationary body 20K has an external shape that is a flat planar shape having an arc shape in a sectional view (curved flat planar shape). Case 21K is formed as with case 21, and includes a peripheral wall section provided vertically from the outer periphery of bottom surface 27. E-shaped core 504K is disposed along the inside of a one side wall (back side wall) 212 along the longitudinal direction in the peripheral wall section. Holder 22K is fixed along the inside of other side wall 214 disposed opposite thereto in the circumferential direction. Holder 22K movably supports movable body 30K via shaft section 80 in the axial direction of shaft section 80, that is, the direction parallel to the central axis of an arc.

E-shaped core 504K is disposed to face movable body 30K in case 21K. E-shaped core 504K is formed in conformity with the shape of case 21K. Slits are formed to divide, into three pieces, one side along the longitudinal direction of the flat plate having an arc shape in a sectional view in conformity with bottom surface 27 that is a curved surface of case 21K, thereby allowing E-shaped core 504K to be formed to have an E-shape in a plan view. E-shaped core 504K includes: a central protruding section (core) 50K that is formed with intervention of slits and has a curved planar shape; and core pieces 505K that are formed integrally with and adjacent to the central protruding section on the opposite sides in the longitudinal direction and protrude toward magnet 60K as with core 50K. Coil 70K is wound through the slits around the outer periphery of core 50K.

Core 50K and core pieces 505K include facing surfaces 51K and 506K disposed to face magnetic pole surface 61K of magnet 60K.

Coil 70K is disposed around core 50K so as to encircle facing surface 51K of core 50K, and is connected to power supply section 25. Coil 70K is excited by electricity supplied from power supply section 25.

Magnetic pole surface 61K of magnet 60K includes multiple magnetic poles. Here, in this embodiment, as shown in FIGS. 42 and 43, four different magnetic poles are disposed in magnetic pole surface 61K to be arranged alternately in the longitudinal direction (axial central direction) of case 21K, and to face facing surfaces 51K and 506K of the E-shaped core.

The configuration where the height of magnet 60K (the length of an arc in the radial direction) is substantially identical to the height of E-shaped core 504K can vibrate movable body 30K in the longitudinal direction (axial direction) while regulating the position of movable body 30K, that is, without deviating in the height direction, and facilitate the design of the clearance.

Magnet 60K is fixed to yoke 90K by adhesion on the opposite side of E-shaped core 504K in the circumferential direction. Shaft section 80 is inserted into and fixed to yoke 90K.

Shaft section 80 is attached at its opposite ends to bearing section 52K movably in the axial direction in a state where the opposite ends are inserted into bearing section 52K of movable body 30K. Bearing section 52K is fixed to holder 22K. Accordingly, shaft section 80 serves as a part of movable body 30K and is thus movable on a line parallel to the central axis of a circle including an arc (the sectional shape of curved bottom surface 27). Bearing section 52K is formed of a sintered sleeve bearing, for example. Cover 24 is attached to case 21K, thereby forming a hollow electromagnetic shield.

Holder 22K supports movable body 30K, which includes magnet 60K integrally configured with shaft section 80, movably in the axial direction in case 21K.

Metal springs 40 are externally applied around shaft section 80 between bearing section 52K and yoke 90K.

As with metal springs 40 in the other embodiments, metal springs 40 hold magnet 60K attached to yoke 90K in a state of facing E-shaped core 504K with a predetermined space being secured, at a position (normal position) where the centers in the longitudinal direction overlap with each other.

In case 21K, E-shaped core 504K including core pieces 505K and core 50K that are magnetic bodies, and magnet 60K are disposed to face each other in a direction orthogonal to the drive direction of movable body 30K. Accordingly, the magnetic attractive force occurs between E-shaped core 504K and magnet 60K. Movable body 30K is elastically supported by the magnetic attractive force, or what is called a magnetic spring. Even if power is not supplied to coil 70K, the magnetic attractive force brings movable body 30K including core 50K and core pieces 505K into the state of being preliminarily pressed.

Accordingly, magnet 60K is brought into a state where the rotation about shaft section 80 is regulated (rotation-stopped) and positioning is made at the center in the longitudinal direction (the central axis direction of the arc or curve) with respect to stationary body 20K (mainly case 21K etc.) (positioning of the movable body).

When coil 70K is supplied with power through power supply section 25 and excited, core 50K of E-shaped core 504K is magnetized, and a thrust occurs according to the relationship of the magnetic poles of the magnet disposed opposite thereto. More specifically, core 50K is supplied with power to coil 70K from power supply section 25 and excited, which in turn excites E-shaped core 50K itself, and reciprocatorily moves (reciprocatorily vibrates) movable body 30K including magnet 60K in the longitudinal direction, i.e., F direction (for example, see FIG. 42) orthogonal to the circumferential direction. This drive principle is an operation principle analogous to that of vibratory actuator 10 in Embodiment 1 achieved by equations 1, 2 and 3 described above.

Vibratory actuator 10K can obtain advantageous effects analogous to <Advantageous Effect 1> to <Advantageous Effect 8>, while movable body 30K (magnet 60K, yoke 90K, and bearing section 52K) is elastically supported by the magnetic spring due to the magnetic attractive force caused by magnet 60K and E-shaped core 504K.

Furthermore, the following advantageous effects can be obtained.

Magnet 60K and E-shaped core 504K facing magnet 60K have the same height (the length in the thickness direction). Accordingly, the neutral point of the magnetic attractive force becomes stable. Consequently, deviation to the rotational direction becomes resistant to occurring, and movable body 30K can be stably linearly driven in the longitudinal direction orthogonal to the height direction. In addition, the position of movable body 30K is regulated by the magnetic attractive force of magnet 60K. Consequently, movable body 30K can be prevented from coming into contact with the inner wall surfaces of case 21K and cover 24K. Furthermore, the position can be regulated without separately adding any sliding member for favorably, linearly driving movable body 30K, thereby negating the cost.

In addition, according to vibratory actuator 10K, shaft section 80 is movable. Even if the mass of movable body 30K is insufficient at the time of designing the vibratory actuator, the mass of shaft section 80 can be added to the mass of movable body 30K, thereby allowing the output of vibratory actuator 10K to be increased.

In E-shaped core 504K of stationary body 20K, facing surfaces 51K and 506K are disposed so that power supply to coil 70K can cause both the sides of facing surface 51K at the center to have a magnetic pole different from that of facing surface 51K at the center. Meanwhile, magnet 60K is disposed so that the centers of core 50K and core pieces 505K of E-shaped core 504K can be positioned at the boundaries of the different four pole surfaces on magnetic pole surface 61K.

Accordingly, the thrust can be exerted in a well-balanced manner in the longitudinal direction while magnet 60K of movable body 30K is moved by the magnetic attractive force and magnetic repulsion.

Coil 70K is thus included in movable body 30K. Consequently, the mass of movable body 30K can be increased, which can facilitate a high output. In comparison with the VCM scheme, the magnetic resistance can be reduced, the conversion efficiency can be improved, and a high output can be achieved. Furthermore, the configuration can increase the number of magnetic poles. Consequently, in comparison with the configuration where the number of magnetic poles of the core and the magnet is one or two, not only the conversion efficiency but also the magnetic spring force is increased with increase in the number of magnetic poles accordingly. Consequently, the design requirements for springs are alleviated, and improvement in the design flexibility of vibratory actuator 10K can be facilitated.

In vibratory actuator 10K, E-shaped core 504K where coil 70K is wound around the central protruding section (core 50K) is disposed in stationary body 20K, multiple-pole (2- to 4-pole, here, 4-pole) magnet 60K is disposed in movable body 30K (provided that the number of magnet poles is X, the number of core poles is X+1 or X−1). Accordingly, in comparison with the case of using the conventional VCM thrust generating principle to move the core according to the law of action and reaction, the mass can be increased and a high output can be facilitated.

This embodiment can reduce the magnetic resistance in comparison with the case of the conventional VCM, improve the energy conversion efficiency, and facilitate achievement of a high output.

Furthermore, vibratory actuator 10K can be manufactured only by accommodating an assembly of movable body 30K and shaft section 80, and an assembly of coil 70K of stationary body 20K and E-shaped core 504K, in case 21K. Consequently, the assemblability is high, and the air gap can be easily adjusted.

Magnet 60K is disposed on movable body 30K side, while coil 70K supplied with power is disposed on stationary body 20K side. Consequently, in comparison with the configuration of moving the coil, the need to provide the wire spring for supplying power to coil is negated, the number of components can be reduced, improvement in the assemblability, reliability, and cost advantage of the vibratory actuator can be facilitated.

In the configuration of vibratory actuator 10K of Embodiment 7 shown in FIGS. 42 and 43, the configuration elements including the magnetic circuit may be formed as they are, while the external shape may be changed from the flat shape having the arc shape in a sectional view to another shape, such as a flat planar shape.

Embodiment 8

Figure 44:
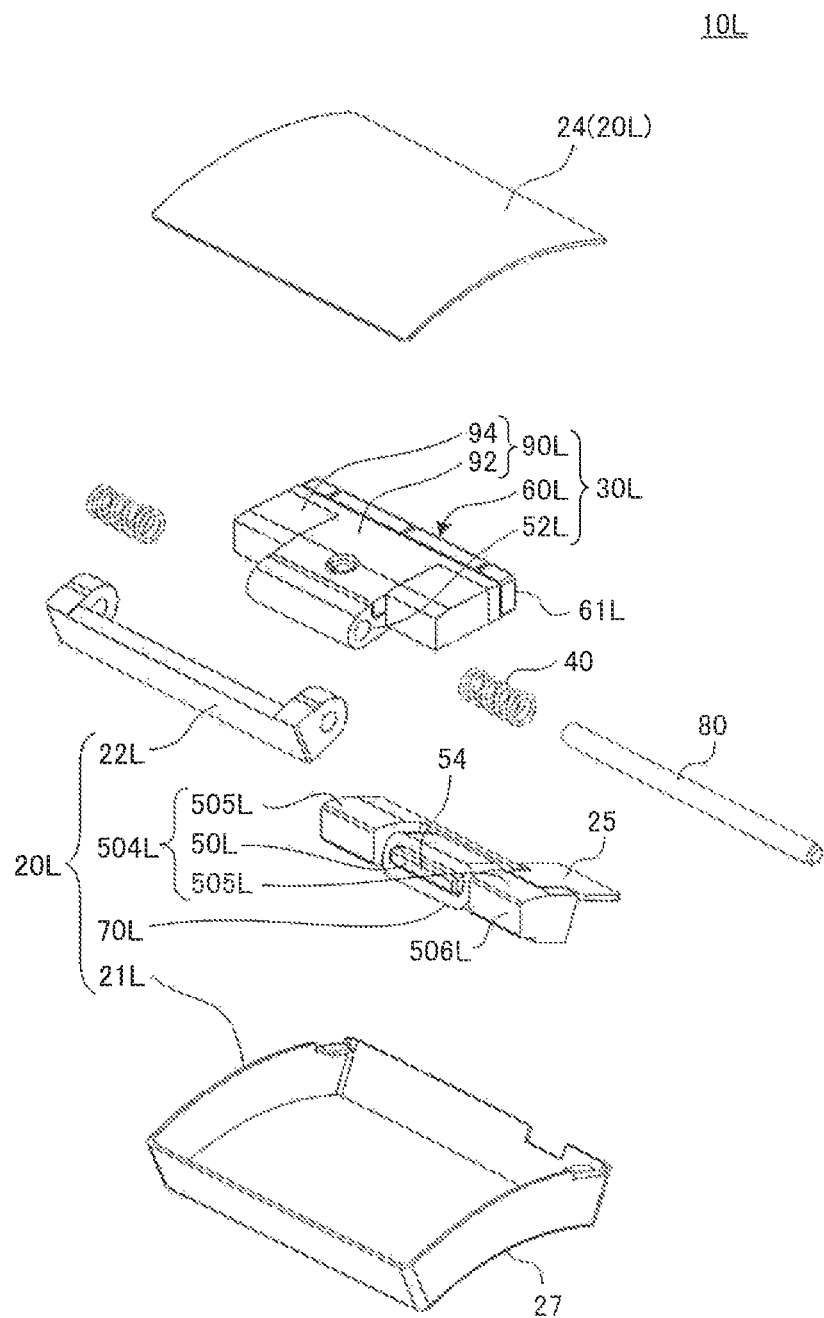
FIG. 44 illustrates an exploded perspective view of a vibratory actuator of Embodiment 8 according to the present invention.
Figure 45:
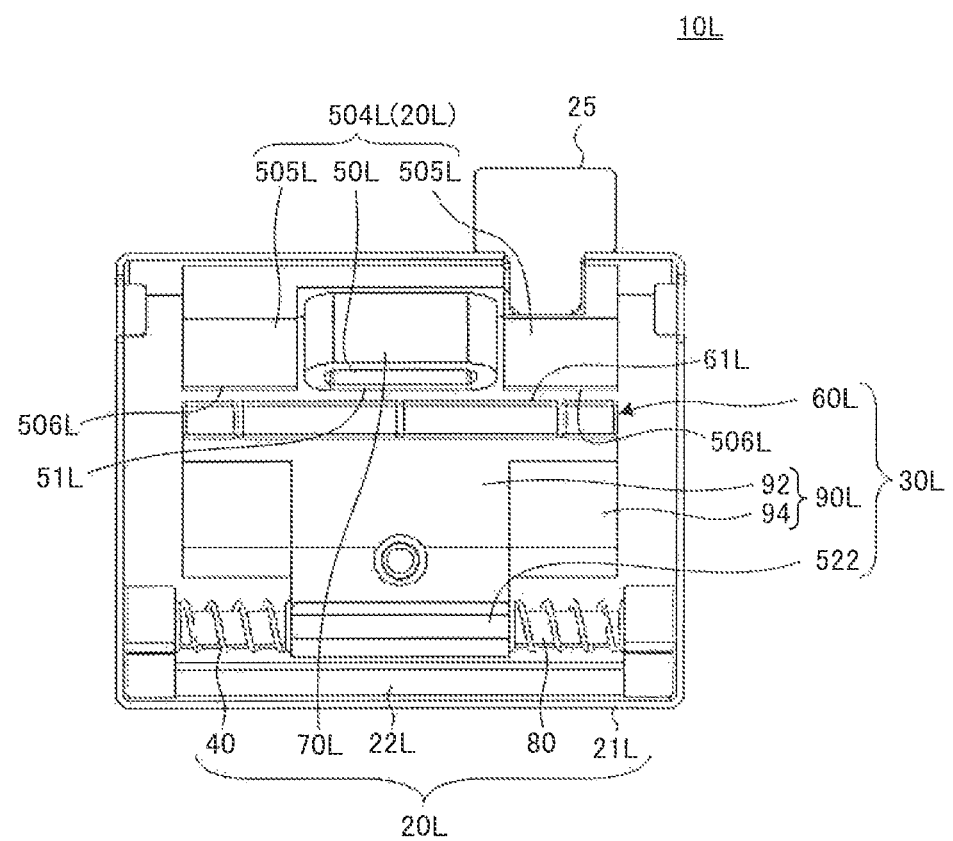
FIG. 45 illustrates a plan view showing an internal configuration of the vibratory actuator of Embodiment 8.

FIG. 44 illustrates an exploded perspective view showing vibratory actuator 10L of Embodiment 8 according to the present invention. FIG. 45 illustrates a plan view showing the internal configuration of vibratory actuator 10L. FIG. 45 shows vibratory actuator 10L in a state where cover 24 is taken away so as to show the internal configuration. In an actual external view, the internal configuration is covered with this cover as with the vibratory actuator shown in FIG. 1.

Vibratory actuator 10L shown in FIGS. 44 and 45 has a magnetic circuit structure which preliminarily presses the movable body as with the magnetic circuit of vibratory actuator 10 and in which a coil and a core are provided for the stationary body, and a magnet and a yoke are provided for a movable body. Configuration elements of vibratory actuator 10L that are analogous to those of vibratory actuator 10 are assigned the same names and the same symbols, and the description of these elements is omitted. Configuration elements that are different only in shape are assigned the same names and are described.

As shown in FIGS. 44 and 45, vibratory actuator 10L includes stationary body 20L, metal springs 40, and movable body 30L movably supported by metal springs 40 and a magnetic spring. In comparison with vibratory actuator 10F shown in FIG. 23, vibratory actuator 10L has configuration elements different from those where a high specific weight material is added to yoke 90L of movable body 30L, other configuration elements are substantially the same. Consequently, configuration elements having functions analogous to those of vibratory actuator 10F, among the configuration elements of vibratory actuator 10L, are assigned the same names and the same symbols, and the description is omitted.

According to vibratory actuator 10L shown in FIG. 44, stationary body 20L is formed in a manner analogous to stationary body 20F (see FIG. 23), and has a flat planar shape having an arc shape in a sectional view (curved flat planar shape). As for stationary body 20L, holder 22L, and E-shaped core 504L where coil 70L is disposed through slits, in case 21L. E-shaped core 504L is provided with power supply section 25 connected to coil 70L. Movable body 30L is supported by holder 22L via shaft section 80 movably in the longitudinal direction (in parallel to the central axis of an arc).

Movable body 30L is supported between holder 22L and bearing section 52L by metal springs 40 externally applied around shaft section 80, so as to face a position (normal position) where the center position of magnet 60L in the longitudinal direction overlaps with the center of E-shaped core 504L in the longitudinal direction. Cover 24 is attached to case 21L, thereby forming a hollow electromagnetic shield.

Movable body 30L includes: magnet 60L including multiple magnetic poles (for example, two or four poles; four poles in FIGS. 44 and 45) arranged alternately in the longitudinal direction; and yoke 90L to which magnet 60L is fixed.

For example, a high specific weight material 94 that has a higher specific weight than yoke main body 92 formed of a material, such as SECC, which constitutes yoke 90L itself is added to yoke 90L. Here, for example, tungsten, a tungsten alloy or the like is adopted as high specific weight material 94. In this case, SECC is adopted as the configurational material of movable body 30L (it is also applicable to movable bodies of the other embodiments). Electromagnetic stainless steel is adopted as the yoke or core. Nd sintered magnet is adopted as the magnet. Copper is adopted as the coil. For example, exemplary references of specific weights are SECC: 7.8, Nd sintered magnet: 7.4 to 7.6, copper: 8.9, and tungsten: 16 to 19.

E-shaped core 504L is disposed to face movable body 30L in case 21L. E-shaped core 504L is formed in conformity with the shape of case 21L. Slits are formed to divide, into three pieces, one side along the longitudinal direction of the flat plate having an arc shape in a sectional view in conformity with bottom surface 27 that is a curved surface of case 21L, thereby allowing E-shaped core 504L to be formed have an E-shape in a plan view. E-shaped core 504L includes: a central protruding section (core) 50L that is formed with intervention of slits and has a curved planar shape; and core pieces 505L that are formed integrally with and adjacent to the central protruding section on the opposite sides in the longitudinal direction and protrude toward magnet 60L as with core 50L. Coil 70L is wound through the slits around the outer periphery of core 50L.

Core 50L and core pieces 505L include facing surfaces 51L and 506L disposed to face magnetic pole surface 61L of magnet 60L.

Coil 70L is disposed around core 50L so as to encircle facing surface 51L of core 50L, and is connected to power supply section 25. Coil 70L is excited by electricity supplied from power supply section 25.

Magnetic pole surface 61L of magnet 60L, which is a surface facing E-shaped core 504L, includes multiple magnetic poles. Here, in this embodiment, as shown in FIGS. 44 and 45, four different magnetic poles are disposed in magnetic pole surface 61L to be arranged alternately in the longitudinal direction (axial central direction) of case 21L, and to face facing surfaces 51L and 506L of the E-shaped core. Magnetic pole surface 61L and facing surfaces 506L and 51L of magnet 60L and E-shaped core 504L may have a freely selected angle. For example, the configuration may be adopted that has a relationship analogous to the relationship of the angle between magnetic pole surface 61F and facing surfaces 506F and 60F in vibratory actuator 10F shown in FIG. 26.

The configuration where the height of magnet 60L (the length of an arc in the radial direction) is substantially identical to the height of E-shaped core 504L can vibrate movable body 30L in the longitudinal direction (axial direction) while regulating the position of movable body 30L, that is, without deviating in the height direction and facilitate the design of the clearance.

As for case 21L, E-shaped core 504L including core pieces 505L and core 50L that are magnetic bodies, and magnet 60L are disposed to face each other in a direction orthogonal to the drive direction of movable body 30L. Accordingly, the magnetic attractive force occurs between E-shaped core 504L and magnet 60L. Movable body 30L is elastically supported by the magnetic attractive force, or what is called a magnetic spring. Even if power is not supplied to coil 70L, the magnetic attractive force brings movable body 30L including core 50L and core pieces 505L into the state of being preliminarily pressed.

Accordingly, magnet 60L is brought into a state where the rotation about shaft section 80 is regulated (rotation-stopped) and positioning is made at the center in the longitudinal direction (the central axis direction of the arc or curve) with respect to stationary body 20L (mainly case 21L etc.) (positioning of the movable body).

When coil 70L is supplied with power through power supply section 25 and excited, core 50L of E-shaped core 504L is magnetized, and a thrust occurs according to the relationship of the magnetic poles of the magnet disposed opposite thereto. More specifically, core 50L is supplied with power to coil 70L from power supply section 25 and excited, which in turn excites E-shaped core 50L itself, and reciprocatorily moves (reciprocatorily vibrates) movable body 30L including magnet 60L in the longitudinal direction of case 21L, i.e., F direction orthogonal to the circumferential direction, on the other surface of bottom surface 27. Movable body 30L reciprocatorily vibrates with respect to stationary body 20L in the direction along facing surfaces 61L and 51L of magnet 60L and core 50L. This drive principle is an operation principle analogous to that of vibratory actuator 10 in Embodiment 1 achieved by equations 1, 2 and 3 described above.

According to vibratory actuator 10L, advantageous effects analogous to <Advantageous Effect 1> to <Advantageous Effect 8> can be obtained. Furthermore, in vibratory actuator 10L, a material (high specific weight material) having a higher specific weight than the material of which the main configuration elements of movable body 30L are made has, here, tungsten, is added to movable body 30L.

For example, if ferrous metals including SECC and electromagnetic stainless steel, and a copper coil and an Nd sintered magnet are adopted as the main configuration element of movable body 30L, for example, yoke 90L, bearing section 52L, the coil, the magnet, etc., the specific weight is about 7 to 9. Accordingly, if the mass of the movable body having a determined size is intended to be increased in the conventional design, selection of the material is a problem. In this embodiment, high specific weight material 94 that is tungsten is added to yoke main body 92 formed of SECC, thereby forming movable body 30L.

According to the movable body where entire yoke 90L is formed of SECC, and the movable body that includes yoke main body 92 made of SECC and high specific weight material 94 made of tungsten as yoke 90L, the specific weight of the high specific weight material is about 16 to 19. Consequently, the mass of the movable body can be increased. Resultantly, the output can be increased.

Magnet 60L and E-shaped core 504L facing magnet 60L have the same height (the length in the thickness direction). Accordingly, the neutral point of the magnetic attractive force becomes stable. Consequently, deviation to the rotational direction becomes resistant to occurring, and movable body 30L can be stably linearly driven in the longitudinal direction orthogonal to the height direction. In addition, the position of movable body 30L is regulated by the magnetic attractive force of magnet 60L. Consequently, movable body 30L can be prevented from coming into contact with the inner wall surfaces of case 21L and cover 24. Furthermore, the position can be regulated without separately adding any sliding member for favorably, linearly driving movable body 30L, thereby negating the cost.

Furthermore, vibratory actuator 10L can be manufactured only by accommodating an assembly of movable body 30L and shaft section 80, and an assembly of coil 70L of stationary body 20L and E-shaped core 504L, in case 21L. Consequently, the assemblability is high, and the air gap can be easily adjusted.

Magnet 60L is disposed on movable body 30L side, while coil 70L supplied with power is disposed on stationary body 20L side. Consequently, in comparison with the configuration of moving the coil, the need to provide the wire spring for supplying power to coil is negated, the number of components can be reduced, improvement in the assemblability, reliability, and cost advantage of the vibratory actuator can be facilitated.

In the configuration of vibratory actuator 10L of Embodiment 8 shown in FIGS. 44 and 45, the configuration elements including the magnetic circuit may be formed as they are, while the external shape may be changed from the flat shape having the arc shape in a sectional view to another shape, such as a flat planar shape.

Embodiment 9

Figure 46:
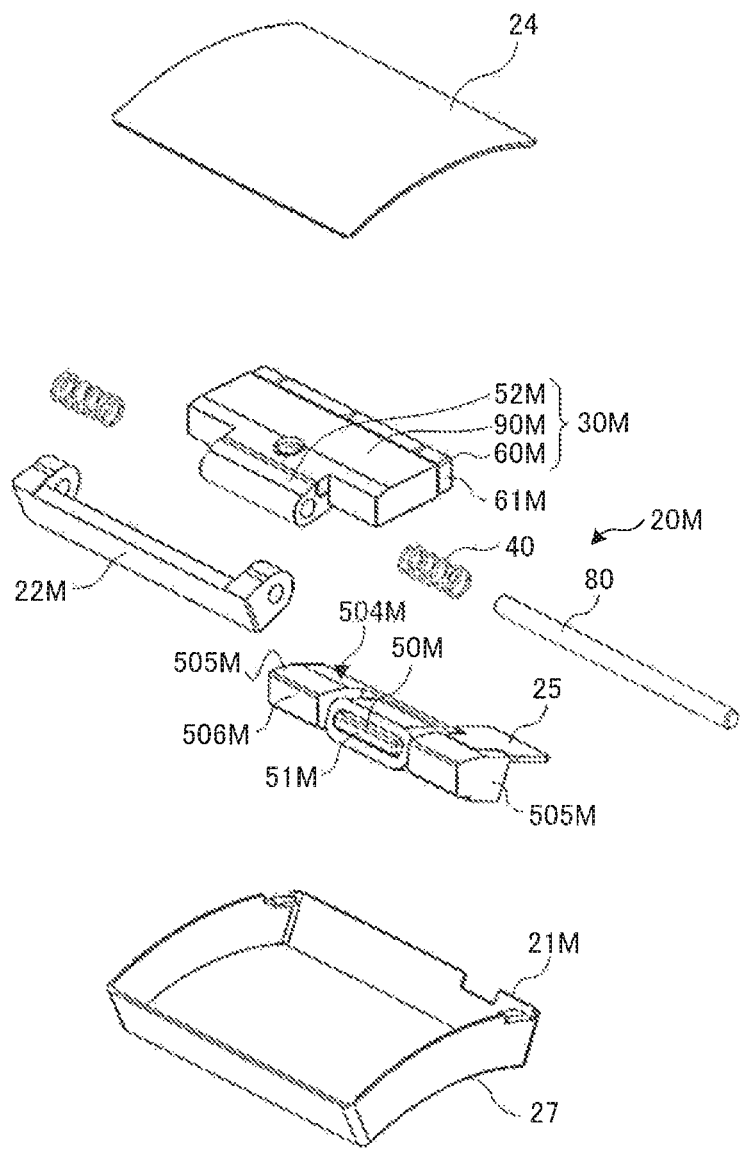
FIG. 46 illustrates an exploded perspective view of a vibratory actuator of Embodiment 9 according to the present invention.
Figure 47:
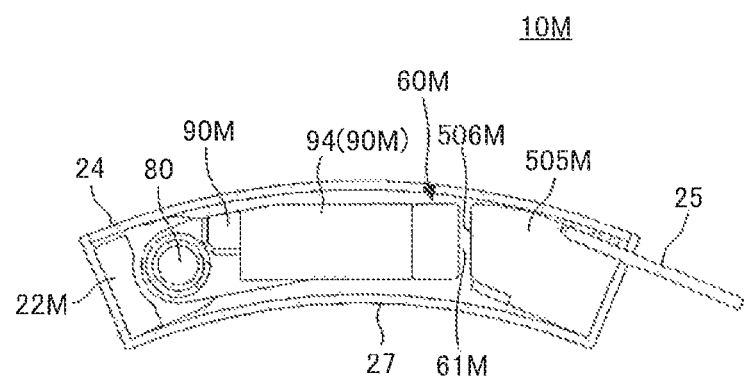
FIG. 47 illustrates a side view showing the positional relationship among the main components of the vibratory actuator of Embodiment 9.

FIG. 46 illustrates an exploded perspective view showing vibratory actuator 10M of Embodiment 9 according to the present invention. FIG. 47 illustrates a side view showing the positional relationship among the main components of vibratory actuator 10M.

Vibratory actuator 10M shown in FIGS. 46 and 47 has a magnetic circuit structure which preliminarily presses the movable body as with the magnetic circuit of vibratory actuator 10 and in which a coil and a core are provided for the stationary body, and a magnet and a yoke are provided for a movable body. Configuration elements of vibratory actuator 10M that are analogous to those of vibratory actuator 10 are assigned the same names and the same symbols, and the description of these elements is omitted. Configuration elements that are different only in shape are assigned the same names and are described.

More specifically, vibratory actuator 10M has a configuration different from vibratory actuator 10F (see FIGS. 23 to 27) only in the shape of magnet 60F and the shape of E-shaped core 504F, but the other configurations are analogous to those of actuator 10F.

That is, vibratory actuator 10M includes stationary body 20M, metal springs 40, and movable body 30M movably elastically supported by metal springs 40 and a magnetic spring.

Stationary body 20M is formed in a manner analogous to that of stationary body 20F (see FIG. 23), and has a flat planar shape having an arc shape in a sectional view (curved flat planar shape). As for stationary body 20M, holder 22M, and E-shaped core 504M where coil 70M is disposed through slits, are disposed in case 21M. E-shaped core 504M is provided with power supply section 25 connected to coil 70M. Movable body 30M is supported by holder 22M via shaft section 80 movably in the longitudinal direction (in parallel to the central axis of an arc).

Movable body 30M is held between holder 22M and bearing section 52M by metal springs 40 externally applied around shaft section 80, so as to face a position (normal position) where the center position of magnet 60M in the longitudinal direction overlaps with the center of E-shaped core 504M in the longitudinal direction. Cover 24 is attached to case 21M, thereby forming a hollow electromagnetic shield.

Movable body 30M includes: magnet 60M including multiple magnetic poles (for example, two or four poles; four poles in FIGS. 46 and 47) arranged alternately in the longitudinal direction; and yoke 90M to which magnet 60M is fixed.

Magnet 60M adheres to yoke 90M on the side opposite to E-shaped core 504M in the circumferential direction. Yoke 90M is formed integrally with bearing section 52M. Shaft section 80 is inserted into bearing section 52M, which is formed of a sintered sleeve bearing. Bearing section 52M is caulked and fixed to yoke 90M and is thus integrally provided. Shaft section 80 is inserted into bearing section 52M. Movable body 30M is supported via shaft section 80 with respect to stationary body 20M, in the longitudinal direction, i.e., in parallel to the central axis of an arc, i.e., in the same direction as a direction in which the central axis extends, in a movable manner, and also in a rotatable manner about shaft section 80.

E-shaped core 504M is disposed to face movable body 30M in case 21M. E-shaped core 504M is formed in conformity with the shape of case 21M. Slits are formed to divide, into three pieces, one side along the longitudinal direction of the flat plate having an arc shape in a sectional view in conformity with bottom surface 27 that is a curved surface of case 21M, thereby allowing E-shaped core 504M to be formed have an E-shape in a plan view. E-shaped core 504M includes: a central protruding section (core) 50M that is formed with intervention of slits and has a curved planar shape; and core pieces 505M that are formed integrally with and adjacent to the central protruding section on the opposite sides in the longitudinal direction and protrude toward magnet 60M as with core 50M. Coil 70M is wound through the slits around the outer periphery of core 50M.

Core 50M and core pieces 505M include facing surfaces 51M and 506M disposed to face magnetic pole surface 61M of magnet 60M.

In this embodiment, as shown in FIG. 47, core 50M and core pieces 505M, and magnetic pole surface 61M of magnet 60M each extend in the perpendicular direction with each other, in comparison with vibratory actuator 10F.

According to vibratory actuator 10M, magnet 60M of movable body 30M is formed of a rectangular magnet.

Accordingly, although it also depends on the curvature of the external shape of the vibratory actuator and the disposition relationship of shaft section 80, the position of the air gap between magnet 60M and E-shaped core 504M, and the position of shaft section 80 that supports movable body 30M can be disposed at positions substantially symmetrical with respect to the center of vibratory actuator 10M. That is, adoption of a general shaped magnet as magnet 60M can facilitate reduction in the cost of vibratory actuator itself. The magnetic attractive force between magnetic pole surface 61M of magnet 60M and facing surfaces 51M and 506M of E-shaped core 504M moves the position of movable body 30M. Consequently, the adjustment of the movement requires adjustment of the angle of magnetic pole surface 61M of magnet 60M. The magnet shape that is a trapezoid shape in a sectional view as in Embodiment 4 increases the cost. The above configuration is adopted in order to prevent such increase.

The magnetic attractive force occurs between E-shaped core 504M and magnet 60M. Movable body 30M is elastically supported by the magnetic attractive force, or what is called a magnetic spring. Even if power is not supplied to coil 70M, the magnetic attractive force brings movable body 30M including core 50M and core pieces 505M into the state of being preliminarily pressed.

Accordingly, magnet 60M is brought into a state where the rotation about shaft section 80 is regulated (rotation-stopped) and positioning is made at the center in the longitudinal direction (the central axis direction of the arc or curve) with respect to stationary body 20M (mainly case 21M etc.) (positioning of the movable body).

When coil 70M is supplied with power through power supply section 25 and excited, core 50M of E-shaped core 504M is magnetized, and a thrust occurs according to the relationship of the magnetic poles of the magnet disposed opposite thereto. More specifically, core 50M is supplied with power to coil 70M from power supply section 25 and excited, which in turn excites E-shaped core 504M itself, and reciprocatorily moves (reciprocatorily vibrates) movable body 30M including magnet 60M in the longitudinal direction, i.e., M direction (for example, analogous to the movement of movable body 30F shown in FIG. 27) orthogonal to the circumferential direction. This drive principle is an operation principle analogous to that of vibratory actuator 10 in Embodiment 1 achieved by equations 1, 2 and 3 described above.

Magnet 60M and E-shaped core 504M facing magnet 60M have the same height (the length in the thickness direction). Accordingly, the neutral point of the magnetic attractive force becomes stable. Consequently, deviation to the rotational direction becomes resistant to occurring, and movable body 30M can be stably linearly driven in the longitudinal direction orthogonal to the height direction. In addition, the position of movable body 30M is regulated by the magnetic attractive force of magnet 60M. Consequently, movable body 30M can be prevented from coming into contact with the inner wall surfaces of case 21M and cover 24. Furthermore, the position can be regulated without separately adding any sliding member for favorably, linearly driving movable body 30M, thereby negating the cost.

Furthermore, vibratory actuator 10M can be manufactured only by accommodating an assembly of movable body 30M and shaft section 80, and an assembly of coil 70M of stationary body 20M and E-shaped core 504M, in case 21M. Consequently, the assemblability is high, and the air gap can be easily adjusted.

Magnet 60M is disposed on movable body 30M side, while coil 70M supplied with power is disposed on stationary body 20M side. Consequently, in comparison with the configuration of moving the coil, the need to provide the wire spring for supplying power to coil is negated, the number of components can be reduced, improvement in the assemblability, reliability, and cost advantage of the vibratory actuator can be facilitated.

In the configuration of vibratory actuator 10M of Embodiment 9 shown in FIGS. 46 and 47, the configuration elements including the magnetic circuit may be formed as they are, while the external shape may be changed from the flat shape having the arc shape in a sectional view to another shape, such as a flat planar shape.

Embodiment 10

Figure 48:
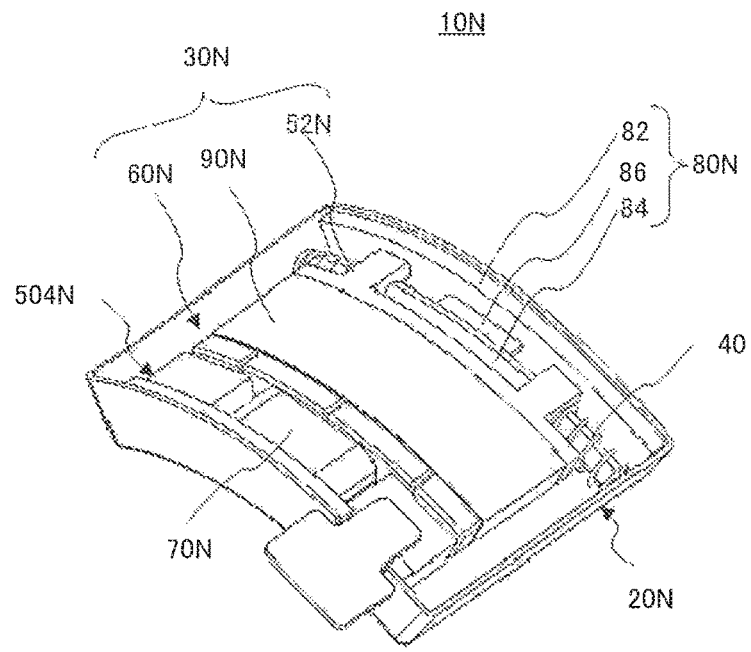
FIG. 48 illustrates a perspective view showing an internal configuration of a vibratory actuator of Embodiment 10 according to the present invention.
Figure 49:
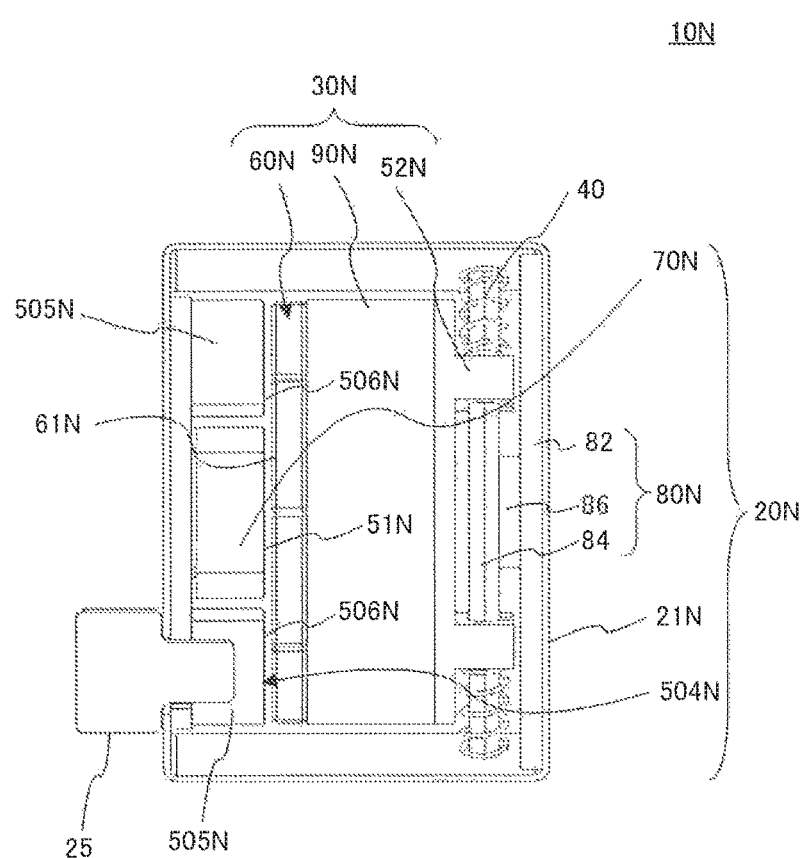
FIG. 49 illustrates a plan view showing an internal configuration of the vibratory actuator of Embodiment 10.
Figure 50:
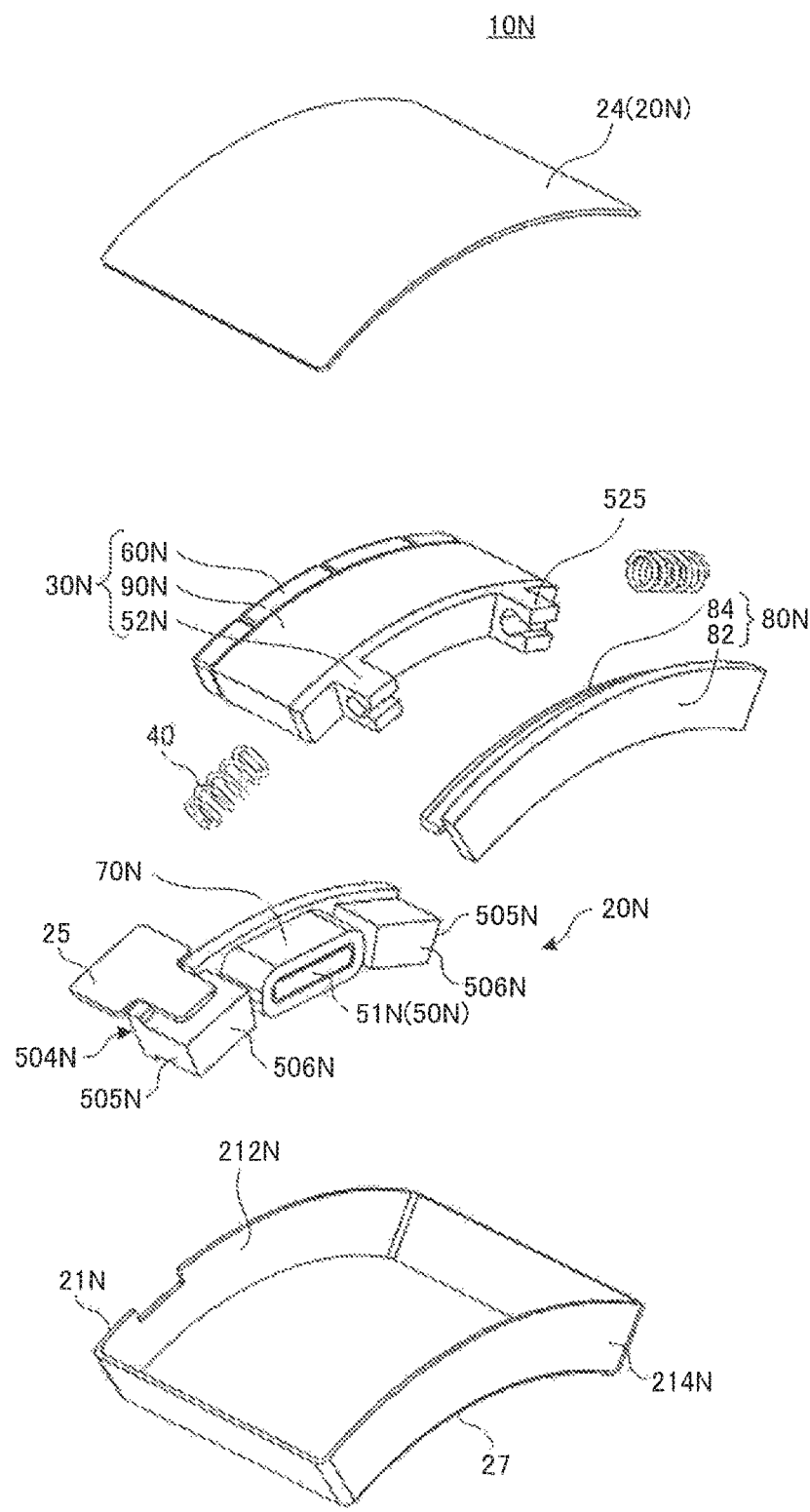
FIG. 50 illustrates an exploded perspective view of the vibratory actuator of Embodiment 10.
Figure 51:
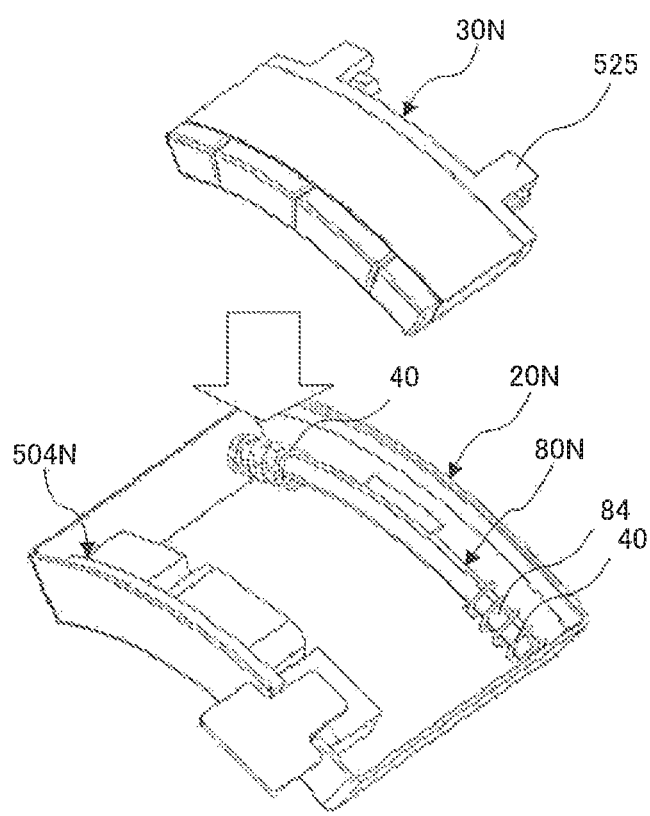
FIG. 51 illustrates a diagram where the movable body is taken away from the stationary body in the vibratory actuator of Embodiment 10.

FIG. 48 illustrates an external view showing a configuration of vibratory actuator 10N of Embodiment 10 according to the present invention. FIG. 49 illustrates a plan view showing the internal configuration of vibratory actuator 10N. FIGS. 48 and 49 show vibratory actuator 10N in a state where cover 24 is taken away. In an actual external view, the internal configuration is covered with this cover as with the vibratory actuator shown in FIG. 1. FIG. 50 illustrates an exploded perspective view of vibratory actuator 10N. FIG. 51 illustrates a diagram where the movable body is taken away from the stationary body in vibratory actuator 10N.

Vibratory actuator 10N shown in FIGS. 48 to 51 includes a magnetic circuit structure that preliminarily presses a movable body in an external shape of a flat planar shape having an arc shape in a sectional view (curved flat planar shape), as with the magnetic circuit of vibratory actuator 10. The movable body moves in the circumferential direction of the arc. Here, a coil and a core are included in a stationary body. A magnet and yoke are included in the movable body.

Configuration elements of vibratory actuator 10N that are analogous to those of vibratory actuator 10 are assigned the same names and the same symbols, and the description of these elements is omitted. Configuration elements that are different only in shape are assigned the same names and are described.

As shown in FIG. 48, vibratory actuator 10N includes stationary body 20N, and movable body 30N movably and elastically supported by metal springs 40 and by a magnetic spring (formed of magnet 60N and E-shaped core 504N) to stationary body 20N.

As shown in FIGS. 49 and 50, stationary body 20N includes case 21N, holder 22N, rail 80N, cover 24 and coil (air core) 70N, and further includes E-shaped core 504N where coil 70N is disposed through the slits, and power supply section 25.

Meanwhile, movable body 30N is formed in conformity with the shape of case 21N and, in this case, is formed to have an external shape that is a flat planar shape having an arc shape in a sectional view (curved flat planar shape).

Movable body 30N includes: magnet 60N including multiple magnetic poles (for example, two or four poles; four poles in FIGS. 48 to 51) arranged alternately in the longitudinal direction; yoke 90N to which magnet 60N is fixed; and slider 52N to which the yoke is fixed.

Stationary body 20N includes case 21N having an external shape that is flat planar shape having an arc shape in a sectional view (curved flat planar shape). Case 21N is formed in an arc shape in a side view as with case 21. E-shaped core 504N is disposed in case 21N along the inside of arc-shaped one side wall 212N in a peripheral wall section from the outer periphery of bottom surface 27. A curved-shaped rail 80N is fixed along the inside of other side wall 214N opposite to one side wall 212N in the circumferential direction.

E-shaped core 504N is formed in conformity with the shape of case 21N, and includes slits cut in parallel to the central axis of an arc in a sectional view so as to divide, into three pieces, one side along the circumferential direction of the flat plate having an arc shape in a sectional view in conformity with bottom surface 27 that is a curved surface of case 21N. Accordingly, E-shaped core 504N is formed in an E-shape in a plan view that includes three pieces (core 50N and core pieces 505N) protruding in a direction orthogonal to the circumferential direction.

E-shaped core 504N is disposed to face movable body 30N in case 21N.

Core 50N is a central protruding section that intervenes between the slits. Core pieces 505N that are adjacent to the central protruding section on both the sides in the longitudinal direction and protrude toward magnet 60N. Core 50N and core pieces 505N are disposed to face magnet 60N, and include facing surfaces 51N and 506N disposed to face magnetic pole surface 61N of magnet 60N.

Coil 70N is disposed around core 50N so as to encircle facing surface 51N of core 50N, and is connected to power supply section 25. Coil 70N is excited by electricity supplied from power supply section 25.

Rail 80N is disposed along an arc (sectional shape of curved bottom surface 27) of case 21N. Cover 24 is attached to case 21N, thereby forming a hollow electromagnetic shield.

Rail 80N includes fixation plate section 82 fixed to other side wall 214N, and slider rod 84.

Slider rod 84 is disposed along fixation plate section 82, with a predetermined space being secured from fixation plate section 82. Slider rod 84 is fixed to rib 86 provided to protrude at the center of fixation plate section 82. Both the ends project in the circumferential direction and are configured as free ends.

Multiple metal springs 40 are applied around slider rod 84. Slider nails 525 of slider 52N are slidably engaged with movable body 30N, at a part between metal springs 40. Engagement of slider nails 525 with slider rod 84 allows movable body 30N to be supported by rail 80N slidably in the direction where rail 80N extends.

Movable body 30N allows magnetic pole surface 61N of magnet 60N to be disposed to face facing surfaces 51N and 506N of E-shaped core 504N, with a gap being secured therebetween. Magnetic pole surface 61N includes multiple magnetic poles. Here, in this embodiment, as shown in FIGS. 48 to 51, four different magnetic poles are arranged alternately along the movement direction of movable body 30N (here, the circumferential direction), that is, the longitudinal direction (circumferential direction) of case 21N, on magnetic pole surface 61N.

The configuration where the height of magnet 60N (the length of an arc in the radial direction) is substantially identical to the height of E-shaped core 504N can vibrate movable body 30N in the longitudinal direction (circumferential direction) while regulating the position of movable body 30N, that is without deviating in the height direction, and facilitate the design of the clearance.

Magnet 60N is fixed to yoke 90N. Yoke 90N is fixed to slider 52N. As for slider 52N, here, at least slider nails 525 are formed of sintered metal.

Accordingly, in case 21N, E-shaped core 504N that is included in stationary body 20N and includes core pieces 505N and core 50N that are magnetic bodies, and magnet 60N included in movable body 30N are disposed so that facing surfaces 51N and 506N, and magnetic pole surface 61N along the drive direction of movable body 30N can face each other.

Accordingly, the magnetic attractive force occurs between E-shaped core 504N and magnet 60N. Movable body 30N is elastically supported by the magnetic attractive force, or what is called a magnetic spring. The magnetic attractive force forms a magnetic spring between E-shaped core 504N and magnet 60N. Accordingly, a state is achieved where movable body 30N including core 50N and core pieces 505N are preliminarily pressed even when coil 70N is not supplied with power.

Accordingly, magnet 60N is brought into a state where the rotation about slider rod 84 is regulated (rotation-stopped) and positioning is made at the center in the longitudinal direction (the central axis direction of the arc or curve) with respect to stationary body 20N (mainly case 21N etc.) (positioning of the movable body). Accordingly, the position of movable body 30N is regulated by the magnetic attractive force of magnet 60N. Consequently, movable body 30N can be prevented from coming into contact with the inner wall surfaces of case 21N and cover 24. Furthermore, the position can be regulated without separately adding any sliding member for favorably, linearly driving movable body 30N, thereby negating the cost.

When coil 70N is supplied with power through power supply section 25 and excited, core 50N of E-shaped core 504N is magnetized, and a thrust occurs according to the relationship of the magnetic poles of the magnet disposed opposite thereto. More specifically, core 50N is supplied with power to coil 70N from power supply section 25 and excited, which in turn excites E-shaped core 50N itself, and reciprocatorily moves (reciprocatorily vibrates) movable body 30N including magnet 60N in the longitudinal direction, i.e., N direction (for example, see FIG. 49) orthogonal to the circumferential direction. This drive principle is an operation principle analogous to that of vibratory actuator 10 in Embodiment 1 achieved by equations 1, 2 and 3 described above.

Accordingly, movable body 30N of vibratory actuator 10N is elastically supported by the magnetic attractive force caused between E-shaped core 504N (core 50N) and magnet 60N in the state of being preliminarily pressed, and reciprocatorily vibrates in a direction along the mutual facing surfaces of magnet 60N and E-shaped core 504N (core 50N) with respect to stationary body 20N, by excitation of coil 70N by power supply.

That is, in vibratory actuator 10N, E-shaped core 504N, i.e., facing surface 51N of core 50N and facing surfaces 506N of core pieces 505N are magnetized by alternate current waves input from power supply section 25 into coil 70N. The magnetic attractive force and repulsion effectively occur to magnetic pole surface 61N of magnet 60N of movable body 30N. Accordingly, movable body 30N can be effectively driven in a direction along the surfaces opposite to each other, that is, a direction along the mutual surfaces that are facing surface 51N of core 50N and facing surfaces 506N of core pieces 505N, and magnetic pole surface 61N of magnet 60N of movable body 30N.

According to vibratory actuator 10N, advantageous effects analogous to <Advantageous Effect 1> to <Advantageous Effect 8> described above can be obtained, and movable body 30N is driven in the central axis direction of the arc of vibratory actuator 10N and the vertical direction. Consequently, the drive length, that is, the vibration amount can be secured and the actuator that is short in the central direction of the arc (arch curve) can be provided, without inverting the aspect ratio to achieve a configuration that is long in the central direction of the arc (arch curve). The actuator that is long in the circumferential direction of the arc is achieved. Consequently, the design flexibility of the size and stroke of the movable section can be improved.

In E-shaped core 504N of stationary body 20N, facing surfaces 51N and 506N are disposed so that power supply to coil 70N can cause both the sides of facing surface 51N at the center to have a magnetic pole different from that of facing surface 51N at the center. Meanwhile, magnet 60N is disposed so that the centers of core 50N and core pieces 505N of E-shaped core 504N can be positioned at the boundaries of the different four pole surfaces on magnetic pole surface 61N.

Accordingly, the thrust can be exerted in a well-balanced manner in the longitudinal direction (circumferential direction) while magnet 60N of movable body 30N is moved by the magnetic attractive force and magnetic repulsion.

Coil 70N is thus included in movable body 30N. Consequently, the mass of movable body 30N can be increased, which can facilitate a high output. In comparison with the VCM scheme, the magnetic resistance can be reduced, the conversion efficiency can be improved, and a high output can be achieved. Furthermore, the configuration can increase the number of magnetic poles. Consequently, in comparison with the configuration where the number of magnetic poles of the core and magnet is one or two, not only the conversion efficiency but also the magnetic spring force caused by the core and magnet is increased with increase in the number of magnetic poles accordingly. Consequently, the design requirements for springs are alleviated, and improvement in the design flexibility of vibratory actuator 10N can be facilitated.

In vibratory actuator 10N, E-shaped core 504N where coil 70N is wound around the central protruding section (core 50N) is disposed in stationary body 20N, multiple-pole (2- to 4-pole, here, 4-pole) magnet 60N is disposed in movable body 30N (provided that the number of magnet poles is X, the number of core poles is X+1 or X−1). Accordingly, in comparison with the case of using the conventional VCM thrust generating principle to move the core according to the law of action and reaction, the mass can be increased and a high output can be facilitated.

This embodiment can reduce the magnetic resistance in comparison with the case of the conventional VCM, improve the energy conversion efficiency, and facilitate achievement of a high output.

As shown in FIG. 51, E-shaped core 504N around which coil 70N is wound is assembled and is fixed together with rail 80N to case 21N, thus assembling stationary body 20N. In case 21N of this assembly of stationary body 20N, an assembly of movable body 30N is accommodated, with slider nails 525 being engaged with slider rod 84. Only such a process can manufacture vibratory actuator 10N. Consequently, the assemblability is high, and the air gap can be easily adjusted.

Magnet 60N is disposed on movable body 30N side, while coil 70N supplied with power is disposed on stationary body 20N side. Consequently, in comparison with the configuration of moving the coil, the need to provide the wire spring for supplying power to coil is negated, the number of components can be reduced, improvement in the assemblability, reliability, and cost advantage of the vibratory actuator can be facilitated.

In the configuration of vibratory actuator 10N of Embodiment 10 shown in FIGS. 48 to 51, the configuration elements including the magnetic circuit may be formed as they are, while the external shape may be changed from the flat shape having the arc shape in a sectional view to another shape, such as a flat planar shape with the circumferential direction being adopted as the longitudinal direction.

In the configuration of adopting the shaft section in each vibratory actuator described above, shaft section 80 having a circular shape in a sectional view is described. The configuration is assumed where the rotation stop about the shaft section is achieved by the magnetic attractive force between the magnet and the core. However, the configuration is not limited thereto. For example, a configuration may be adopted where the shape of a part of the outer periphery of the sectional shape of the shaft section is changed, and the movable body is applied around the shaft section slidably in the axial direction.

Embodiment 11

Figure 52:
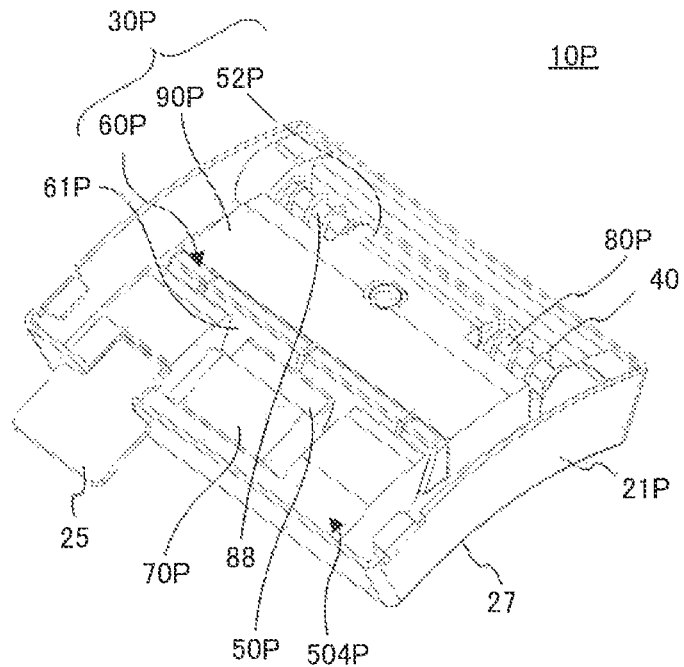
FIG. 52 illustrates a perspective view showing an internal configuration of a vibratory actuator of Embodiment 11 according to the present invention.
Figure 53:
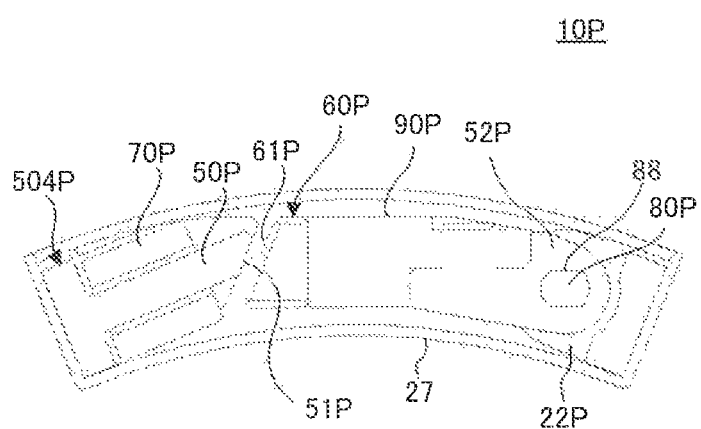
FIG. 53 illustrates a plan view showing an internal configuration of the vibratory actuator of Embodiment 11.
Figure 54:
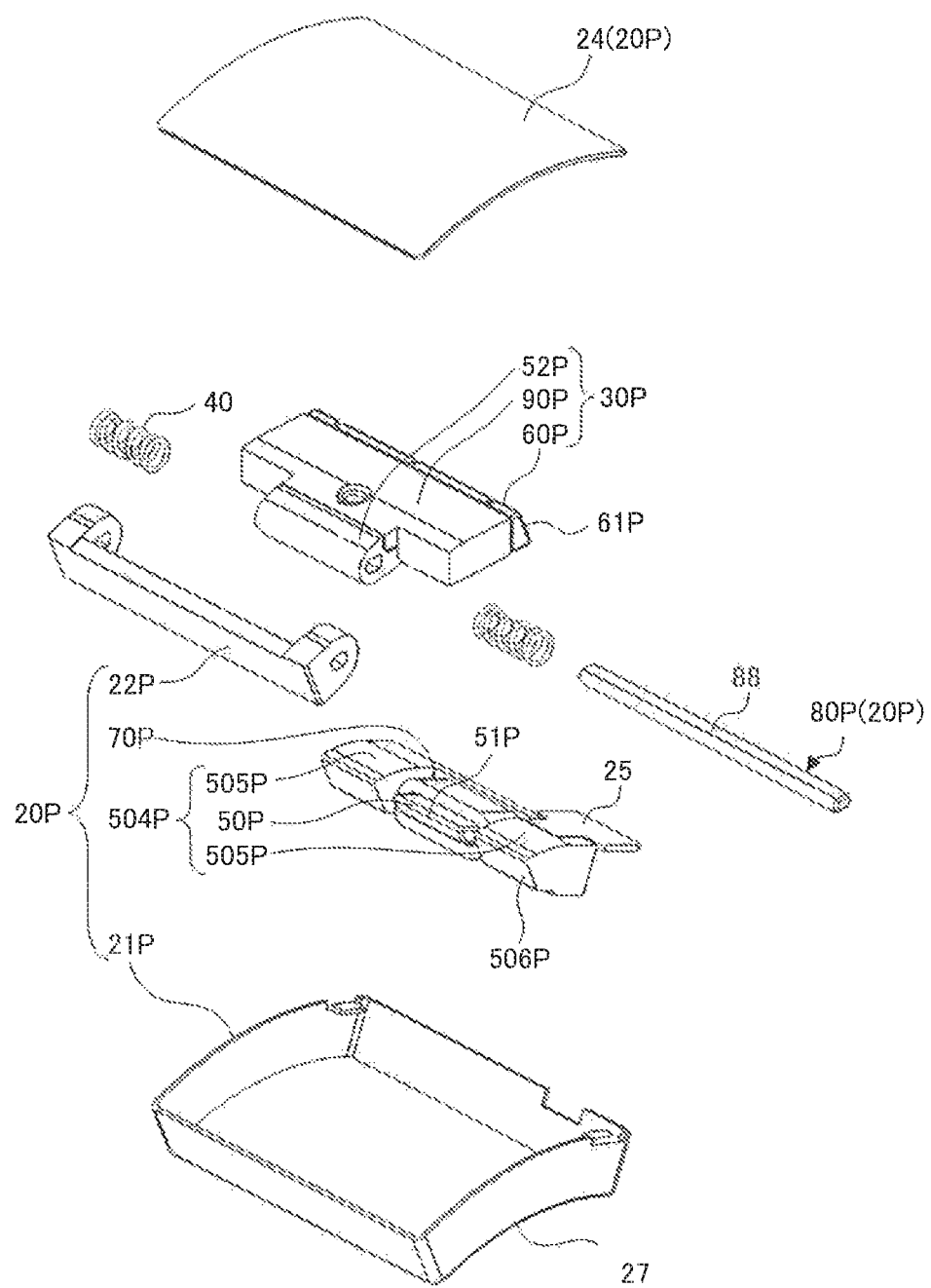
FIG. 54 illustrates an exploded perspective view of the vibratory actuator of Embodiment 11.

FIG. 52 illustrates a perspective view showing an internal configuration of vibratory actuator 10P of Embodiment 11 according to the present invention. FIG. 53 illustrates a side view showing the positional relationship among the main components of vibratory actuator 10P. FIG. 53 shows a longitudinal sectional view of a center portion of vibratory actuator 10P in the longitudinal direction. FIG. 54 illustrates an exploded perspective view of vibratory actuator 10P.

Vibratory actuator 10P shown in FIGS. 52 to 54 is different from vibratory actuator 10F (see FIG. 23) of Embodiment 4 only in the sectional shape of the shaft section and the shape of the related configuration elements. The other configuration elements are analogous. Consequently, configuration elements of vibratory actuator 10P that are analogous to those of vibratory actuator 10 are assigned the same names and the same symbols, and the description of these elements is omitted. Configuration elements that are different only in shape are assigned the same names and are described.

Vibratory actuator 10P includes stationary body 20P, metal springs 40, and movable body 30P movably elastically supported by metal springs 40 and a magnetic spring.

Stationary body 20P has a modified configuration of stationary body 20F (see FIG. 23) that includes shaft section 80P and holder 22P instead of shaft section 80 and holder 22F.

Shaft section 80P has a shape where a part of the outer periphery of shaft section 80 having a circular shape in a sectional view is changed. Here, shaft section 80P has a shape where at least a part of the outer peripheral surface is flattened (for example, D-cut or both-side cut). Here, the outer peripheral surface is D-cut to have flat surface section 88. The outer periphery of the sectional shape forms a D-shape.

As described above, vibratory actuator 10P includes shaft section 80P having a D-shape in a sectional view where flat surface section 88 is added to the outer peripheral surface.

Shaft section 80P is fixed at its opposite ends to stationary body 20P via holder 22P that is externally applied around the section and has conforming sectional shapes.

Bearing section 52P of movable body 30P is externally applied around shaft section 80P slidable only in the axial direction. Movable body 30P includes bearing section 52P, yoke 90P to which bearing section 52P is fixed, and magnet 60P. Yoke 90P and magnet 60P are analogous to yoke 90 and magnet 60F in Embodiment 4. Case 21P, cover 24, coil (air core) 70P, E-shaped core 504P and power supply section 25, which are configuration elements other than holder 22P of stationary body 20P are configuration elements analogous to case 21F, cover 24, coil (air core) 70F, E-shaped core 504F and power supply section 25, and have analogous functions. Magnetic pole surface 61P of magnet 60P, and facing surface (indicated with facing surface 51P of core 50P) of E-shaped core 504P are disposed to face in parallel to each other, with a predetermined space (gap) being secured.

The restriction to shaft section is only a rotational restriction in a case of a configuration where a shaft section has a circular shape in a sectional view. There is a problem of a heavy design restriction if rotation stop is made only by the magnetic attractive force between the magnet and the core.

On the contrary, according to this embodiment, shaft section 80P includes a partially formed flat surface section. Consequently, this formation assists the rotational restriction of movable body 30P that rotates about shaft section 80P. That is, the flat surface section restricts the rotation about the axis of movable body 30P externally applied around shaft section 80P itself. Accordingly, there is no need to achieve the restriction (rotation stop) in the rotational direction only by the magnetic attractive force. The design flexibility of the magnetic circuit design is improved, and mechanical rotation stop is achieved, thereby improving reliability as vibratory actuator 10P. More specifically, a risk that magnet 60P of movable body 30P comes into contact with case 21P or E-shaped core 504P and is broken when an impact is applied, can be avoided.

This configuration can be applied to any vibratory actuator among the vibratory actuators described above that include the shaft section, and can exert analogous working effects.

Vibratory actuators 10, 10B, 10D, 10F, 10H, 10J, 10K, 10L and 10P in Embodiments 1 to 10 include stationary bodies 20, 20B, 20D, 20F, 20H, 20J, 20K, 20L and 20P that include bottom surface (curved surface section) 27 that is curved in a concave manner and is to be arranged along skin. Vibratory actuators 10, 10B, 10D, 10F, 10H, 10J, 10K, 10L and 10P in Embodiments 1 to 10 are provided on bottom surface 27 (the inside of bottom surface 27) that is the curved surface in a reciprocating manner along bottom surface 27 with respect to stationary bodies 20, 20B, 20D, 20F, 20H, 20J, 20K, 20L and 20P and include movable bodies 30, 30B, 30D, 30F, 30H, 30J, 30K, 30L and 30P that apply a vibratory stimulus to mechanoreceptors in skin tissue via bottom surface 27 through reciprocating movement. Accordingly, reciprocating movements of movable bodies 30, 30B, 30D, 30F, 30H, 30J, 30K, 30L and 30P can apply vibratory stimuli to mechanoreceptors via bottom surfaces 27. Consequently, vibrations can be more effectively applied to the user without changing the external shape, thereby increasing the sensory vibrations of the user. As described above, reduction in size can be facilitated, while vibrations can be effectively applied to the user.

It is a matter of course that in each embodiment, configuration elements that are not included in the other embodiments may be appropriately changed to exert functions and advantageous effects by the changed configuration elements.

Embodiment 12

Figure 55:
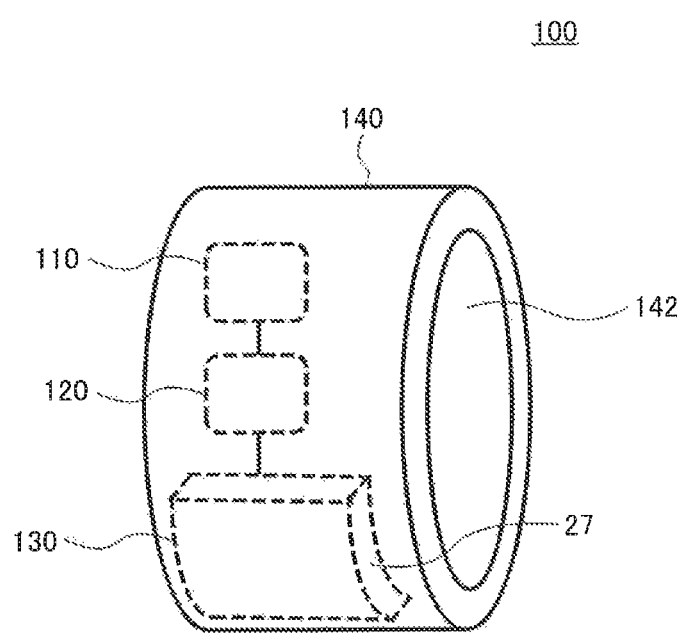
FIG. 55 schematically illustrates main components of a wearable terminal of Embodiment 12 according to the present invention.

FIG. 55 schematically illustrates main components of wearable terminal 100 of Embodiment 12 according to the present invention. Wearable terminal 100 is to be worn by the user for use. Here, wearable terminal 100 functions as what is called a wearable input device that issues a notification indicating an incoming call, at a connected communication terminal, to the user wearing the device, through vibrations.

Wearable terminal 100 shown in FIG. 55 includes communication apparatus 110, processing apparatus 120, vibratory actuator 130 serving as a drive apparatus, and housing 140. Bottom surface 27 of vibratory actuator 130 is disposed along inner peripheral surface 142 of housing 140, and is disposed in a state where bottom surface 27 and inner peripheral surface 142 are in close contact with each other.

Housing 140 is formed in a ring shape, and is to be put on a finger of the user in this case. At this time, inner peripheral surface 142 is disposed in close contact with the skin. Inner peripheral surface 142 of vibratory actuator 130 is disposed on finger pulp that is a wearing part. Accordingly, vibratory actuator 130 is put on the part where mechanoreceptors tightly reside so as to be in close contact therewith. Communication apparatus 110 is connected, via wireless communication, to a wireless communication terminal, such as a mobile phone, a smartphone or a mobile game player, which are not shown, and receives a signal from the wireless communication terminal and outputs the signal to processing apparatus 120, for example.

For example, in communication apparatus 110, the signal from the wireless communication terminal is an incoming call signal or the like that is from the wireless communication terminal and is received through a communication scheme, such as Bluetooth®, for example. Processing apparatus 120 causes a conversion circuit section to convert the input signal into a drive signal for vibratory actuator 130, and supplies the signal to vibratory actuator 130 via a drive circuit section (not shown) connected to power supply section 25 of vibratory actuator 130, thereby driving vibratory actuator 130. Accordingly, the movable body is vibrated, which in turn vibrates wearable terminal 100. Housing 140 of wearable terminal 100 has a ring shape. The movable body reciprocatorily vibrates along bottom surface 27 of vibratory actuator 130. Vibrations caused by reciprocatorily sliding movement of the movable body on bottom surface 27 are then transmitted as vibratory stimuli directly to mechanoreceptors via bottom surface 27 and inner peripheral surface 142. Accordingly, the vibrations can be more effectively applied to the user without changing the external shape, thereby increasing the sensory vibrations of the user.

Accordingly, in comparison with configurations where the vibratory actuator is disposed on the back of a finger or the vibratory actuator is disposed on a position apart from the finger pulp, for example, a position thereabove, the sensory vibrations of the user can be further increased through a predetermined magnitude without changing the external shape.

The shape of wearable terminal 100 can be reduced in size, which can improve the usability without uncomfortable feeling during usage. Wearable terminal 100 may be an incoming call notification function device that includes communication apparatus 110, processing apparatus 120, and vibratory actuator 130 serving as a drive apparatus. Accordingly, the incoming call notification function device may have a configuration that notifies the user of an incoming call from the outside obtained by the wireless communication terminal, such as a mobile phone, a smartphone, or a mobile game player, through driving the vibratory actuator. The vibrations of vibratory actuator 130 can be applied to the user not only as the incoming call signal, but also as vibrations corresponding to a signal input from an external apparatus to the information communication terminal, such as of email, or vibrations according to the operation of a game amplified as sensory vibrations. Wearable terminal 100 may be provided with a function of inputting a character or a numeral into a wirelessly connected apparatus, or selecting information displayed on a display device, such as a connected display, only by a drawing movement in the air.

The embodiments disclosed this time are examples in all aspects, and are not for limitation. The scope of the present invention is not defined by the above description, but is defined by the appended claims instead. It is intended that all modifications within the meaning and scope equivalent to the appended claims are encompassed. The embodiments of the present invention have thus been described above. The above description is exemplary description of the preferred embodiments of the present invention. The scope of the present invention is not limited thereto. That is, the description of the configuration of the apparatus and the shapes of the components is only on examples. It is apparent that various modifications and additions to these examples can be made within the scope of the present invention.

INDUSTRIAL APPLICABILITY

The vibratory actuator according to the present invention can exert advantageous effects that facilitate reduction in size and effectively apply vibrations to the user, and is usable as a wearable terminal that can communicate with an information communication terminal, and an incoming call notification function device that notifies the user of an incoming call notification of an information communication terminal, such as a mobile phone, through providing the user with sensory notification.

REFERENCE SIGNS LIST 10, 10B, 10D, 10F, 10H, 10J, 10K, 10L, 10P, 130 Vibratory actuator
20, 20B, 20D, 20F, 20H, 20J, 20K, 20L, 20P Stationary body
21, 21B, 21D, 21F, 21H, 21J, 21K, 21L, 21P Case
22, 22B Frame
22D, 22F, 22H, 22J, 22L, 22N, 22P Holder
24, 24D, 24F, 24H, 24J, 24K, 24L, 24M, 24N Cover
25 Power supply section
27 Bottom surface (curved surface section)
30, 30B, 30D, 30F, 30H, 30J, 30L, 30N, 30P Movable body
40 Metal spring
41, 82 Fixation plate section
43 Arm section
45 Wire spring
50, 50B, 50D, 50F, 50H, 50J, 50K, 50L, 50N, 50P, 501, 501C, 502 Core
51, 51B, 51D, 51F, 51H, 51J, 51K, 51L, 51P Facing surface
504, 504F, 504H, 504J, 504K, 504L, 504N, 504P, E-shaped core
60, 60B, 60D, 60F, 60H, 60J, 60K, 60L, 60P Magnet
61, 61B, 61D, 61F, 61H, 61J, 61K, 61L, 61P Magnetic pole surface
70, 70B, 70D, 70F, 70H, 70J, 70K, 70L, 70P Coil
80, 80P Shaft section (support shaft section)
80N Rail
84 Slider rod
88 Flat surface section
90, 90B, 90D, 90F, 90H, 90J, 90K, 90L, 90P Yoke
100 Wearable terminal
142 Inner peripheral surface
212, 212N, 214, 214N Side walls
505, 505B, 505D, 505F, 505H, 505J, 505K, 505L, 505P Core piece
506, 506B, 506D, 506F, 506H, 506J, 506K, 506L, 506P Facing surface
525 Slider nail

The invention claimed is:
1. A vibratory actuator, comprises:
a stationary body and a movable body that is provided to be reciprocatorily movable with respect to the stationary body, wherein
one of the stationary body and the movable body includes at least a magnet of a group comprising:
the magnet,
a core that is disposed to face a magnetic pole surface of the magnet and is made of a magnetic body, and
a coil that is disposed around an outer periphery of the core,
another of the stationary body and the movable body includes at least the core of the group,
the stationary body includes a case having a curved surface section curved in a concave manner to be disposed along skin as a bottom surface of the case; and
the movable body is provided in the case so as to reciprocate on the curved surface section with respect to the stationary body and applies a vibratory stimulus caused by a reciprocating movement to mechanoreceptors in skin tissue of the skin via the curved surface section.
2. The vibratory actuator according to claim 1, wherein the movable body reciprocatorily moves along a curved direction parallel to one side of the case of the curved surface section.

3. The vibratory actuator according to claim 1,
wherein the movable body reciprocatorily moves on the curved surface section parallel to one side of the case in a direction orthogonal to a curved direction.

4. The vibratory actuator according to claim 1,
wherein the core and the magnet are provided in the case so as to support elastically the movable body that in a state of being preliminarily pressed by a magnetic attractive force caused between the core and the magnet, and the movable body reciprocatorily vibrates owing to excitation of the coil by power supply, in a direction along mutual facing surfaces of the magnet and the core, on a rear surface of the curved surface section, with respect to the stationary body.

5. A wearable terminal, comprising the vibratory actuator according to claim 1 implemented therein.

6. An incoming call notification function device, comprising the vibratory actuator according to claim 1 implemented therein.

* * * * *